(12) United States Patent
Rong et al.

(10) Patent No.: US 10,772,101 B2
(45) Date of Patent: Sep. 8, 2020

(54) SYSTEMS AND METHODS FOR DETERMINING AIR INTERFACE CONFIGURATION

(71) Applicant: Huawei Technologies Co., Ltd., Shenzhen (CN)

(72) Inventors: Lu Rong, Shenzhen (CN); Jianglei Ma, Ottawa (CA); Peiying Zhu, Kanata (CA); Wen Tong, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/954,208

(22) Filed: Apr. 16, 2018

(65) Prior Publication Data

US 2018/0242304 A1 Aug. 23, 2018

Related U.S. Application Data

(63) Continuation of application No. PCT/IB2016/057457, filed on Dec. 8, 2016, which is
(Continued)

(51) Int. Cl.
*H04W 72/00* (2009.01)
*H04W 72/04* (2009.01)
(Continued)

(52) U.S. Cl.
CPC ..... *H04W 72/048* (2013.01); *H04W 28/0247* (2013.01); *H04W 40/20* (2013.01);
(Continued)

(58) Field of Classification Search
CPC combination set(s) only.
See application file for complete search history.

(56) References Cited

U.S. PATENT DOCUMENTS

| 5,590,406 A | 12/1996 | Bayley et al. |
| 8,930,965 B1 | 1/2015 | Shalev et al. |

(Continued)

FOREIGN PATENT DOCUMENTS

| CN | 101321380 A | 12/2008 |
| CN | 101415179 A | 4/2009 |

(Continued)

OTHER PUBLICATIONS

Zaidi, et al., "Waveform and Numerology to Support 5G Services and Requirements," New Waveforms and Multiple Access Methods for 5G Networks, IEEE Communications Magazine, Nov. 2016M 9 pages.

(Continued)

*Primary Examiner* — Justin Y Lee
(74) *Attorney, Agent, or Firm* — Slater Matsil, LLP

(57) ABSTRACT

Systems and methods for UE state machine to support multiple services or air interfaces are described. The UE may have one configuration of the state machine for multiple services or air interfaces. The UE may have multiple state machines for different services or air interfaces that work independently. The UE may have multiple state machines for different services or air interfaces that work collaboratively. The UE may have a state machine that uses a state machine configuration selected out of a plurality of state machine configurations according to the services used. The configuration of this state machine may be adapted to services. At initialization, the configuration of this state machine may be default or be determined according to the services the UE may use. During operation, the configuration of this state machine may change according to the change in services for the UE.

24 Claims, 29 Drawing Sheets

Related U.S. Application Data a continuation-in-part of application No. 15/356,124, filed on Nov. 18, 2016.

(60) Provisional application No. 62/264,629, filed on Dec. 8, 2015, provisional application No. 62/296,911, filed on Feb. 18, 2016.

(51) Int. Cl.
*H04W 28/02* (2009.01)
*H04W 76/11* (2018.01)
*H04W 40/20* (2009.01)
*H04L 12/927* (2013.01)

(52) U.S. Cl.
CPC ............. *H04W 76/11* (2018.02); *H04L 47/80* (2013.01); *H04L 47/801* (2013.01); *H04L 47/805* (2013.01)

(56) References Cited

U.S. PATENT DOCUMENTS

| | | | |
|---|---|---|---|
| 2002/0191640 A1 | 12/2002 | Haymes et al. | |
| 2007/0298836 A1 | 12/2007 | Yanover | |
| 2008/0167054 A1* | 7/2008 | Shaheen | H04W 60/04 455/458 |
| 2009/0245434 A1 | 10/2009 | Koslov et al. | |
| 2010/0165954 A1 | 7/2010 | Lin et al. | |
| 2011/0142006 A1* | 6/2011 | Sachs | H04W 36/0072 370/331 |
| 2012/0127873 A1 | 5/2012 | Li et al. | |
| 2012/0147531 A1 | 6/2012 | Rabii | |
| 2013/0039302 A1 | 2/2013 | Miki et al. | |
| 2013/0235844 A1 | 9/2013 | Ge et al. | |
| 2013/0344877 A1 | 12/2013 | Ma et al. | |
| 2014/0044097 A1 | 2/2014 | Chen et al. | |
| 2014/0064160 A1 | 3/2014 | Verger et al. | |
| 2014/0073287 A1 | 3/2014 | Zhang et al. | |
| 2014/0086177 A1 | 3/2014 | Adjakple et al. | |
| 2014/0113643 A1 | 4/2014 | Ma et al. | |
| 2014/0198768 A1 | 7/2014 | Hahn et al. | |
| 2015/0147990 A1 | 5/2015 | Kreitzer et al. | |
| 2015/0195788 A1 | 7/2015 | Au et al. | |
| 2015/0281073 A1 | 10/2015 | Kotha et al. | |
| 2015/0341829 A1 | 11/2015 | Futaki et al. | |
| 2016/0095026 A1 | 3/2016 | Boudreau et al. | |
| 2016/0119912 A1 | 4/2016 | Terry et al. | |
| 2016/0159983 A1 | 6/2016 | Zhu et al. | |
| 2016/0255671 A1* | 9/2016 | Rahman | H04W 56/001 370/329 |
| 2016/0286449 A1 | 9/2016 | Choi et al. | |
| 2017/0079059 A1* | 3/2017 | Li | H04W 16/02 |
| 2017/0111930 A1 | 4/2017 | Rajagopal et al. | |
| 2017/0188341 A1 | 6/2017 | Tan et al. | |
| 2018/0041922 A1 | 2/2018 | Chen et al. | |
| 2018/0048465 A1* | 2/2018 | Schliwa-Bertling | G11B 20/0021 |
| 2018/0310238 A1 | 10/2018 | Opsenica et al. | |
| 2018/0367355 A1 | 12/2018 | Pan et al. | |
| 2019/0021047 A1 | 1/2019 | Zong | |
| 2019/0317591 A1* | 10/2019 | Sanghi | G06F 1/3287 |
| 2019/0320350 A1 | 10/2019 | Futaki et al. | |

FOREIGN PATENT DOCUMENTS

| | | |
|---|---|---|
| CN | 101867906 A | 10/2010 |
| CN | 101981884 A | 2/2011 |
| CN | 102056113 A | 5/2011 |
| CN | 102932765 A | 2/2013 |
| CN | 103188729 A | 7/2013 |
| CN | 104125347 A | 10/2014 |
| CN | 104521282 A | 4/2015 |
| CN | 104620653 A | 5/2015 |
| CN | 104737609 A | 6/2015 |
| CN | 104904290 A | 9/2015 |
| CN | 104955172 A | 9/2015 |
| CN | 105981413 A | 9/2016 |
| CN | 105992242 A | 10/2016 |
| EP | 2778945 A1 | 9/2014 |
| EP | 2941071 A1 | 11/2015 |
| EP | 2978261 A1 | 1/2016 |
| EP | 3035735 A1 | 6/2016 |
| EP | 2961148 B1 | 5/2017 |
| JP | H09507973 A | 8/1997 |
| JP | 2005508106 A | 3/2005 |
| JP | 2008517515 A | 5/2008 |
| JP | 2009525681 A | 7/2009 |
| JP | 2014500687 A | 1/2014 |
| KR | 20140113713 A | 9/2014 |
| WO | 2013010005 A1 | 1/2013 |
| WO | 2014000602 A1 | 1/2014 |
| WO | 2014103145 A1 | 7/2014 |
| WO | 2014148874 A1 | 9/2014 |
| WO | 2014166399 A1 | 10/2014 |
| WO | 2014177090 A1 | 11/2014 |
| WO | 2014198768 A1 | 12/2014 |

OTHER PUBLICATIONS

Mobile T., "Deutsche Telekom and T-mobile US a view on 5G | 3GPP RAN 5G WorkShop," RWS-150033, Sep. 17 and 18, 2015, Phoenix, USA, 10 pages.

Huawei Technologies, "Vision on 5G Radio Access Technologies," RWS-150006, 3GPP RAN workshop on 5G, Sep. 17-18, 2015, Phoenix, USA, 18 pages.

Huawei, et al., "Key Issues for Support of Network Slicing in RAN," 3GPP TSG-RAN WG2 Meeting #96, R2-167585, Reno, Nevada, Nov. 14-18, 2016, 6 pages.

Huawei, et al., "UE-cell-center-like Design Principles and Tracking Signal Design," 3GPP TSG RAN WG1 Meeting #86, R1-167205, Gothenburg, Sweden, Aug. 22-26, 2016, 6 pages.

NTT Docomo, Inc., "RAN WG's Progress on NR Technology SI in the May meeting," 3GPP TSG-RAN WG2 #95, R2-164707, Gothenburg, Sweden, Aug. 22-26, 2016, 10 pages.

Samdanis, et al., "TD-LTE virtual cells: An SDN architecture for user-centric multi-eNB elastic resource management," Elsevier, Jan. 13, 2016, 16 pages.

"A Deliverable by the NGMN Alliance" NGMN 5G White Paper (Version 1.0) 3GPP, Feb. 17, 2015, Figure 9, pp. 46-48 of 125 pages.

Abdelhamid, et al., "Resource Scheduling for Heterogeneous Traffic in LTE Virtual Networks," 2015 16th IEEE International Conference on Mobile Data Management, Jun. 30, 2015, 6 pages.

ETSI MCC, "Report of 3GPP RAN workshop on "5G"", 3GPP RAN workshop on 5G, RWS-150076, Phoenix, USA, Sep. 17-18, 2015, 40 pages.

Huawei, "Coordination of network slices," 3GPP TSG-SA WG1 Meeting #71, S1-152226, Belgrade, Serbia, Aug. 17-21, 2015, 2 pages.

Broadcom Corp., "Mobility for dual connectivity," 3GPP TSG RAN WG2 Meeting #81bis, R2-130990, Chicago, USA, Apr. 15-19, 2013, 6 pages.

3rd Generation Partnership Project; Technical Specification Group GSM/EDGE Radio Access Network; Radio link management in hierarchical networks (Release 12), 3GPP TS 45.022, Sep. 2014, 45 Pages, V12.0.0.

\* cited by examiner

Enhanced idle mode

Enhanced connected mode

SYSTEMS AND METHODS FOR DETERMINING AIR INTERFACE CONFIGURATION

CROSS-REFERENCE TO RELATED APPLICATIONS

This application is a continuation of PCT Application No. PCT/IB2016/057457 filed Dec. 8, 2016, which claims the benefit of U.S. Provisional Application No. 62/296,911 filed Feb. 18, 2016 and which claims priority to and is a continuation-in-part of U.S. patent application Ser. No. 15/356,124 filed Nov. 18, 2016, which claims priority to U.S. Provisional Application No. 62/264,629 filed Dec. 8, 2015, all of which applications are hereby incorporated herein by reference.

TECHNICAL FIELD

The present application relates to wireless communication generally, and, in particular embodiments, to a system and method for user equipment state configurations for multiple services.

BACKGROUND

In designing mobile networks, an architecture has arisen in which the network can be divided into a Core Network (CN) and a Radio Access Network (RAN). The RAN provides wireless communication channels to User Equipment (UE), while the CN is typically comprises of nodes and functions making use of fixed links. In the RAN, fronthaul and backhaul connections often rely on wired connections, although some wireless connections (typically between fixed points) are present. The RAN has different requirements and issues to address than the CN.

With planning for next generation networks, and researching techniques that can enable such networks, network slicing has drawn attention for the benefits that it can provide in the CN. When combined with such techniques as Network Function Virtualization (NFV) and Software Defined Networking (SDN), network slicing can allow for the creation of Virtual Networks (VNs) atop a general pool of compute, storage and communications resources. These VNs can be designed with control over in-network topology, and can be designed with traffic and resource isolation so that traffic and processing within one slice is isolated from traffic and processing demands in another slice. By creating network slices, isolated networks can be created with characteristics and parameters specifically suited to the needs of the traffic flows intended for the slice. This allows for a single pool of resources to be divided up to service very specific and disparate needs, without requiring that each slice be able to support the demands of the services and devices supported by other slices. Those skilled in the art will appreciate that a CN that has been sliced, may appear to the RAN as a plurality of core networks, or there may be a common interface, with each slice identified by a slice identifier. It should also be understood that while a slice may be tailored to the traffic patterns of the flows that it is intended to carry, there may be multiple services (typically with similar requirements) carried within each slice. Each of these services is typically differentiated by a service identifier.

In creating a sliced core network, it should be understood that typically the resource pool that is being drawn upon for slice resources is somewhat static. The compute resources of a data center are not considered to be dynamic on a short term basis. The bandwidth provided by a communications link between two data centers, or between two functions instantiated within a single data center does not typically have dynamic characteristics.

The topic of slicing within a Radio Access Network, has arisen in some discussions. RAN slicing poses problems not encountered with slicing in the CN. Issues associated with dynamic channel quality on the radio link to the UE, provision of isolation for transmissions over a common broadcast transmission medium, and how RAN and CN slices interact, have to be addressed to usefully enable Ran slicing in mobile wireless networks.

In Third Generation and Fourth Generation (3G/4G) network architecture, a base station, base transceiver station, NodeB, and evolved NodeB (eNodeB) have been the terms used to refer to the wireless interface to the network. In the following, a generic Access Point is used to denote the wireless edge node of the network. An Access Point will be understood to be any of a Transmission Point (TP), a Receive Point (RP) and a Transmit/Receive Point (TRP). It will be understood that the term AP can be understood to include the above mentioned nodes, as well as their successor nodes, but is not necessarily restricted to them.

Through the use of SDN and NFV, functional nodes can be created at various points in the network and access to the functional nodes can be restricted to sets of devices, such as UEs. This allows what has been referred to as Network Slicing in which a series of virtual network slices can be created to serve the needs of different virtual networks. Traffic carried by the different slices can be isolated from the traffic of other slices, which allows for both data security and easing of network planning decisions.

Slicing has been a used in core networks due to the ease with which virtualized resources can be allocated, and the manner in which traffic can be isolated. In a Radio Access Network, all traffic is transmitted over a common resource which has made traffic isolation effectively impossible. The benefits of network slicing in the Radio Access Network are numerous, but the technical obstacles to designing and implementing an architecture have resulted in a lack of network slicing at the radio edge.

User Equipment (UE) devices (e.g., smartphones, tablets) are becoming more connected to Evolved NodeBs (eNB)s with not only different services running in the foreground (referred to as foreground services) but also with different services running in the background (referred to as background services). UE devices may also be commonly referred to as terminals, subscribers, users, mobile stations, mobiles, and the like. eNBs may also be commonly referred to as NodeBs, base stations, controllers, communications controllers, access points, and the like.

Foreground services (and associated message traffic-"foreground traffic") include video streaming, web browsing, file transfer, games, and the like. Background services (and associated message traffic-"background traffic") include keep alive messages generated by a mobile operating system or instant messaging, reports generated by sensors and/or smart meters, and the like.

Providing always on connectivity (maintaining an existing connection to enable low latency communications rather than permitting an existing connection to end and re-establishing another connection when needed) while conserving energy (to maximize battery life, for example) is an ongoing challenge.

In Third Generation and Fourth Generation (3G/4G) network architectures, a base station, base transceiver station, NodeB, and evolved NodeB (eNodeB or eNB) have been the terms used to refer to the wireless interface to the network. In the following, a generic Access Point is used to denote the wireless edge node of the network. An Access Point will be understood to be any of a Transmission Point (TP), a Receive Point (RP) and a Transmit/Receive Point (TRP). It will be understood that the term AP can be understood to include the above mentioned nodes, as well as their successor nodes, but is not necessarily restricted to them.

Services that are supported by a network operator can fall within a range of categories, including for example: enhanced mobile broadband (eMBB) communications such as bi-directional voice and video communications; messaging; streaming media content delivery; ultra-reliable and low latency communications (URLLC); and massive Machine Type Communications (mMTC). Each of these categories could include multiple types of services—for example intelligent traffic systems and eHealth services could both be categorized as types of URLLC services.

In some embodiments, the state configuration for a given UE device may be based on a service that the UE device supports. For example, an enhanced mobile broadband (eMBB) service may be mapped to a state configuration that includes ACTIVE, ECO and IDLE states with transition paths between each of those states. Therefore, the state configuration that the eMBB service is mapped to may be selected for a UE device that supports the eMBB service.

The ECO state is an energy saving state that allows transmission of some small packets for the UE. It is useful to reduce the signaling overhead and energy consumption for background traffic such as keep alive messages generated by a mobile operating system, instant messaging, reports generated by sensor and/or smart meters, etc. The ECO state may also be called Inactive state, which will be used in this application.

SUMMARY

Systems and methods for UE state machine to support multiple services or air interfaces are disclosed. The UE may have one configuration of the state machine for multiple services (or sets of services) or air interfaces. The UE may have multiple state machines for different services (or sets of services) or air interfaces that work independently. The UE may have multiple state machines for different services (or sets of services) or air interfaces that work collaboratively. The UE may have a state machine that uses a state machine configuration selected out of a plurality of state machine configurations according to the services used. The configuration of this state machine may be adapted to services. At initialization, the configuration of this state machine may be default or be determined according to the services the UE may use. During operation, the configuration of this state machine may change (e.g., add/remove a state in the state machine) according to the change in services for the UE.

According to one aspect of the present invention method for a UE in a wireless communication network, the method comprising: the UE operating based on a plurality of state machines, wherein each state machine is for a respective slice in the wireless communication network, each state machine having a plurality of states and state transitions dependent on a condition pertaining to the respective slice.

In some embodiments, the plurality of state machines operate independently.

In some embodiments, in addition to the local condition pertaining to the respective slice, for each state machine, there is at least one state machine dependency between two or more of the plurality of state machines such that a state or a condition for state transition of one of the state machines is dependent upon a state of another state machine or a condition pertaining to the service or group of services or air interface of another state machine.

In some embodiments, the at least one state machine dependency includes a dependency in which a particular state of a first state machine directly causes a particular state of a second state machine.

In some embodiments, the at least one state machine dependency includes a dependency in which a condition for a particular state transition in a first state machine depends on a particular state of a second state machine.

In some embodiments, the at least one state machine dependency includes a dependency in which a condition for a particular state transition in a first state machine directly causes a particular state of the second state machine.

In some embodiments, the at least one state machine dependency includes a dependency in which a condition for a particular state transition in a first state machine depends on a condition for a particular state transition of a second state machine.

In some embodiments, the at least one state machine dependency includes: when a first state machine has an Inactive state but does not have an Active state, and when any other state machine than the first state machine transitions to Active state or Inactive state and the current state of the first state machine is not Inactive state, then the current state of the first state machine transitions to Inactive state.

In some embodiments, the method further comprises: upon a connection establishment procedure for session based service, the UE receiving a message to configure some other state machines of the UE.

In some embodiments, the at least one state machine dependency includes two state machine dependencies between a first and a second of the plurality of state machines such that a state or a condition for state transition of the first state machine is dependent upon a state of the second state machine or a condition pertaining to the service or group of services or air interface of the second state machine, and such that a state or a condition for state transition of the second state machines is dependent upon a state of the second state machine or a condition pertaining to the service or group of services or air interface of the second state machine.

In some embodiments, the states of a first of the state machines are a subset of the states of a second of the state machines; the second state machine works as a primary state machine and the first state machine works as a secondary state machine depending on the primary state machine; state transitions for the primary state machine consider conditions for the primary state machine and the secondary state machine; the state of the secondary state machine is determined by a mapping from the state of the primary state machine.

In some embodiments, the plurality of state machines comprises at least two state machines, the at least two state machines having one or more states that each is in common between two or more of the state machines; the at least one state machine dependency is such that when one state machine transitions to a state in common with one or more other state machine, the one or more other state machine also transitions to this state if it is not already in this state.

In some embodiments, the method comprises: the UE operating based on a state machine having a plurality of state machine configurations, wherein each state machine configuration is for a respective slice in a wireless communications network, each state machine configuration having a plurality of states and state transitions dependent on a condition pertaining to the slice.

In some embodiments, the method further comprises: when only one of the slices is being used, the UE using the state machine with the respective state machine configuration.

In some embodiments, the method further comprises: when multiple slices are being used, using the state machine with a common state machine configuration for the multiple slices.

In some embodiments, the states in the common state machine configuration are determined according to the states in the state machine configurations for the multiple slices.

In some embodiments, the common state machine configuration includes all the states used in any of the state machine configurations for the multiple slices.

In some embodiments, the common state machine configuration includes the states used in one state machine configuration with most powerful states.

In some embodiments, the common state machine configuration includes any state that is common to the multiple state machine configurations.

In some embodiments, the common state machine configuration comprises one or more additional states are not common to the multiple state machine configurations.

In some embodiments, the common state machine configuration is determined according to a mapping table.

In some embodiments, the mapping table maps from combinations of slices to state machine configurations.

In some embodiments, the mapping table maps from each combination of multiple sets of states to a respective single set of states.

In some embodiments, the common state machine configuration is either pre-defined, signaled from the network to the UE, or partly pre-defined and partly signaled.

In some embodiments, the common state machine configuration is updated according to the slice(s) UE uses.

In some embodiments, the method further comprises: the UE sending a signal to the network indicating a change in the slice(s) or indicating a change in the common state machine configuration.

In some embodiments, the method further comprises after a change in the common state machine configuration, setting a first state after the change according to pre-defined rule.

According to another aspect of the present invention, there is provided a UE configured to implement one of the methods summarized above or described herein.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
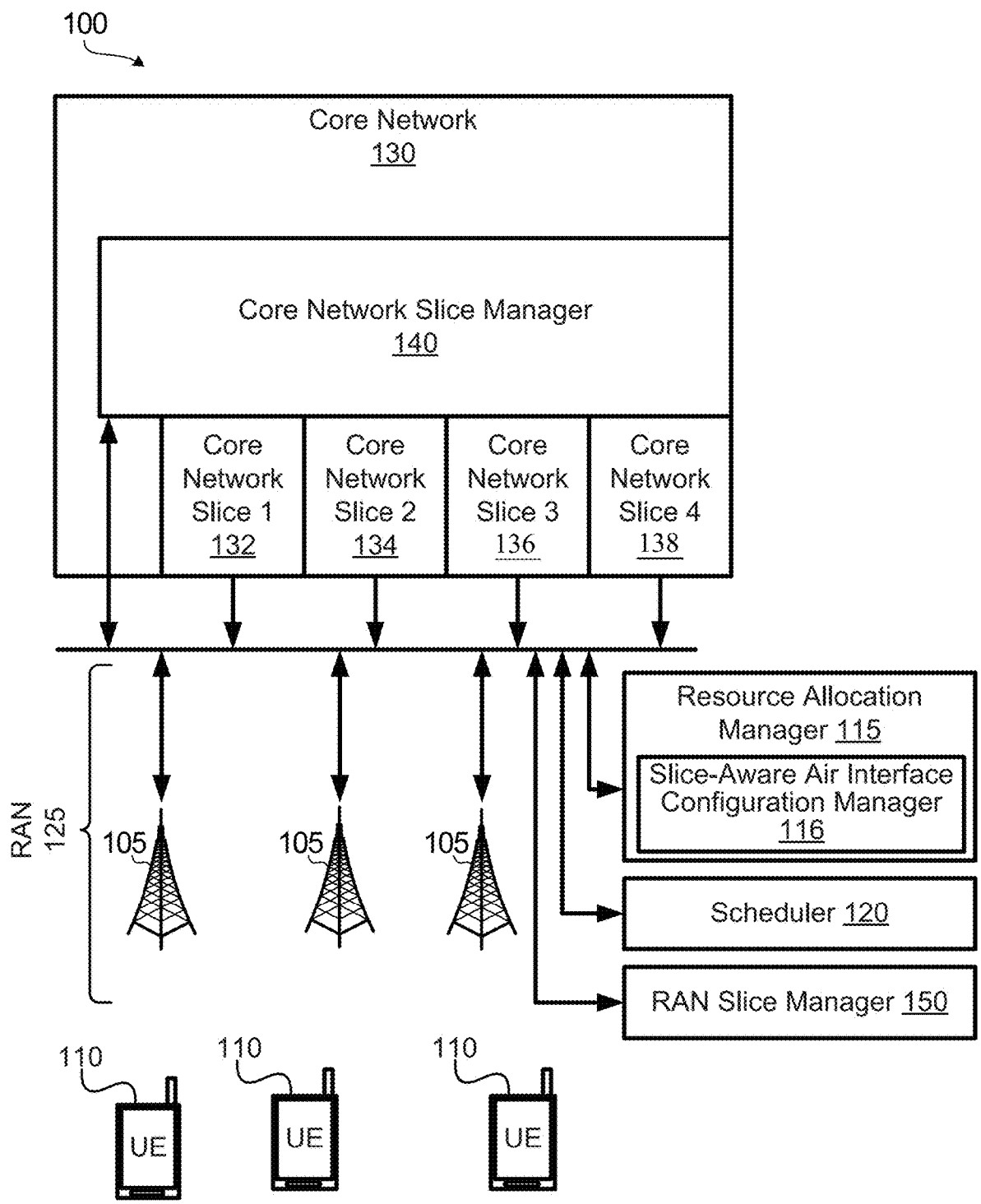
FIG. 1 is a schematic diagram of an example communications system suitable for implementing various examples described in the present disclosure.

Software Defined Networking (SDN) and Network Function Virtualization (NFV) have been used to enable network slicing in a physical core network. Network slicing involves allocating resources, such as compute, storage, and connectivity resources, to create otherwise isolated virtual networks. From the perspective of a network entity inside a slice, the slice is a distinct and contained network. Traffic carried on a first slice is invisible to a second slice, as are any processing demands within the first slice. In addition to isolating networks from each other, slicing allows for each slice to be created with a different network configuration. Thus, a first slice can be created with network functions that can respond with very low latency, while a second slice can be created with very high throughput. These two slices can have different characteristics, allowing for the creation of different slices to service the needs of specific services. A network slice is a dedicated logical (also referred to as virtual) network with service specific functionalities, and can be hosted on a common infrastructure with other slices. The service specific functionalities associated with a network slice can, for example, govern geographical coverage areas, capacity, speed, latency, robustness, security and availability. Traditionally, network slicing has been limited to the core network, in view of the difficulties in implementing slicing in a Radio Access Network (RAN). However example embodiments will now be described for implementing RAN slicing. In at least some examples, RAN slicing and network core slicing are coordinated to provide end-to-end slicing that can be used to provide service-specific network slices extending across the entire core network and RAN communications infrastructure.

Radio resources allocated to a RAN are typically a set of wireless network rights granted to a network operator which may include for example one or more specified radio frequency bandwidths within one or more geographic regions. A network operator typically enters into service level agreements (SLAs) with customers that specify the level of service that the network operator must provide. Services that are supported by a network operator can fall within a range of categories, including for example: basic mobile broadband (MBB) communications such as bi-directional voice and video communications; messaging; streaming media content delivery; ultra-reliable low latency (URLL) communications; micro Machine Type Communications (μMTC); and massive Machine Type Communications (mMTC). Each of these categories could include multiple types of services—for example intelligent traffic systems and eHealth services could both be categorized as types of URLL services. In some examples, a network slice may be assigned for a service for a group of customers (for example smart phone subscribers in the case of mobile broadband), and in some examples a network slice may be assigned for a single customer (for example, an organization that is providing intelligent traffic systems).

FIG. 1 is a schematic diagram of an example communications system or network too, in which examples described in the present disclosure may be implemented. The communications network 100 is controlled by one or more organizations and includes a physical core network 130 and a Radio Access Network (RAN) 125. In some examples, the core network 130 and RAN 125 are controlled by a common network operator, however in some examples the core network 130 and RAN 125 are controlled by different organizations. In some embodiments, multiple RANs 125, at least some of which are controlled by different network operators, may be connected to a core network 130 that is controlled by one or more of the network operators or by an independent organization. Core Network 130 is sliced, and shown having CN Slice 1 132, CN Slice 2 134, CN Slice 3 136 and CN Slice 4 138. It should also be understood, as will be discussed in more detail below, that a plurality of core networks can make use of the same RAN resources.

An interface between the core network 130 and RAN 125 is provided to allow traffic from CN 130 to be directed towards UEs 110 through access points (APs) 105, which may be base stations, such as an evolved Node B (eNB) in the Long-Term Evolution (LTE) standard, a 5G node, or any other suitable nodes or access points. APs 105, also referred to as Transmit/Receive Points (TRPs), may serve a plurality of mobile nodes, generally referred to as UEs 110. As noted above, in the present description access point (AP) is used to denote the wireless edge node of the network. Thus, the APs 105 provide the radio edge of RAN 125, which may for example be a 5G wireless communication network. The UEs 110 may receive communications from, and transmit communications to, the AP's 105. Communications from the APs 105 to the UEs 110 may be referred to as downlink (DL) communications, and communications from the UEs 110 to the APs 105 may be referred to as uplink (UL) communications.

In the simplified example shown in FIG. 1, network entities within the RAN 125 may include a resource allocation manager 115, a scheduler 120, and a RAN slice manager 150, which may in some embodiments be under the control of the network operator who controls RAN 125. The resource allocation manager 115 may perform mobility-related operations. For example, the resource allocation manager 115 may monitor the mobility status of the UEs 110, may oversee handover of a UE 110 between or within networks, and may enforce UE roaming restrictions, among other functions. The resource allocation manager 115 may also include an air interface configuration function. The scheduler 120 may manage the use of network resources and/or may schedule the timing of network communications, among other functions. RAN slice manager 150 is configured for implementing RAN slicing, as described in greater detail below. It should be understood that in some embodiments, the scheduler 120 is a slice specific scheduler and is specific to the RAN slice, and not common to the RAN. Those skilled in the art will further appreciate that in some embodiments, some slices will have a slice specific scheduler, while other slices will make use of a common RAN scheduler. A common RAN scheduler may also be used to coordinate between slice specific schedulers so that the common RAN resources are properly scheduled.

In example embodiments, the core network 130 includes a core network slice manager 140 for implementing (and optionally managing) core network slicing. As shown in FIG. 1, Core Network 130 has four illustrates slices CN Slice 1 132, CN Slice 2 134, CN Slice 3 136 and CN Slice 4 138. These slices can, in some embodiments, appear to the RAN as distinct Core Networks. The UEs 110 may include any client devices, and may also be referred to as mobile stations, mobile terminals, user devices, client devices, subscriber devices, sensor devices, and machine type devices for example.

Next generation wireless networks (e.g. fifth generation, or so-called 5G networks) are likely to support a flexible air interface in RAN 125 that allows for the use of different waveforms, and different transmission parameters of each of the waveforms (e.g. different numerology for some of the supported waveforms), different frame structures, as well as different protocols. Similarly, to take advantage of a large number of APs 105, which may take the form of both macro and pico-cell sized transmission points operating in different frequency bands, it is possible that a 5G network will group a series of APs 105 to create a virtual transmission point (vTP). The coverage area of a vTP may be referred to by some as a hyper-cell. By co-ordinating the transmission of signals from the APs 105 in the virtual TP, the network 125 can improve capacity and coverage. Similarly, a grouping of APs 105 can be formed to create a virtual receive point (vRP) that allows for multipoint reception. By varying the APs 105 in the virtual groups, the network 100 can allow the virtual TP and RP associated with an UE 110 to move through the network.

From the perspective of a network operator, deploying network infrastructure can be very expensive. Maximizing the utilization of the deployed infrastructure, and the wireless resources, is of importance to allow network operators to recover their investments. The following disclosure provides systems and methods for enabling network slicing at the radio edge of RAN 125, and for facilitating routing of traffic between slices of the radio edge of RAN 125 and core network 130, which may also be sliced. In some examples, this can enable an end-to-end network slice, and allows network operators to then divide the network and provide service isolation in wireless connections within a single network infrastructure.

Figure 2:
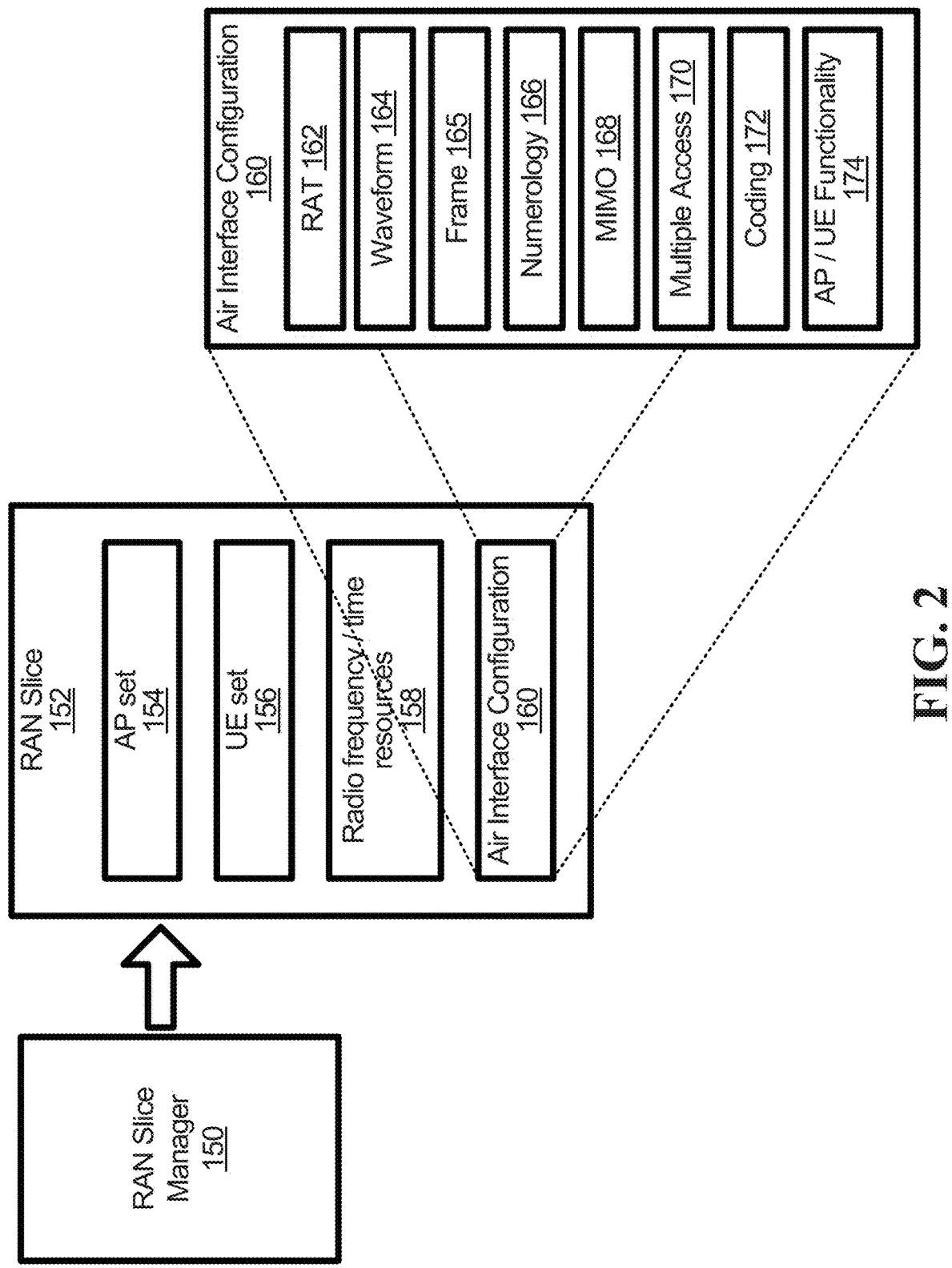
FIG. 2 is a schematic diagram illustrating an example set of parameters that are defined by a RAN slice manager for a service specific RAN slice instance according to example embodiments.

Referring to FIG. 2, in example embodiments the RAN slice manager 150 is configured to create and manage RAN slices 152. Each of the RAN slices 152 have a unique allocation of RAN resources. The RAN resources that are available for allocation can be categorized as: RAN access resources, which include the AP's 105 and UEs 110;

radio resources, which include:

wireless network frequency and time (f/t) resources 158, and spatial resources based on the geographic placement of APs 105 associated with the slice and based on the directionality of transmissions if advanced antenna technologies are applied; and radio air interface configurations 160 that specify how the radio resources and the access resources interface with each other.

The radio air interface configuration 160 can, for example, specify attributes in one or more of the following categories: the radio-access technology 162 to be used for the slice (e.g. LTE, 5G, WiFi, etc.); types of waveform 164 to be used (e.g. orthogonal frequency division multiple access (OFDMA), code division multiple access (CDMA), sparse code multiple access (SCMA) etc.); numerology parameters 166 for the specified waveforms (e.g. subcarrier spacing, transmission time interval length (TTI), cyclic prefix (CP) length, etc.); frame structures 165 (e.g. UL/DL partition configuration for TDD system), applicable multiple-input-multiple-output (MIMO) parameters 168; multiple access parameters 170 (e.g. grant/grant free scheduling); coding parameters 172 (e.g. type of error/redundancy coding scheme); and functionality parameters for APs and UEs (e.g. parameters governing AP handover, UE retransmission, UE state transition, etc.). It will be appreciated that not all embodiments may include the entire list of radio transmission functions describe above, and in some cases there may be overlap in some of the categories stated above—for example a specific waveform may be inherently defined by a specified RAT.

In example embodiments, the RAN slice manager 150 manages the allocation of RAN resources for the specific RAN slices 152 and communicates with resource allocation manager 115 and scheduler 120 to implement service specific RAN slices 152 and to receive information about RAN resource availability. In example embodiments, the RAN slice manager defines the RAN resources for RAN slices 152 based on slicing requirements received from the core network 130, and in particular the core network slice manager 140.

RAN slices are each instances that can be set up and maintained for varying durations, ranging from long term instances that may be set up and maintained indefinitely, to temporary RAN slice instances that may last only momentarily for a specified function.

In example embodiments, RAN slice manager 150 is configured to implement RAN slicing to affect one or more of the following functions: service isolation within a carrier, dynamic radio resource allocation taking slices into account, a mechanism for a radio access network abstraction, per-slice based cell association, a handover mechanism at the physical layer and a per-slice state machine. Those skilled in the art will appreciate that this list is neither exhaustive nor is it essential to have all the features to provide RAN slicing. RAN slicing in respect of these functions will now be described in greater detail.

In at least some examples, the RAN slices 152 are each associated with a specific service. In another embodiment, any or all of the RAN slices 152 can carry traffic associated with a set of services. Services which would require a RAN slice 152 with similar parameters and characteristics can be grouped together on a single slice to reduce the overhead of creating distinct slices. The traffic associated with the different services can be differentiated through the use of service identifiers, as will be well understood. As illustrated in FIG. 2, RAN slice 152 will be associated with a set of APs 105 nodes (AP set 154) and a set of receiving UEs 110 (UE set 156) communicating with each other using specified air interface configuration 160 and a set of radio frequency/time resources 158. The UEs 110 within UE set 156 are typically the UEs that are associated with services within the slice 152. By creating a slice, a set of resources is allocated, and the traffic in the slice is contained such that different services that use the RAN 125 can be isolated from each other. In this regard, in example embodiments, isolation means that communications that occur in respective contemporaneous RAN slices will not affect each other, and additional RAN slices can be added without impacting the communications occurring in existing RAN slices. As will be explained in greater detail below, in some example embodiments isolation can be achieved by configuring each RAN slice 152 to use a different air interface configuration 160 (including waveform numerology 166). By selecting an air interface configuration 160 based on the requirements of the slice, it may be possible to improve the performance of the slice, or to reduce the impact of the resource usage of the slice, this may be achieved through the use of waveforms that have better spectrum localization. For example, sub-band filtering/windowing can be applied at a receiver to reduce interference between adjacent sub-bands that apply different numerologies. As will be discussed further below, different RAN slices 152 can be associated with different sets of physical transmit and receive nodes.

Accordingly, those skilled in the art will appreciate that although slices can be differentiated by the allocated by radio time/frequency resources 158, they could also be differentiated by the assigned air interface configuration 160. For example, by allocating different code based resources 172, different slices can be maintained separately. In access technologies that make use of different layers, such as Sparse Code Multiple Access (SCMA), different layers can be associated with different slices. Slices may be separated from each other in a time domain, a frequency domain, a code domain, a power domain, or special domains (or any combination of the above).

In some embodiments, allocating a set of time/frequency resource pairings 158 to the slice allows the traffic intended for the slice to be transmitted over dedicated radio resources. In some embodiments, this could include the allocation of an entire frequency band at fixed time intervals to a slice, or it could include allocation of a dedicated subset of the available frequencies to the slice at all times. Both of these can provide service isolation, but they may be somewhat inefficient. Because such a scheduling of resources is typically predefined, there may be long periods of time between redefinition of the resources during which the allocated resources are not fully used. The redefinitions cannot be too frequent if there are devices that have long periods of being idle, or these devices would have to frequently re-connect to the network to obtain this information. Accordingly, in example embodiments, service isolation over a common carrier (for example within the same carrier frequency) allows independent co-existence of multiple services within the same carrier. Physical and other resources can be dedicated on slice by slice basis within a set of dedicated slice resources. As noted above, in 5G networks, it is anticipated that a number of different protocols and waveforms, some of which may have a number of different numerologies, can be supported.

In some examples, resource allocation manager 115 includes a slice-aware air interface configuration manager (SAAICM) 116 that controls AP 105s based on the air interface configuration assignments made to the RAN slices 152 by RAN slice manager 150, thus allowing a waveform and numerology to be dedicated to a slice 152. All nodes (AP's 105 or UEs 110) transmitting data in the slice are then allocated transmission resources by network scheduler 120, based on the network f/t resource parameter set assigned by at least one of RAN slice manager 150, and the nodes transmitting within the allocated AP resources 154 and UE resources 156. This allows a network entity or entities such as the RAN slice manager 150 and resource allocation manager 115 to adjust the resource allocation dynamically, as discussed in greater detail below. The dynamic adjustment of resources allocations allows a slice 152 to be provided a minimum level of service guarantee without requiring that the resources used to provide this level of service are dedicated exclusively to the slice. This dynamic adjustment allows resources that would otherwise be unused to be allocated to other needs. Dynamic dedication of the physical resources may allow a network operator to increase the usage of the available nodes and wireless resources. A network entity or entities, such as the RAN slice manager 150 and resource allocation manager 115 can assign parameters to each slice based on the requirements of the service supported by that slice. In addition to the service isolation discussed above, the generation of a slice specific to a service (or a class of services) allows for the RAN resources to be tailored to the supported services in some embodiments. Different access protocols can be offered for each slice, allowing for example, different acknowledgement and re-transmission schemes to be employed in each slice. A different set of Forward Error Correcting (FEC) parameters can also be set for each slice. Some slices may support grant free transmissions, while others will rely on grant based uplink transmissions.

Accordingly, in some example embodiments the RAN slice manager 150 is configured to enable service isolation by differentiating the air interface configuration 160 for each service-centric RAN slice 152. In at least some examples, the differentiation amongst the attributes of different air interface configurations 160 assigned by the RAN slice manager 150 to different RAN slices 152 can provide service isolation even when the other RAN slice parameter sets (for example one or more of the AP set 154, UE set 156, and Network f/t set 158) are similar.

Figure 3:
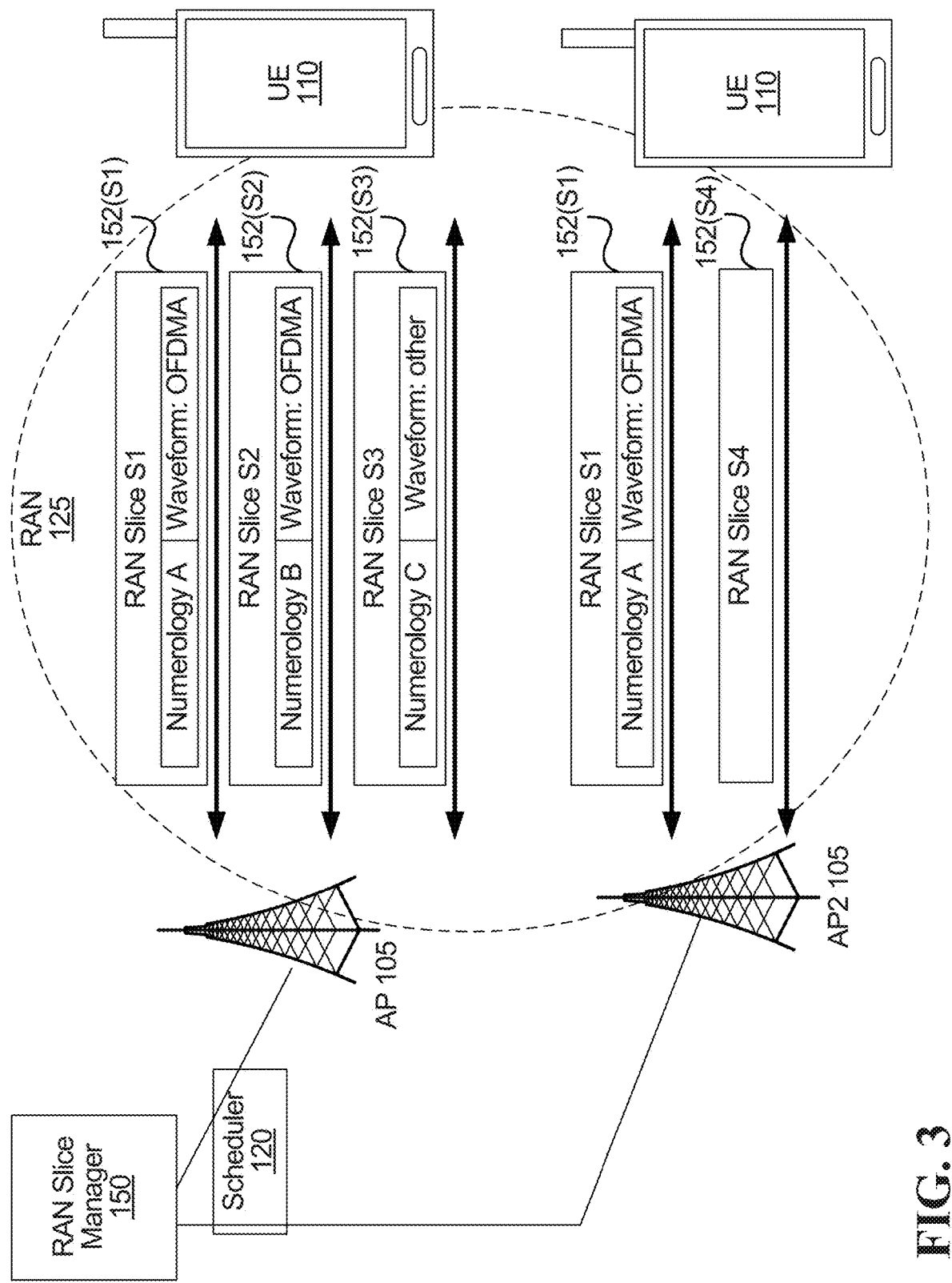
FIG. 3 is a schematic diagram illustrating an example of slice based service isolation in a RAN.

FIG. 3 illustrates an example of service isolation within a carrier. In particular, in the example of FIG. 3, three services S1, S2 and S3 are each assigned a respective RAN slice 152(S1), 152(S2) and 152(S3) by RAN slice manager 150 for use in a common frequency range allocation (common carrier) in which the RAN slices have been assigned adjacent frequency sub-bands in RAN 125. In the example of FIG. 3, the RAN slices 152(S1), 152(S2) and 152(S3) assigned to the three services S1, S2 and S3, all include identical allocations in respect of the AP set 154 and UE set 156, and having similar network f/t resources 158 with adjacent sub-band allocations. However, the air interface configurations 160 allocated to the three services S1, S2 and S3 are differentiated in order to provide service isolation, even though the services are intended to operate using similar carrier frequency resources (namely, adjacent sub-bands as specified in network f/t resources 158). In the illustrated example the differentiation is provided in one or both of the waveform 164 and numerology parameter 166 assignments. The numerology parameters define parameters of the specified waveform. For example, in the case of an OFDMA waveform, the numerology parameters include the sub-carrier spacing, the length of a cyclic prefix, the length of an OFDM symbol, the duration of a scheduled transmission duration and the number of symbols contained in a scheduled transmission duration.

Specifically, in the example of FIG. 3, RAN slice 152(S1) and RAN slice 152(S2) have each been allocated the same waveform function (OFDMA), but have each been allocated different numerology parameters (Numerology A and Numerology B, respectively) to apply to the waveform function. For example, Numerology A and Numerology B may specify different TTI lengths and subcarrier spacing for the respective OFDMA waveforms. The third RAN slice 152(S3) has been allocated a different multiple access function 170 (for example SCMA), and a set of numerology parameters suitable for the waveform associated with the different multiple access function (Numerology C).

In some examples, the different transmission function 160 parameters allocated to the different RAN slices may sufficiently distinguish the different services such that the RAN slices can be implemented in overlapping frequencies in overlapping times. However, in some embodiments, time differentiation may also be required, which may for example be implemented by scheduler 120.

In some example embodiments, service isolation can also be implemented through differentiation in the access resources allocated to different RAN slices. For example, the AP set 154 assigned to different RAN slices 152 can be sufficiently different that geographic isolation occurs. Also, as noted above, different network frequency/time resources 158 can be used to isolate different RAN slices.

In example embodiments, the parameters set for RAN slice instances can be dynamically varied based on real-time network demands and available resources. In particular, in example embodiments, RAN slice manager 150 is configured to monitor the real-time demands and available resources across RAN 125 and the RAN slices 152 and based on the monitored information and the performance requirements defined for specific services (for example the performance requirements set out in an SLA), the RAN manager 150 can re-define the allocations it has made in respect of the slices.

FIG. 3 further illustrates the presence of AP2 105 in RAN 125. AP2 105 serves a different UE 110 than is shown served by AP 105, and supports services in Slice 1152(S1) (which is one of the slices supported by AP 105), and Slice 4 152(S4). The parameters of Slice 4 152(S4) are not illustrated, but they should be understood to be different than those of Slice 1 152(S1). A UE 110 connecting to Slice 1 152(S1) can thus be served by either or both of AP 105 and AP2 105. It should also be understood that not all APs within a single RAN need to support the same set of slices.

Figure 4:
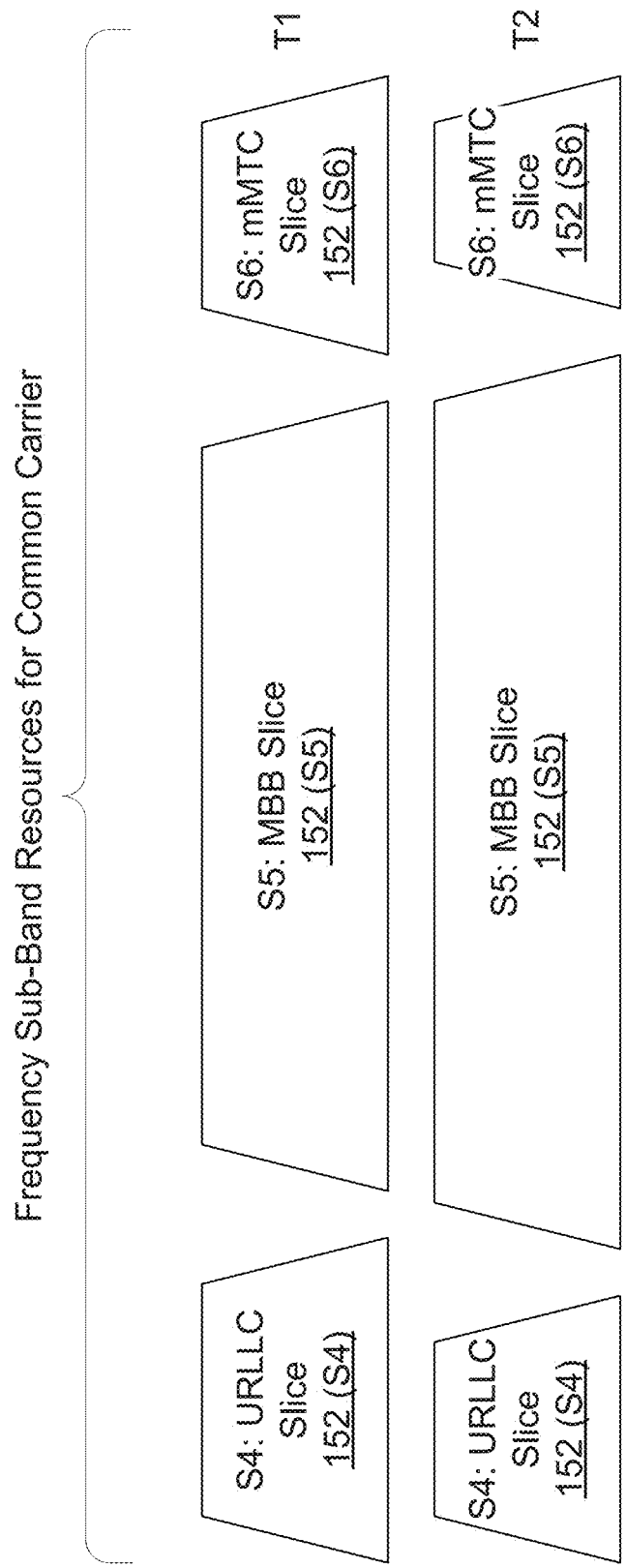
FIG. 4 is a schematic diagram illustrating dynamic slice allocations for different services on a common carrier according to example embodiments.

FIG. 4 schematically illustrates a set of RAN resources associated with a common carrier (for example RAN 125), and, in particular, radio frequency/time (f/t) resources. In the example of FIG. 4, resource allocation manager 115 allocates f/t resources, in accordance with instructions received from RAN Slice Manager 150, to slices 152(S4), 152(S5), and 152(S6) that are each associated with a specific service S4, S5 and S6, respectively. A service S4 may be directed towards ultra-low-latency-reliable communications (ULLRC) devices is allocated resources associated with ULLRC slice 152(S4), a service S5 for mobile broadband (MBB) is allocated resources associated with MBB slice 152(S5) and a service S6 for massive Machine Type Communications (mMTC) is allocated resources associated with mMTC slice 152(S6). As represented in FIG. 4, the allocation can be dynamic as the assignment of relative frequency resources within the common carrier RAN resources 200 can change from time T1 to time T2. Additionally, between times T1 and T2 different resource allocations for each slice 152 can be made by setting different radio air interface configurations 160 for each slice, including one or more of numerology, waveforms and protocols. Other RAN slice resource parameters, including for example physical access resources (AP set 154 and UE set 156), can also be allocated differently to the different slices between times T1 and T2. Although the frequency resources are illustrated as being continuous in FIG. 4, the frequency sub-bands assigned to the respective slices need not be continuous and within each slice 152 the assigned frequency sub band resources may be non-continuous. Although one MBB slice 152(S5) is shown in FIG. 4, there may be multiple MBB slices, as well as additional non-MBB slices. As will be appreciated from the above description, by using different numerologies, different waveforms and different protocols for different slices 152 (S4), 152(S5), and 152(S6), traffic from each slice 152(S4), 152(S5), and 152(S6) is effectively isolated. Functions and nodes within each slice (e.g. the devices (UEs 110) or entities (APs 105) that support the service associated with the slice) only know their own numerology, and this allows for isolation of their traffic. In example embodiments, in order reduce interference between the channel frequency resources assigned to different slices with different numerologies, sub-band filtering or windowing is applied at the receiving AP 105 or UE 110 to further enhance localization of the waveforms with different numerologies. In example embodiments, in order to accommodate varying levels of functionality at AP's 105 and UEs 110, the RAN slice manager may allocate sets of alternative air interface configurations 160 to each RAN slice 152, with the resource allocation manager 115 or AP 105 selecting the appropriate transmission functions at the time of transmission.

Radio f/t resources can be viewed as two dimensions in a resource lattice. In FIG. 4, the differing physical sizes of the blocks represent relative use of the radio resources in RAN 125 by services S4, S5 and S6 as dictated by the slice allocations made by RAN slice manager 150 and implemented by Resource Allocation Manager 115 and Scheduler 120. By using a scheduling method that allows for variations in the lattice assignments and different waveforms to be transmitting in different resource blocks in the lattice, dynamic allocation of the resources can be performed. A flexible lattice combined with the ability to assign different transmission function resources such as different waveforms with different numerologies, provides an added dimension of control. Radio f/t resource assignment can be changed dynamically according to the change of the loading of different slices.

One skilled in the art will appreciate that resources can be allocated to slices 152 to account for the very different traffic profiles that different slices may have. For example, mobile broadband (MBB) connections are sporadic, but very high volume, while Machine Type Communications (MTC) devices typically generate traffic profiles that have a large number of devices communicating small amounts of data at fixed intervals, or in response to an event, and devices connecting to a URLLC service generate high volume traffic that may be quite consistent over the limited time period in which they are active, and may be resource intensive due to the need for both low latency and reliability. Instead of dedicating resources to either ULLRC deployments, or to massive MTC deployments, resulting in unused resources when they are not generating traffic, the resources allocated to other services, such as MBB, can be increased while the URLLC and mMTC services are not consuming their allocation of resources. An example of such a change in allocation is illustrated in FIG. 2 in which the portion of resources 200 allocated to MBB slice 152(S5) is increased at time T2 relative to time T1, whereas the portion of resources 200 allocated to ULLRC slice 152(S4) and mMTC slice 152(S6) is decreased at time T2 relative to time T1. Different waveforms can be selected for different types of connections, and different numerologies for a single waveform can be used to differentiate between two slices serving similar connection types (e.g. two MTC services could both use the same waveform but with different numerologies) to maintain both service isolation and efficient use of the spectrum resources.

In at least some examples, RAN slices can be used to decouple UEs 110 from a physical AP 105 and provide a layer of radio access network abstraction. For example, different RAN slices 152 can be assigned different AP sets 154, such that UE 110 can maintain a first session for a first service with a first AP 105 using a first RAN slice 152(S1), and also maintain a second session for a second service with a second AP 105 using a second RAN slices 152(S2). Such a configuration allows APs that that are most suitable for the specific services to be used. It should be understood that a set of APs can be grouped together to form a virtual access point. The service area of the virtual access point can be represented as the union of the service areas of the constituent APs. The vAP can be assigned an AP identifier. The vAP can be specialized so that it is either a transmit or receive point (vTP, vRP). A plurality of different vAPs can have overlapping memberships so that each vAP is composed of a plurality of different physical APs, with some of the physical APs being part of different vAPs. Some vAPs may have identical memberships to other vAPs.

Figure 5:
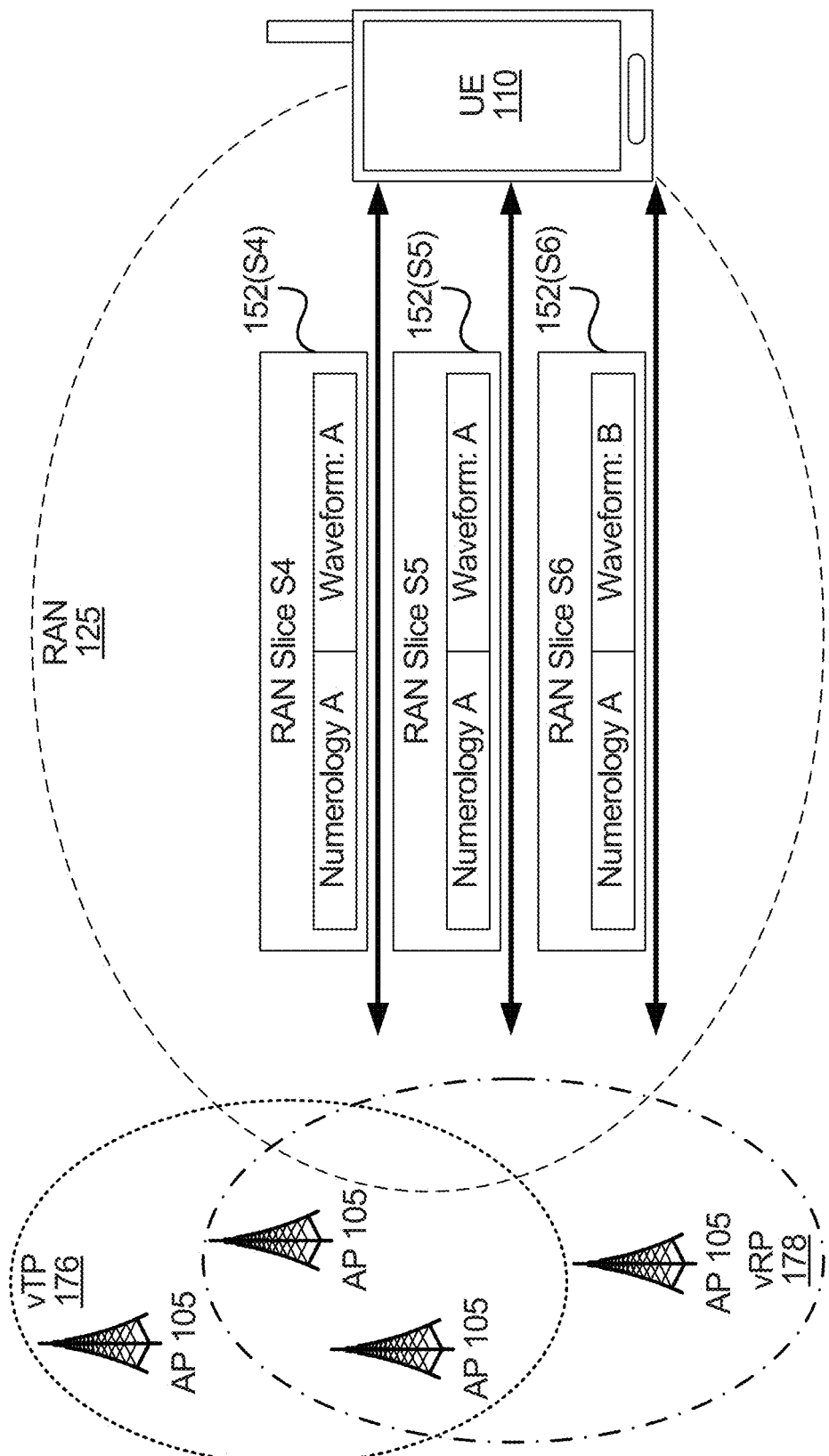
FIG. 5 is a schematic diagram illustrating a further example of slice based service isolation in a RAN.

In some embodiments, the RAN slice manager 150 may be configured to allocate both logical access resources and physical access resources to a RAN slice 152. For example, with reference to FIG. 5, there are a number of APs 105. Instead of each AP 105 operating independently, they can be used to create a virtual AP as discussed above. A virtual TP 176 and a virtual RP 178 can be created with differing, but overlapping sets of APs. Different vTPs and vRPs can be created for each slice. In addition to allocating different physical resources to a slice, the RAN slice manager 150 can allocate logical resources such as vTP 176 and vRP 178 to each slice. United States Patent Publication No. US2015/0141002 A1 entitled "System and Method for Non-Cellular Wireless Access"; United States Patent Publication No. US2014/0113643 A1 entitled "System and Method for Radio Access Virtualization" and United States Patent Publication No. US2014/0073287 A1 entitled "System And Method For User Equipment Centric Unified System Access In Virtual Radio Access Network", which are incorporated herein by reference, describe wireless networks in which UEs are associated with virtual TPs and RPs. In example embodiments, aspects of the virtualization and abstraction methodologies disclosed in these patent publications can be performed in respect of RAN slices to implement the slice specific virtualization and abstraction as described below.

In some embodiments, various devices (UEs 110) connecting to wireless network (RAN 125) will each participate in one or more different services (e.g. ULLRC service S4, MBB service S5, mMTC service S6), and each service can be assigned a different RAN slice 152. Resource allocation manager 115 can assign different slices to each virtual TP 176 or RP 178 to be adjusted along with demand. For example, a UE 110 that supports multiple services, such as both an MBB service, and an ULLRC service used to relay information such as that generated by a heart rate monitoring service, could transmit data associated with each of these services on different slices. Each slice could be assigned different encoding formats, and may be transmitted to the respective slices using different virtual RPs 178. The UE 110 could provide an indication of the slice 152 that is being used to the RAN slice 125 when there was data to transmit.

As a UE 110 moves, it may remain connected to the same virtual transmit point/receive point TP/RP 176,178, but the physical access points (APs 105) in the virtual access point TP/RP 176, 178 will change. Furthermore, as a UE 110 moves a greater distance, it may be possible that the physical AP or radio t/f resources initially used are no longer available to the RAN 125. This can happen when the UE 110 travels sufficiently far that the spectrum allocated to the slice by the carrier is no longer available, or it could happen if the network operator makes use of infrastructure owned by another entity in one area, and cannot access the same resources in another. In the latter case, it may also be that the particular waveform assigned to the slice 152 for the UE 110 to use while transmitting over the RAN 125 is no longer available. In such a case, resource allocation manager 115 can notify the UE 110 that the transmission parameters will change at a certain geographic point. This may, in some embodiments, be performed as part of a handover procedure. It should also be understood that when a virtual TP/RP 176,178, or other vAP, is associated with a UE 110 on a per-slice basis, there may be occasions in which a handover occurs for one slice, but not another. This may occur in a number of different scenarios, including ones in which a UE 110 connects to a first service provider for a first service in a defined slice, and connects to a second service provider for a second service in another defined slice. In such a scenario, it is likely that the boundaries between APs or vAPs will vary between the service providers. In a scenario in which both services are provided through the same provider (or at least access services are provided by the same provider), boundaries between APs that are slice specific may not align, which will result in a per-slice handover.

In some examples, waveform parameters 164 could be changed when a UE 110 is handed over to (or otherwise served by) a different TP 170 operating in different frequency bands. A RAN slice 152 may have two alternative TPs 176 assigned to it for serving a UE 110, with one TPs 176 operating in a high frequency band, such as the mm band, and the other TP 176 operating in a lower frequency. The switch between different frequency bands, and corresponding switch between the APs used to serve the UE 110 for the slice 152, can be dynamic depending on a scheduling decision made at scheduler 120 and implemented by resource allocation manager 115.

By having the UE 110 connect to virtual access points TP/RP 176,178, the UE 110 can be logically decoupled from the actual physical infrastructure. This can mitigate problems associated with cellular handover, and cell edge interference. Different sets of physical APs 105 can be allocated to the virtual TPs 176 and virtual RPs 178, so that different slices can be served by different sets of hardware resources. This could allow a network operator to dedicate expensive and high capacity access points to services such as MBB, and lower cost APs 105 to services such as MTC services. Additionally, allocating TPs 176 and RPs 178 as separate logical entities can be used to decouple the Uplink and Downlink data paths, which may, in some circumstances, allow for better usage of the network infrastructure. If a given RAN slice 152 is dedicated to MTC devices that generate uplink traffic at fixed intervals, but are rarely sent any downlink traffic, the slice can be served by a set of virtual RPs 178 that is designed to be more robust than virtual TPs 176. This allows for resource allocation to serve the needs of service assigned to the RAN slice 152, to a finer grained level than would be possible if APs are assigned in their entirety (as would be required in a conventional LTE network where an eNodeB would be allocated and would provide bi-directional service).

The creation of virtual TPs 176 and RPs 178 may also be referred to as the generation of a hypercell. A hypercell allows for multiple physical APs 105 to work together to serve a UE 110. The hypercell can be associated with both a UE 110 and a RAN slice 152. This allows for a UE 110 to communicate with different hypercells in each slice. Each hypercell can then be configured for the specific needs of the slice that it is associated with. For example a UE 110 may communicate with a first hypercell (TRP) in respect of one first service-centric RAN slice 152(S4), and with a second hypercell for traffic associated with a second service-centric RAN slice 152(S5). The slices that carry traffic associated with an MTC service may be directed to serving stationary MTC devices (in the case where UE 110 is an MTC device). A slice dedicated to stationary MTC devices can be designed to be stable and relatively unchanging in their membership. Other slices, such as those dedicated to mobile MTC devices, such as intelligent traffic systems devices, and other such mobile services, can be configured to accommodate greater mobility. The slice that supports stationary MTC devices may also be designed to have limited function in the mobility management function (e.g. a Mobility Management Entity), due to the limited mobility of the supported devices. It should be understood that although the use of hypercells allows for a reduction in the number of handovers, handovers may not be completely eliminated. Handovers may happen when the waveform and numerology assigned to a slice in the hypercell are not available or supported at all points along the path of a mobile UE. By requiring a handover to a new hypercell, the network may be able to ensure that the new slice specific information is transmitted to the UE 110.

As noted above, when different hypercells are used to serve different slices, a UE 110 may undergo a handover in a first RAN slice 152, without necessarily having to undergo a handover in another RAN slice 152. In some examples, RAN 125 may encompass network resources that are allocated among multiple network operators, with the different network operators each supporting different hypercells. Because they are served by different hypercells, different network operators can provide service support to the same UEs 110 for different service-based RAN slices 152. This allows network operators to provide different services, and for customers (either users or service operators) to select different network operators for different RAN slices 152 based on cost, coverage, service quality and other factors. Accordingly, in some examples, a UE 110 accesses a first service using a first RAN slice 152 that supported by a first network operator, and the same UE 110 can then access a second service using a second RAN slice 152 that supported by a second network operator.

Figure 6:
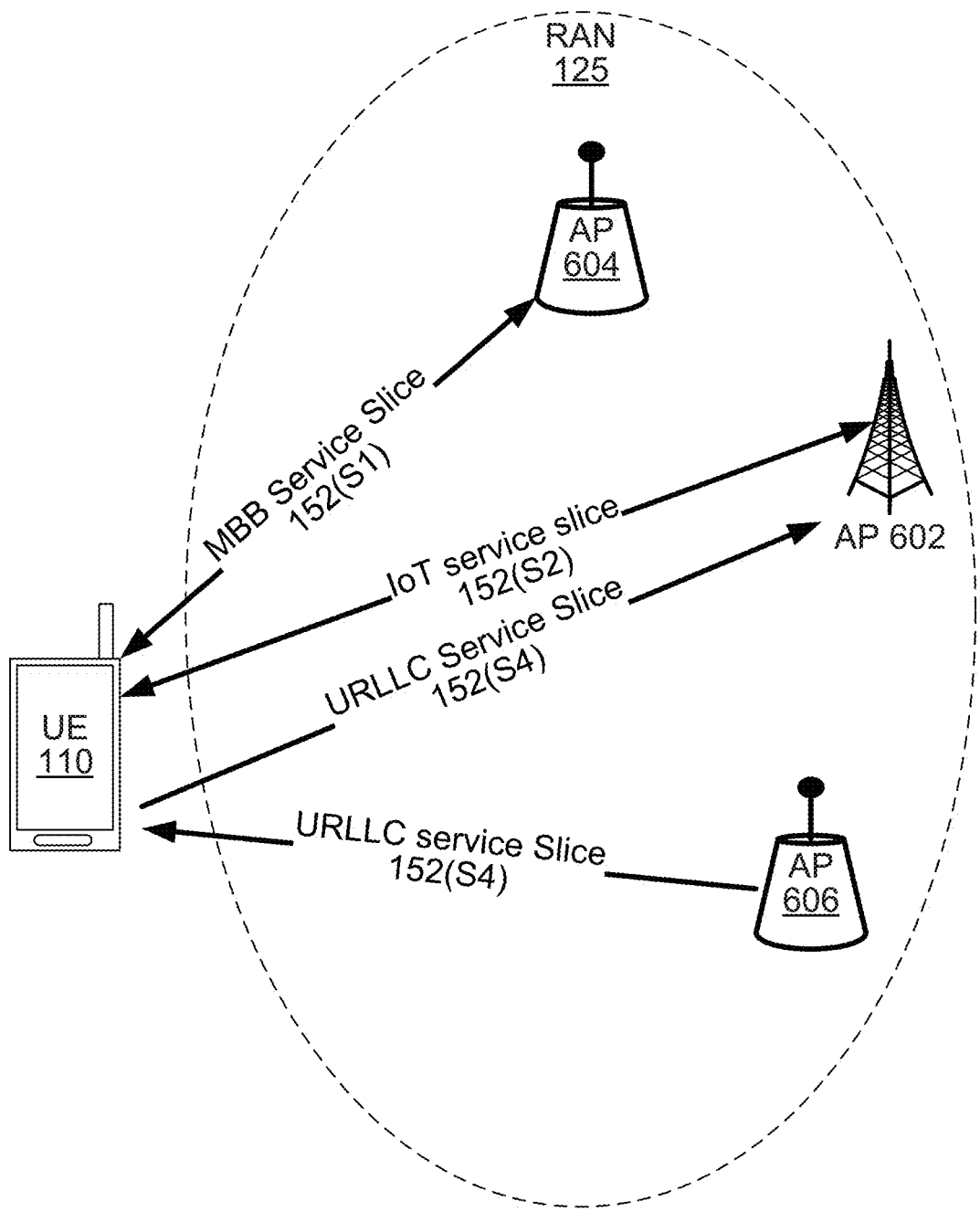
FIG. 6 is a schematic diagram illustrating a UE connecting to multiple slices over different access technologies.

Another example of the assignment of different access resources to different slices 152 will now be described with reference to FIG. 6. As discussed above, and as shown in FIG. 6, a single UE, such as UE 110 can connect to different access points (both physical and virtual) for different services. Although APs 602, 604 and 606 are illustrated as physical APs, it should be understood that they can also represent a virtual AP with several constituent APs. In some examples, RAN 125 is a heterogeneous network with different types of APs, and possibly supporting different RATs. AP 602 is an access point, also referred to as a macrocell, that can provide a wide coverage area, and typically provides access services in lower frequency bands. AP 602 would typically connect directly to the core network 130 and support a set of RATs (for example HSPA, LTE, 5G). Access points 604 and 606 can be APs directed to providing a smaller coverage area, and often referred to as small cells, picocells, and/or femtocells. APs 604 and 606 may connect to the core network 130 indirectly (for example through the Internet, through UE's that serve as relay devices, or through a fixed wireless connection to AP 602). In some implementations, AP 604 and 606 may connect directly to the core network. APs 604 and 606 may provide service in higher frequency band, such as mmWave, and/or they may support a different set of RATs (for example WiFi or access technologies dedicated to higher frequency APs). As shown in FIG. 6, where a heterogeneous network is available, different access technologies, or different waveforms, can be used, in conjunction with different access points, for access to different slices. The UE 110, when in the service range of AP 604, may rely upon AP 604 to an MBB slice 152(S1). This may provide the UE 110 with higher speed or lower cost connectivity, and it may remove a high bandwidth connection from a larger AP such as AP 602. UE 110 may also connect to an IoT service for an MTC function. MTC connections may be served by an IoT slice 152(S2) that is accessed through AP 602 (which provide macrocell coverage). Macrocell coverage is often more ubiquitous, and can better support a larger number of devices at a given time than smaller APs such as AP 604. This increased coverage and ability to support a larger number of devices may come at the expense of lower data rates in comparison to smaller access points 604. As MTC devices often require low bandwidth connections, a large number of them may be serviced in IoT service slice 152(S2) through a connection to AP 602. UE 110 may also participate in a service that requires a URLLC connection, which is supported by URLLC service slice 152(S4). Downlink traffic in the URLLC slice 152(S4) may be transmitted in a high-frequency band by AP 606 which acts as a TP. However, to ensure that uplink traffic is reliably delivered, and is not subjected to handover between a large number of APs with smaller coverage areas, the uplink traffic in this slice can be directed to AP 602. It should be understood, that each AP may be represented by a virtual representation within each slice, so that uplink traffic in slice 152(S4) and uplink traffic in slice 152(S2) are sent to different logical vRPs, each of which are representations of the same physical AP. In 3G/4G networks, a UE 110 is typically connected to one RAN access point at a time, and all services are routed over the same connection. By supporting simultaneous connections to different access points (both real and virtual), different slices can be isolated across the common access medium. It will be understood by those skilled in the art that different waveforms can be used by the different slices (e.g. one slice may use an Orthogonal Frequency Division Multiple Access (OFDMA) waveform, while a second slice uses another waveform, such as a Sparse Code Multiple Access (SCMA) waveform), or both slices could use the same type of waveform with different numerologies (e.g. both could use OFDMA, but with different spectrum masks, different resource block sizes etc.). It will also be understood that the TTIs for each slice can be different, but in some embodiments will be multiples of a base TTI value.

In example embodiments, RAN slice manager 150 will allocate one AP set (or TP/RP sets) and a corresponding RAT or set of RATs to a first RAN slice 152, and different AP set (or TP/RP sets) and corresponding RAT or set of RATs to a second RAN slice. In some examples, overlapping sets of physical or virtual access points may be allocated to each RAN slice, but with different use priorities. For example MBB service slice 152(S1) will be allocated access points 604 as its primary RAN access with macro access points 602 as a backup; conversely IoT service slice 152(S2) will be allocated only macro access points 602 for its RAN access.

As described above, in at least some examples, each RAN slice 152 will effectively operate as a distinct virtual network, indistinguishable from a physical network to most network nodes. In some embodiment, each RAN slice 152 can provide network resources tailored to the needs of the service that operates within it. This may include the provision of both data and control planes in the network too. Each slice may be provisioned with a number of network functions that may operate as state machines. A scheduler may be represented as a state machine within a slice to provide scheduling in grant-based and grant-free transmission environments. In a slice, it may be determined that grant-based transmissions will be used for transmission (e.g. a slice that supports MBB), while another slice may allow for grant free transmission (e.g. slices that support MTC or Internet of Things (IoT) devices). It is also possible for a slice to accommodate both grant free (or contention based) and scheduled uplink transmissions. In some implementations, the differing demands on the schedulers may result in the demands on a scheduler being very sufficiently different between slices that it may be advantageous for each slice to have its own scheduling function (or set of functions). This could be provided by a single scheduler that is represented within each slice as a logical scheduling state machine. Those skilled in the art will appreciate that the access parameters, the waveform, numerology and other slice specific parameters can be managed by the different state machines in either of the UE and network entities associated with the slice. Thus, a UE that is connecting to multiple slices may serve as a platform for multiple state machines.

A UE 110 that connects to different slices may support a different set of state machines for each slice that it connects to. These state machines will preferably run simultaneously, and there may be an arbitrator to ensure that contention for access to physical resources in the UE is handled. The different state machines within a UE may result in a UE that performs both grant free and scheduling based transmissions. There may also be, within a UE, a function that serves to coordinate the operation of the plurality of state machines.

Examples of state machine enabled UEs 110 and supporting networks are described in United States Patent Publication No. US2015/0195788 A1 entitled "System and Method For Always On Connections in Wireless Communications System", United States Patent Publication No. US 2016/0227481A1 entitled "Apparatus And Method For A Wireless Device To Receive Data In An Eco State", and U.S. patent application Ser. No. 15/165,985, entitled "System And Method Of UE-Centric Radio Access Procedure" all of which are incorporated herein by reference. In example embodiments, the state machine related functionality described in the above documents are implemented at the UE 110 and the network on a slice by slice basis rather than on a device level basis. By way of example, in one embodiment RAN 125 and UE 110 are configured to support different operating states for UE 110 in respect of each RAN slice 152(S1) and 152(S2), with each operating state supporting different UE functionality. In particular, in one example the UE 110 is configured to implement a state machine that can transition between two different states in respect of each RAN slice 152(S1) and 152(S2), namely a first "Active" state and a second, energy economizing, "ECO" state. In example embodiments, a reduced set of radio access functionality is supported in the ECO state compared to the Active state. At least some degree of connectivity to RAN 125 is supported in both states, such that UE 104 maintains an always-on connection to the RAN 125 in respect of both RAN slice 152(S1) and second RAN slice 152(S2). In some embodiments, the UE 110 is configured to receive both grant-free and grant based transmissions in the "Active" state, but only "grant-free" transmissions in the "ECO" state, and the UE 110 uplinks status information more frequently and on a different channel in the Active state relative to the ECO state.

Accordingly, a UE 110 that supports a per slice state machine can simultaneously operate in the same state for both RAN slices 152(S1) and 152 (S2) (for example Active state for both slices or ECO state for both slices) or in different states (for example Active state for one slice and ECO state for the other slice). In example embodiments, multiple states or different numbers of states may be supported for different RAN slices 152. In example embodiments, information defining if and what states are supported in a slice are specified in the AP/UE functionality parameter set 174 (see FIG. 2).

In another embodiment, a UE is connected to different RAN slices. The first slice can support a service such as eMBB, while the second supports a service that does not necessarily require the same level of connection reliability, such as an MTC service. While within the first slice, the UE may be in one of an Active or Idle state, within the MTC slice, the UE may be in any of an Active, Idle or ECO state. Normally, an MTC device may perform some grant-free or contention-based transmissions from an ECO state, and only enter the active state when there is a scheduled transmission window, or a pre-scheduled downlink transmission. The physical UE may allow for the MTC slice to perform transmissions without requiring transition out of an IDLE state, if it is in the active state within the eMBB slice. This can allow the MTC slice or process within the UE to take advantage of the active state of another portion of the UE.

It should be understood that although the above discussion has made reference to having a slice for each service, it may be more practical for the network to provide a limited number of slices, with each slice serving a number of different services that have sufficiently similar properties. In one example, a variety of different content delivery networks could co-exist in a single RAN slice.

Figure 7:
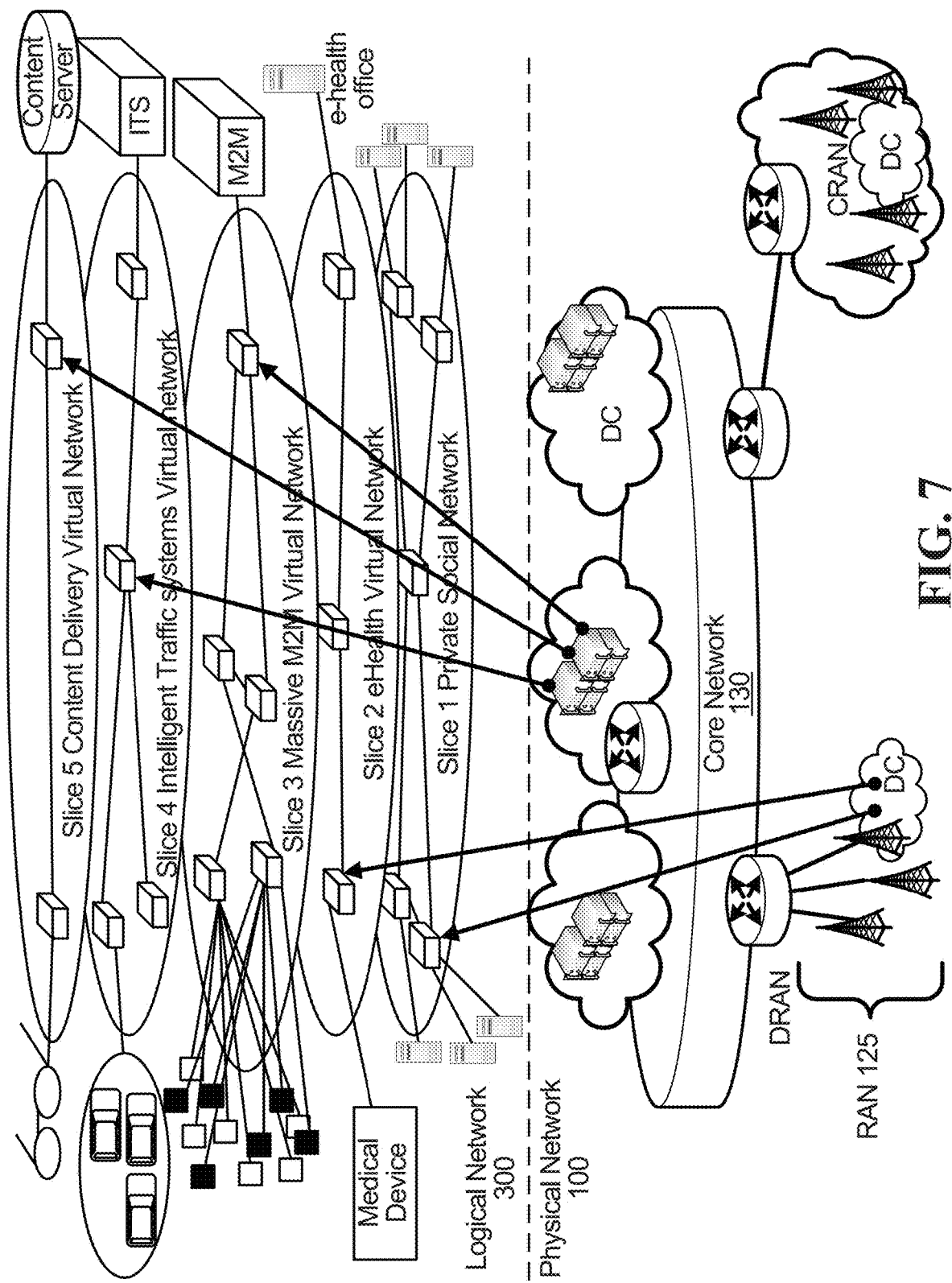
FIG. 7 is a schematic diagram, illustrating service customized virtual networks implemented using slices according to example embodiments.

In the core network, it may be possible to provide each of the network supported services with their own slice, and have this slice associated with a corresponding RAN slice such that end-to end slice management can be carried out under the control of slice manager 130. In this regard, FIG. 7 schematically illustrates a Service Customized Virtual Network (SCVN) implementation in which Slices 1-Slice 5 are each implemented as a virtual network that extends through core network 130 and RAN 125. In an example embodiment, slice manager 130 exchanges information with each of core slice manager 140 and RAN slice manager 150 to create end-to-end service-centric Slices 1-Slices-5. Each of Slices 1 to Slices-5 includes a resource set for the core network that defines an associated core network slice and a resource set for RAN 125 that devices an associated RAN slice 152.

In embodiments in which both core and RAN slicing occur, resource allocation manager 115 (under instructions from Slice Manager 130) can ensure that traffic received in a slice from RAN 125 is provided to a virtualized decoder that is connected to the corresponding slice in the Core network 130. This ensures that as data is received from a UE 110 device, isolation is maintained as the decoding can take place within the appropriate network slice instead of at the common radio access point.

Figure 8:
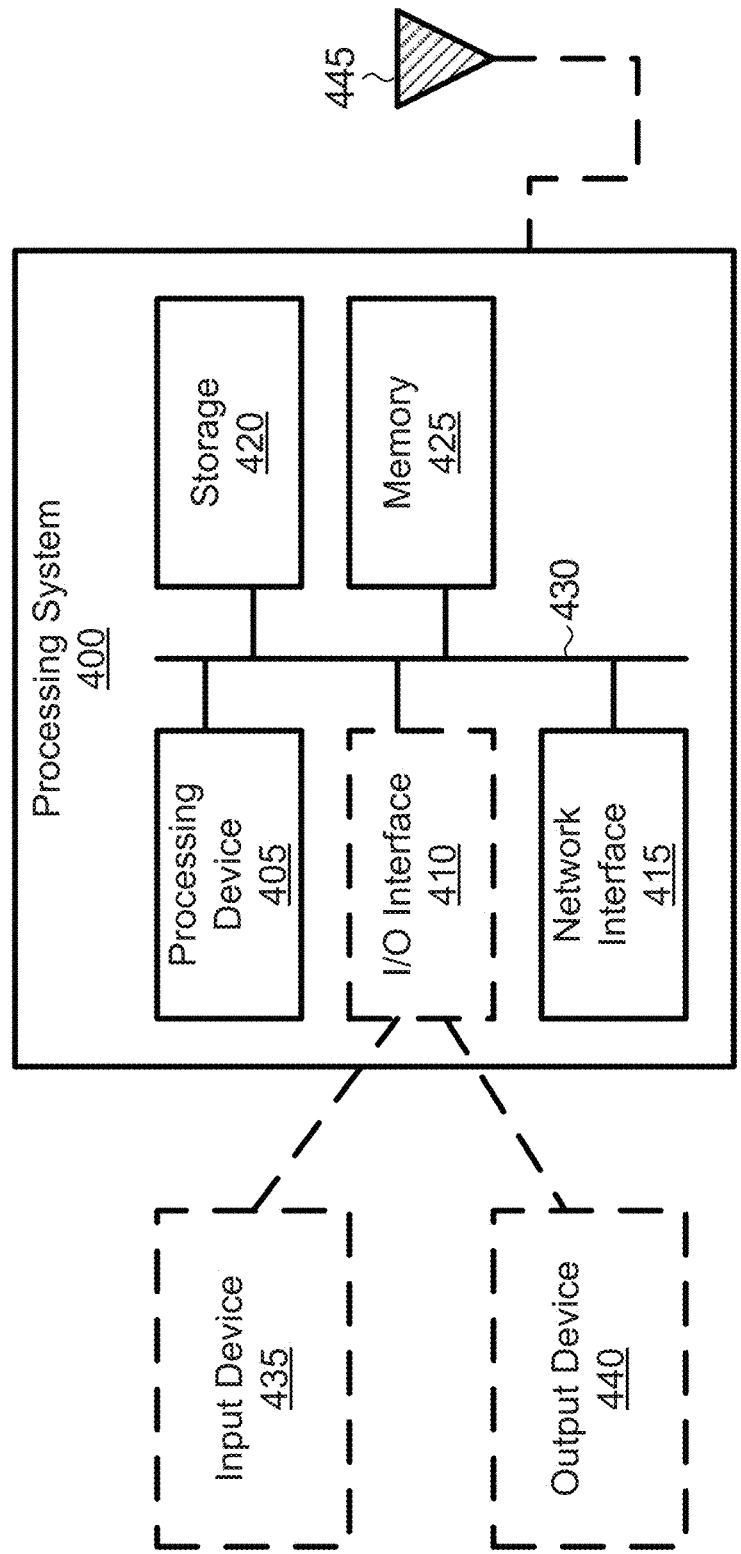
FIG. 8 is a schematic diagram of an example processing system suitable for implementing various examples described in the present disclosure.

FIG. 8 is a schematic diagram of an example simplified processing system 400, which may be used to implement the methods and systems disclosed herein, and the example methods described below. The UE 110, AP 105, Resource Allocation Manager, Scheduler 120, slice manager 130, core network slice manager 140 and/or RAN slice manager may be implemented using the example processing system 400, or variations of the processing system 400. The processing system 400 may be a server or a mobile device, for example, or any suitable processing system. Other processing systems suitable for implementing examples described in the present disclosure may be used, which may include components different from those discussed below. Although FIG. 8 shows a single instance of each component, there may be multiple instances of each component in the processing system 400.

The processing system 400 may include one or more processing devices 405, such as a processor, a microprocessor, an application-specific integrated circuit (ASIC), a field-programmable gate array (FPGA), a dedicated logic circuitry, or combinations thereof. The processing system 400 may also include one or more optional input/output (I/O) interfaces 410, which may enable interfacing with one or more appropriate input devices 435 and/or output devices 440. The processing system 400 may include one or more network interfaces 415 for wired or wireless communication with a network (e.g., an intranet, the Internet, a P2P network, a WAN and/or a LAN) or other node. The network interfaces 415 may include one or more interfaces to wired networks and wireless networks. Wired networks may use of wired links (e.g., Ethernet cable), while wireless networks, where they are used, may make use of wireless connections transmitted over an antenna such as antenna 445. The network interfaces 415 may provide wireless communication via one or more transmitters or transmit antennas and one or more receivers or receive antennas, for example. In this example, a single antenna 445 is shown, which may serve as both transmitter and receiver. However, in other examples there may be separate antennas for transmitting and receiving. In embodiments in which processing system is a network controller, such as an SDN Controller, there may be no wireless interface, and antenna 445 may not be present in all embodiments. The processing system 400 may also include one or more storage units 420, which may include a mass storage unit such as a solid state drive, a hard disk drive, a magnetic disk drive and/or an optical disk drive.

The processing system 400 may include one or more memories 425, which may include a volatile or non-volatile memory (e.g., a flash memory, a random access memory (RAM), and/or a read-only memory (ROM)). The non-transitory memories 425 (as well as storage 420) may store instructions for execution by the processing devices 405, such as to carry out methods such as those described in the present disclosure. The memories 425 may include other software instructions, such as for implementing an operating system and other applications/functions. In some examples, one or more data sets and/or modules may be provided by an external memory (e.g., an external drive in wired or wireless communication with the processing system 400) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 430 providing communication among components of the processing system 400. The bus 430 may be any suitable bus architecture including, for example, a memory bus, a peripheral bus or a video bus. Optionally input devices 435 (e.g., a keyboard, a mouse, a microphone, a touchscreen, and/or a keypad) and output devices 440 (e.g., a display, a speaker and/or a printer) are shown as external to the processing system 400, and connected to optional I/O interface 410. In other examples, one or more of the input devices 435 and/or the output devices 440 may be included as a component of the processing system 400. Embodiments in which processing system 400 is a network controller may lack a physical I/O interface 410, and instead may be a so-called headless server for which all interactions are carried out through a connection to network interface 415.

In example embodiments, a processing system 400 configured to implement RAN slice manager 150 may be configured to maintain information that specifies the resource allocations for each of RAN slices 152 in memory 425 or storage 420 or a combination thereof.

Figure 9:
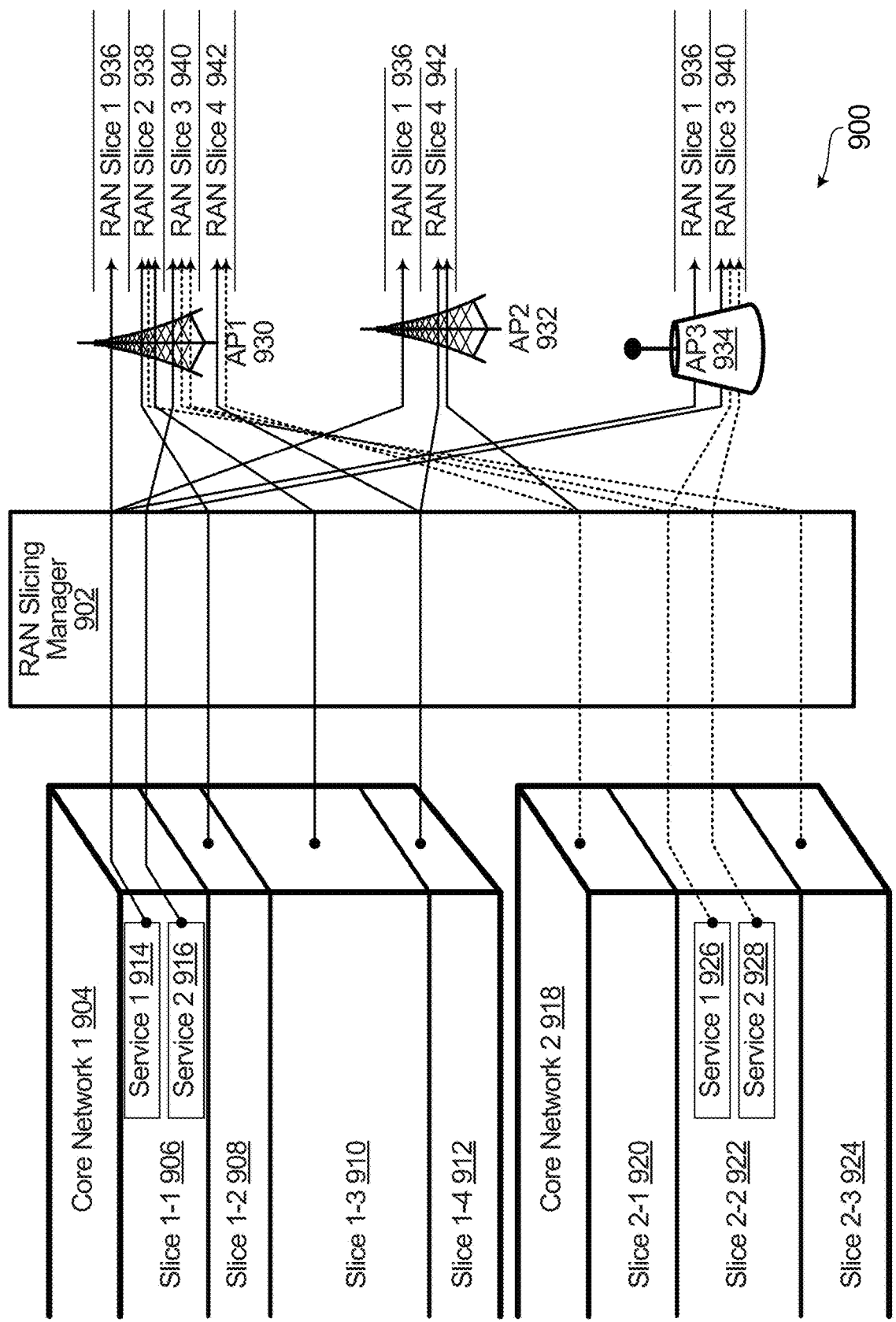
FIG. 9 is an illustration of an architecture for routing traffic from a Core Network Slice to a RAN slice in accordance with disclosed embodiments.

FIG. 9 illustrates an architecture 900 in which a sliced RAN interacts with a plurality of Core Network Slices. A RAN slicing manager 902 establishes traffic routes, and may be used to direct traffic from a CN slice to the appropriate TPs based on at least an identification of the CN slice, and in some cases in accordance with a service ID associated with a service carried by the slice. CN1 904 has been sliced to create 4 slices, slice 1-1 906, slice 1-2 908, slice 1-3 910 and slice 1-4 912. Each of the slices of CN1 904 carry traffic, and slice 1-1 906 is illustrated as carrying traffic associated with service 1 914, and service 2 916. CN2 918 has 3 slices, CN2-1 920, CN 2-2 922, and CN 2-3 924. Each slices carried traffic, and slice 2-2 922 is illustrated as carrying traffic for service 1 926 and slice 2 928. It should be understood that service 1 914 and service 1 926 are not necessarily the same service. If they each carry the same service ID, they may be differentiated based on the slice or even the CN from which they arrive. RSM 902 is illustrated as a discrete element for the purposes of ease of illustration in the figure. As will be apparent to those skilled in the art, the functions described can be incorporated into other elements, such as a set of routers that have been given routing instructions by an SDN controller.

Radio Access Nodes, such as base stations etc., have typically not performed slicing of the Radio interface. At best, static partitioning of time or frequency based resources has been employed to create virtual channels. As indicated above, slicing of the RAN can also be accomplished through the use of different waveforms, numerologies and transmission parameters. In a RAN, a plurality of APs may provide overlapping coverage areas. Some APs may be associated with all slices, other APs may be associated with a single slice, and still other APs may be associated with a subset of the slices. FIG. 9 illustrates 3 APs within the RAN, AP1 930, AP2 932 and AP3 934. As will be appreciated different types of AP can be used for different purposes. AP1 930 supports 4 different RAN slices, RAN slice 1936, RAN slice 2 938, RAN slice 3 940 and RAN slice 4 942. AP2 932 supports two of the four RAN slices, RAN slice 1936 and RAN slice 4 942. AP 3 934 supports RAN slice 1 936 and RAN slice 3 940.

As traffic from the two CNs, is received within the RAN, RAN slicing manager 902 directs traffic on the basis of the CN, CN slice and service, to the respective RAN slice. As illustrated, service 1 914 within slice 1-1 906 is directed to RAN slice 1 936. Thus traffic from this service can be sent to all three of AP1 930 AP2 932 and AP3 934. Traffic from service 2 916, which is also traffic from slice 1-1 906, is transmitted over RAN slice 3 940, so RAN slice Manager 902 directs this traffic to AP1 930 and AP 3 934. Those skilled in the art will appreciate that as discussed earlier different services may carry the same service ID if they are within different CN slices. This may be a result of different service providers not knowing the service ID values used in other slices. Because the slice ID and even in some cases a core Network ID can be associated with traffic, the RAN slicing Manager can ensure that service 1 926 carried within slice 2-2 922 can be routed to RAN slice 3 940. As a manner of aiding in visual distinction, traffic from CN 1 904 is shown traversing a path indicated by a solid line, while traffic from CN 2 918 is shown traversing a path indicated by a dashed line.

Traffic from slice 1-2 908 is carried by RAN slice 2 938; traffic from slice 1-3 910 is carried by RAN slice 2 938; traffic from slice 1-4 912 is carried by RABN slice 4 194. Traffic from slice 2-1 920 is carried by RAN slice 2 938; traffic from both services 926 and 928 within slices 2-2 922 is carried by RAN slice 3 940, and traffic from slice 2-3 924 is carried in RAN slice 2 938.

Figure 10:
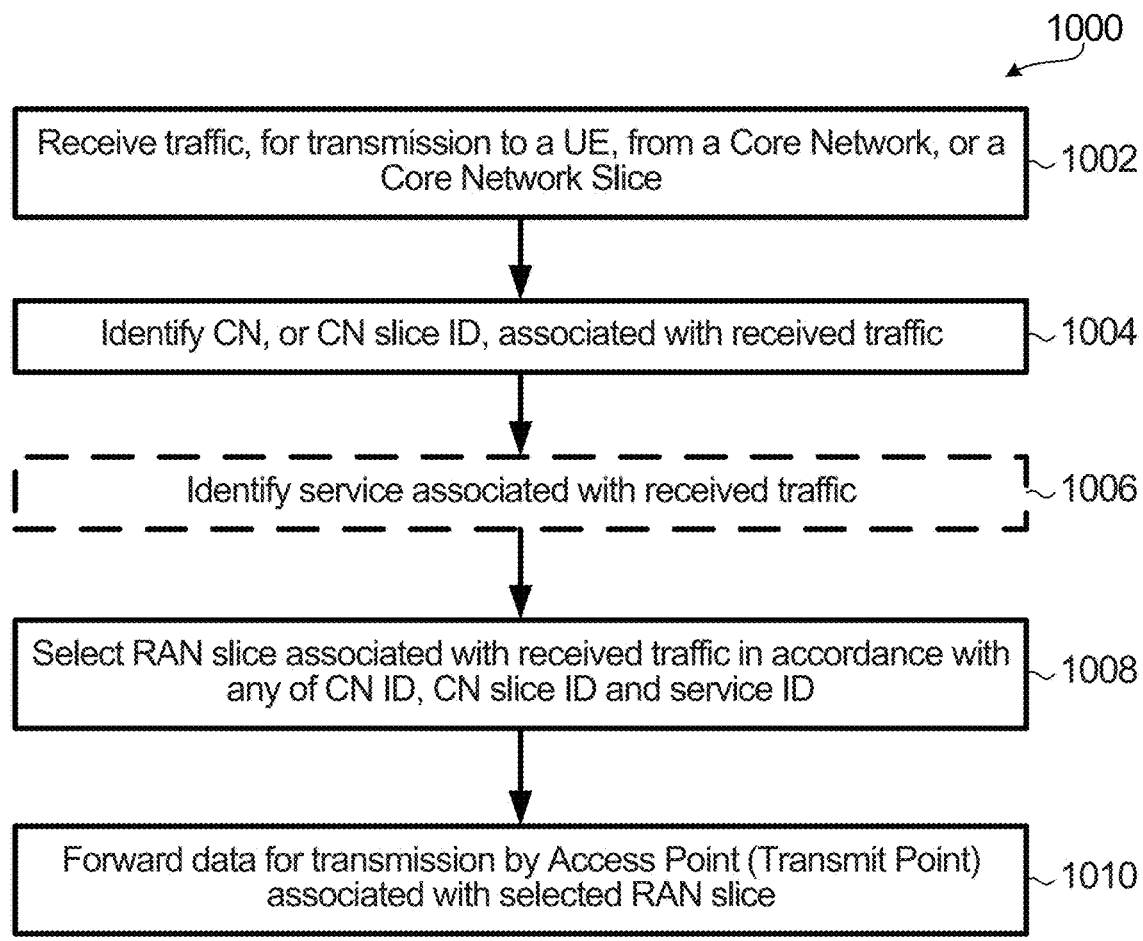
FIG. 10 is a flow chart illustrating a method for routing downlink traffic received from a core network slice to an AP in accordance with disclosed embodiments.

FIG. 10 is a flow chart illustrating a method 1000 of routing downlink traffic at an RSM. Those skilled in the art will appreciate that this functionality may be carried out by routers with a RAN under the instruction of a controller, such as a Software Defined Networking Controller. As illustrated, traffic is received for transmission to a UE in step 1002. This traffic is received from a core network, and may be associated with one or both of a CN slice and a service. Any of the CN and optionally CN slice associated with the received traffic is identified in step 1004. In step 1006 a service ID associated with the traffic can optionally be identified. As will be understood, in the network of FIG. 9, the service ID for traffic from slice 1-1 906 has to be identified so that it can be differentially routed, while the service ID for traffic from slice 2-2 922 is not necessarily required because traffic from both slices is routed to the same RAN slice. In step 1008, a RAN slice associated with the identified CN, CN slice, and service ID (as appropriate) is selected. Data for transmission to a UE is then routed to the appropriate TP (which may be an AP) in accordance with the identified RAN slice in step 1010. A RAN slice ID may be associated with the traffic so as to aid the TP with selection of the transmission parameters. In other embodiments, the TP can be left to determine which of the RAN slices it supports the traffic should be transmitted over. As will be well understood by those skilled in the art, mobile networks are typically designed to allow for mobility of the connected UE. Thus, routing data to the appropriate TP after selecting the RAN slice may include selecting a TP based on information provided by a mobility management function that tracks the location of the UE with respect to the topology of the network. In another embodiment, the TP may be a logical entity composed of a changing set of physical APs that are selected to track the location of the UE. In such an embodiment, the TP may be uniquely associated with a UE, and forwarding the data to a TP may be a function of selecting a TP associated with the UE and determining the set of APs currently associated with the TP. Data can then be transmitted (using any number of techniques including a multicast transmission) to the constituent APs within the selected TP.

Figure 11:
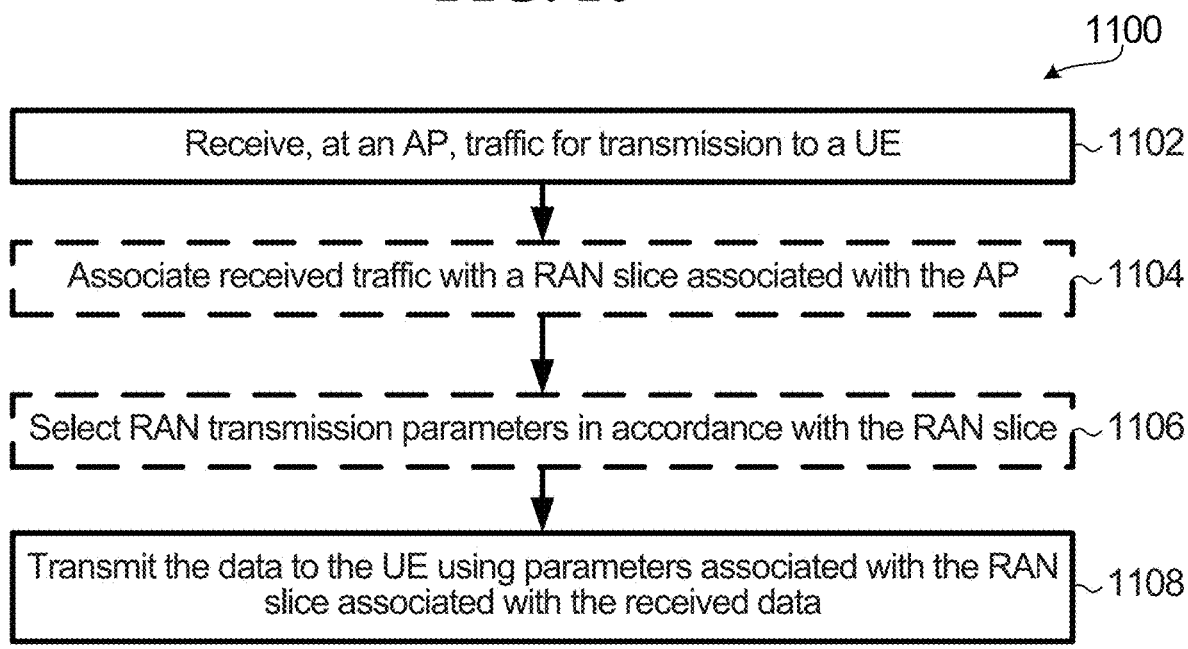
FIG. 11 is a flow chart illustrating a method for execution by an access point in accordance with disclosed embodiments.

FIG. 11 is a flow chart illustrating a method 1100 for handling downlink traffic at an AP (optionally a TP). Traffic for transmission to a UE is received at an AP in 1102. Optionally, the received traffic is associated with a RAN slice that is supported by the AP in 1104. This may have been previously performed in the RAN, in which case is does not need to be redone. The association with a RAN slice can be carried out in accordance with any number of different identifiers, including a core network ID, a core network slice ID, a service ID, or as will be discussed in FIG. 12 a tunnel ID or gateway address. In step 1106, the AP can select RAN transmission parameters in accordance with the RAN slice. If an AP only supports a single slice this step does not need to be performed, nor would it need to be performed if the parameters are otherwise provided to the AP. In step 1108, the data is transmitted to the UE using the parameters associated with the RAN slice that the data is associated with. As will be understood with reference to the above discussion, these parameters can include a specification of f/t resources, a waveform selection, numerology parameters and other such transmission characteristics.

Figure 12:
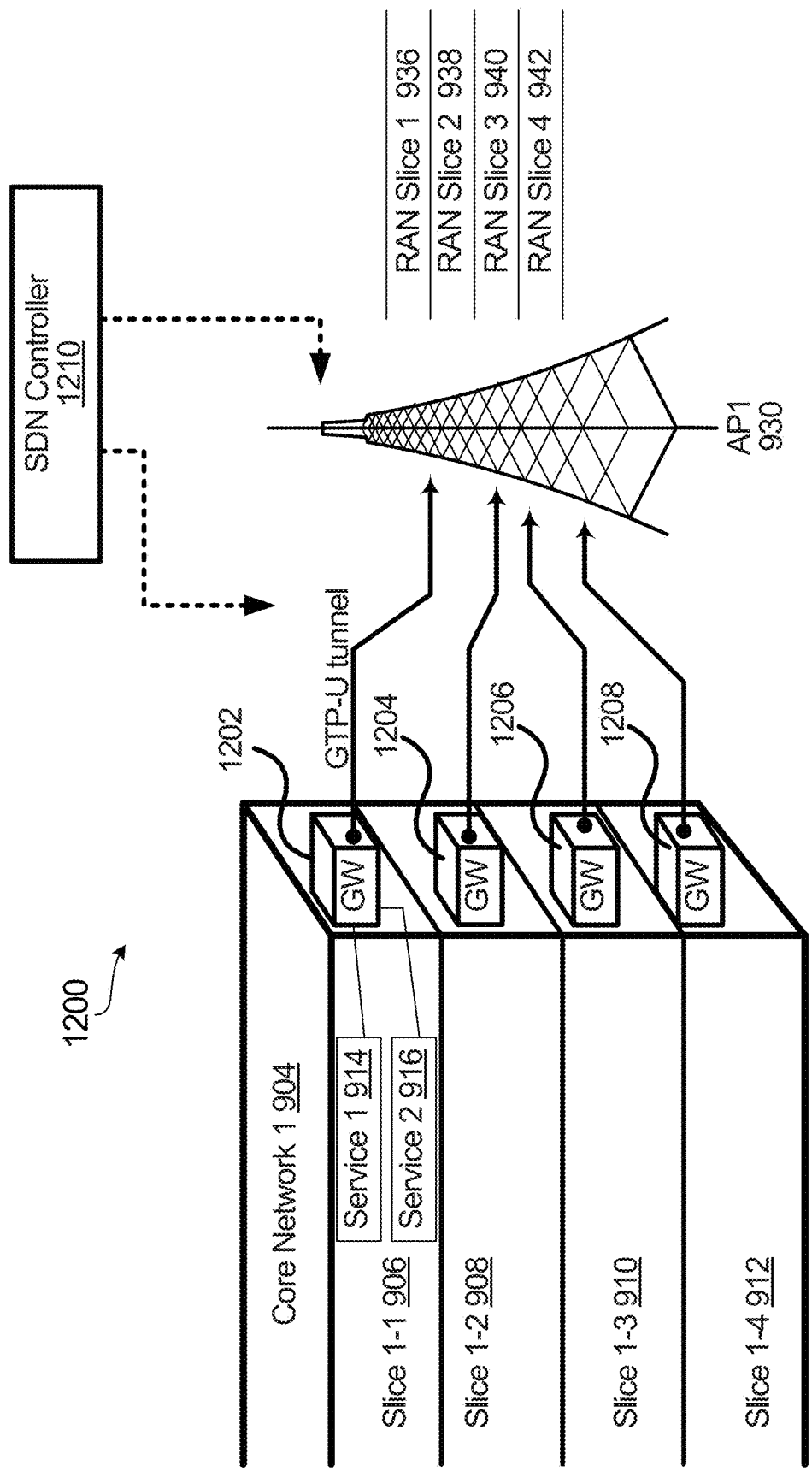
FIG. 12 is an illustration of an architecture, similar to that of FIG. 9, for routing traffic from a core network slice to a RAN slice in accordance with disclosed embodiments.

FIG. 12, illustrates an architecture 1200 associated with the network illustrated in FIG. 9. For ease of explanation, only a single CN is illustrated, and only a single AP is illustrated. CN1 904 is shown connecting to AP1 930. The RAN is sliced to provide RAN slices 1-4 as previously discussed in FIG. 9. It should be understood that within CN Slice 1-1 906 there is a gateway function 1202. This gateway 1202 is the connection points between slice 1-1 906 and the RAN. This means that all traffic from slice 1-1 906, including traffic associated with both service 1914 and service 2 916, will be sent to the RAN through GW 1202. Similarly, traffic from slice 1-2 908 will be sent through GW 1204, traffic from slice 1-3 910 will be sent through GW 1206 and traffic from slice 1-4 912 will be sent through GW 1208. In the terminology associated with current LTE networks, the traffic from a gateway is sent to AP1 930 using a GPRS Tunneling Protocol (GTP) tunnel, in this case because it is user plane traffic a GTP-U tunnel. This GTP-U tunnel has an identifier associated with it. The GTP-U tunnels, or their analog in future generations of networks, can be designed to route traffic to the APs that support the RAN slice that the CN slice and services are directed to. This setting up of the tunnels can be performed by a controller, such as SDN Controller 1210, and put into effect by transmitting instructions to routing functions within the RAN. Similarly, SDN controller 1210 can provide instructions to AP1 930 to allow it to select the appropriate RAN slice for received traffic in accordance with at least of a tunnel ID associated with the tunnel that the traffic is received over, and an address of the gateway that the traffic is received from. Where a GW or a tunnel is associated with a CN slice that supports services that are routed to different slices, the AP can be instructed to associate traffic based on the CN slice and the service ID (as indicated in FIG. 11 at step 1104).

In the uplink, it will be understood that a UE, such as UE 110 can have a plurality of different virtual machines, each of which is used for the services associated with a different RAN slice. This allows the UE to be associated with different vAPs for each slice, and further allows handovers to happen on a per slice basis. An AP, such as AP 1 930 will receive traffic associated with a RAN slice. This traffic will also carry an indication of the CN or CN slice with which it is associated, and may also include an indication of the CN service it is associated with. This information can be used by the AP to select any of the tunnels that the traffic is transmitted to, the GW to which the traffic is transmitted, and the CN or CN slice that the traffic is to be transmitted to. In accordance with this destination information, the AP can transmit the received data to the associated CN slice. It should be understood that in situations in which there is a one to one mapping between the RAN slice and a CN slice, the AP can direct traffic to a CN slice on the basis of the RAN slice over which it is received. Where a RAN slice supports traffic from a plurality of different CN slices, further information, such as a CN slice ID, or a unique service ID, can be used to make the determination.

Figure 13:
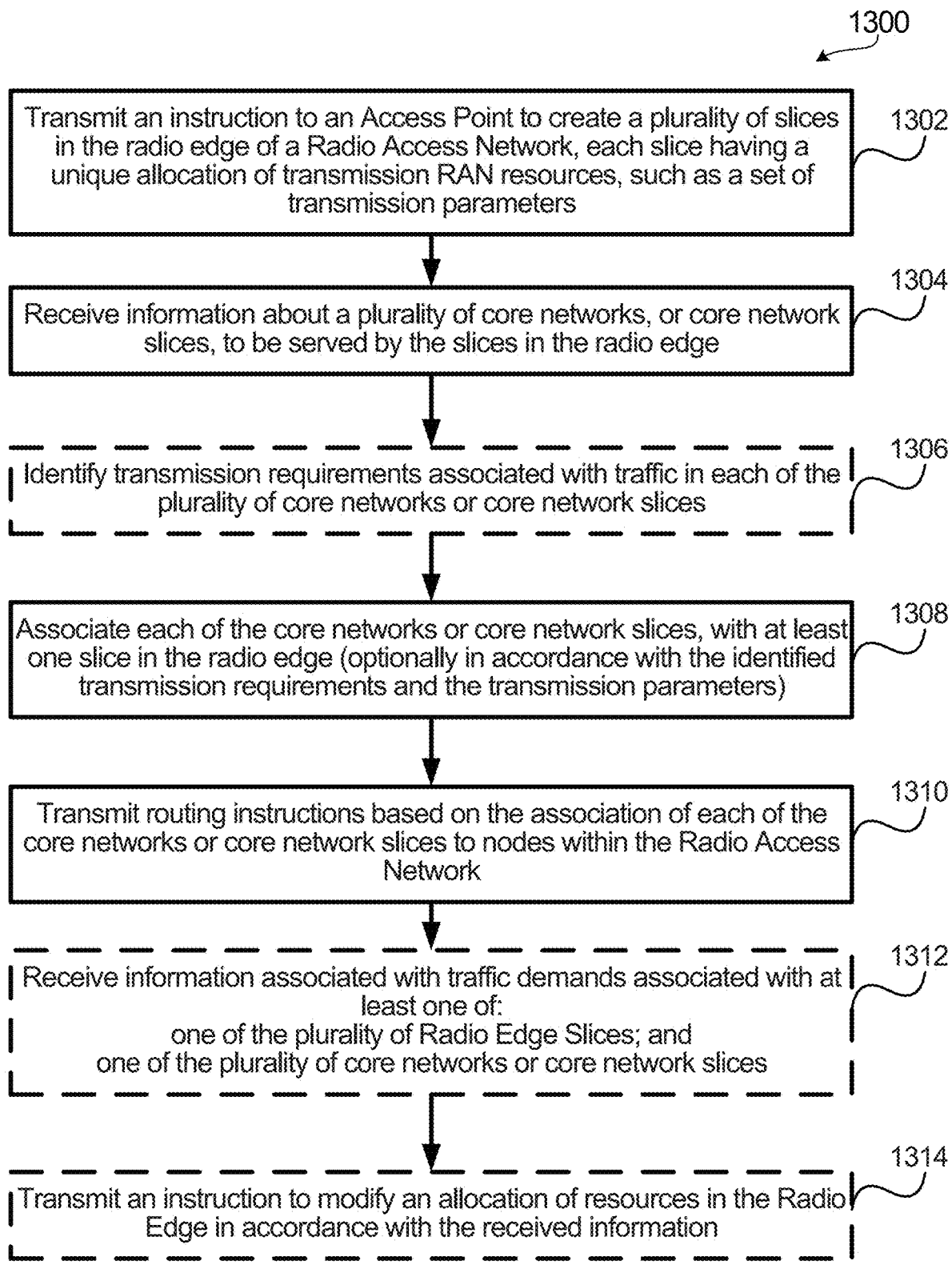
FIG. 13 is a flow chart illustrating a method for execution by a network controller in accordance with disclosed embodiments.

Those of skill in the art will appreciate that in an embodiment of the present invention, there is a method 1300 as illustrated in FIG. 13. The method is directed to the creation of a plurality of RAN slices that can be applied to radio communications in the RAN. Each of the RAN slices can be assigned a unique allocation of RAN resources. The unique allocation provides isolation from transmission in other RAN slices. This allocation of resources can include a unique set of transmission parameters. The method can be carried out at a controller, such as SDN controller 1202. In step 1302, instructions are transmitted to an AP to create a plurality of slices in the radio edge of the RAN. Information about core networks and possibly core network slices that will be served by the RAN slices is received in 1304. This information may include identification of the gateways from which traffic is to be received, and may also include identification of the services carried in the core network(s). This information may also include information about the nature of the traffic in the core network. Optionally, this information is used to determine transmission requirements (e.g. radio edge transmission requirements) in step 1306. In 1308, each of the core networks, or the core network slices, is associated with at least one slice of the radio edge of the RAN. It should be understood that if there are a plurality of different services carried within a core network, or core network slice, there may be more than one slice of the RAN radio edge associated with the core network or core network slice. In 1310, routing instructions based on the association of core networks or core network slices to the RAN slices is transmitted to nodes within the radio access network. This information may be transmitted to APs which are the interface between the radio edge slice and an unsliced portion of the RAN. The routing information may also be transmitted to routing functions within the RAN. These instructions may also be sent to gateway functions at the edge of the core network (or core network slice) and the RAN. The routing instructions may contain information that can be used to establish logical tunnels between the gateways and APs. This can enable a network to operation so that traffic from a core network or core network slice is directed to the APs associated with the radio edge slice assigned to the core network traffic.

In an optional embodiment, information associated with changing traffic demands or requirements for either a core network (or slice) or a radio edge slice is received. This information, received in optional step 1312, may indicate that there is excess capacity, or surplus demand for capacity in the radio edge slices. This information can be used to determine a new resource allocation for the radio edge slices, which can be transmitted to the respective nodes. In some embodiments this instruction may only be transmitted to the APs, or to a subset of APs. In other embodiments, the modification may create new radio edge slices, or remove existing radio edge slices, in which case a modification message (possibly not the same modification message sent to the AP) may be sent to other nodes in the RAN so that logical connections can be created or removed.

In some of the embodiments of the above described method, the RAN resources can include any or all of: network access resources that connect the RAN to a physical core network; radio frequency and time resources of the RAN; and an air interface configuration specifying how the network access resources interface with the radio frequency resources of the RAN. Optionally, at least some of the RAN slices can have common allocations of network access resources and adjacent radio frequency resources, with differentiating air interface configurations being allocated to each of the at least some of the RAN slices to isolate the radio communications of the at least some of the RAN slices from each other. The air interface configurations may specify waveforms for the RAN slices and numerology to apply to the waveforms. The plurality of RAN slices can comprises first and second RAN slices for which the air interface configurations specify the same waveform but different numerologies. In this manner, a numerology can allow a degree of isolation between the slices, as a receiver associated with the first slice would not be able to properly decode data transmitted in the second slice due to the differing transmission numerology. In one such example, the common waveform can be an OFDMA waveform, and the numerologies associated with each slice can have a different combination of one or more of: sub-carrier spacing, cyclic prefix length, symbol length, a duration of a scheduled transmission duration and a number of symbols contained in a scheduled transmission duration.

In another embodiment, different network access resources and different combinations of time and radio frequency resources can be allocated to RAN slices to provide isolation.

Those skilled in the art will appreciate that this method allows for the association of RAN slices with respective core network slices (or services within the core network slices) to enable communications associated with service to use a RAN slice and its associated core slice.

In other embodiments, for at least one of the RAN slices, the network access resources comprise at least one logical transmit point for downlink communications and at least one logical receive point for uplink communications. The TP and RP can be based on different sets of physical access points. In some embodiments, there may be overlap between the membership of physical access points within the logical TP and RP. In other embodiments there may be no overlap. Even if the membership of the physical APs is identical, the assignment of different logical identifiers to a TP and RP associated with a slice create a logical distinction for a UE. It is also possible that a set of physical APs assigned to a TP or RP in one slice may differ from the set of physical APs assigned to a TP or RP in another slice. The membership of the TP or RP in any slice can be changed without informing the UE, so long as the logical TP or RP identifiers are maintained. A UE may be communicating with the same set of physical APs in two different slices without being aware of this overlap.

After the establishment of the slices, and the definition of logical TPs and RPs within each slice, traffic destined for a UE attached to more than one slice can be received and routed to the APs associated with the CN, CN slice, or service, that the traffic is associated with. The traffic can then be transmitted to the UE using the transmission parameters associated with the RAN slice. Traffic associated with a different slice may be transmitted to the UE by a different logical TP, which may or may not have the same physical APs.

When the UE has traffic to transmit, it can transmit the traffic to the RP associated with the slice associated with the respective service. Based on any or all of an identification of the UE, the RP that traffic is received over, a service identifier associated with the transmission, and a destination address, the received traffic can be routed to the appropriate core network or core network slice.

According to one aspect of the present invention, there is provided a method for execution by an access point (AP) within a radio access network (RAN), the method comprising: receiving data for transmission to a User Equipment (UE); and wirelessly transmitting the received data to the UE using a set of transmission parameters associated with a RAN slice associated with the received data.

In some embodiments, the method comprises selecting the RAN slice associated with the received data from a set of RAN slices supported by the AP.

In some embodiments, the RAN slice is selected in accordance with a RAN slice identifier associated with the received data.

In some embodiments the method comprises selecting the transmission parameters in accordance with the selected RAN slice.

In some embodiments, the set of transmission parameters are selected in accordance with an address of a gateway between the RAN and a core network.

In some embodiments, the set of transmission parameters are selected in accordance with one of a core network identifier, a core network slice identifier and a service identifier associated with the received data.

In some embodiments, at least one parameter in the set of transmission parameters is selected from a list comprising: radio frequency/time resources; a radio access technology; a transmission waveform; a frame length; and a numerology.

According to another aspect of the present invention, there is provided a network access point (AP) for transmitting data to a User Equipment (UE) over a radio channel in a radio access network (RAN), comprising: a network interface for receiving data from a radio access network; a wireless network interface for transmitting data to the UE; a processor; and a non-transient memory for storing instructions that when executed by the processor cause the network access point to: transmit data to the UE over the wireless network interface using a set of transmission parameters associated with a RAN slice, in response to receipt of the data for transmission to the UE over the network interface.

In some embodiments, the non-transient memory further stores instructions to select the transmission parameters in accordance with an address of a gateway from which the data is received.

In some embodiments, non-transient memory further stores instructions to select at least one transmission parameter in the set in accordance with a RAN slice identifier associated with the data.

In some embodiments, the non-transient memory further stores instructions to select at least one transmission parameter in the set in accordance with one of a core network identifier, a core network slice identifier and a service identifier associated with the data.

In some embodiments, at least one parameter is the set of transmission parameters is selected from a list comprising: radio frequency/time resources; a radio access technology; a transmission waveform; a frame length; and a numerology.

According to a further aspect of the present invention, there is provided a method for execution by a routing function in a radio access network (RAN): receiving data traffic from a core network destined for a User Equipment (UE); transmitting the received data traffic to a transmission point within a selected RAN slice associated with the received data traffic.

In some embodiments the method further comprises selecting the RAN slice associated with the received data traffic in accordance with one of: an identifier associated with the core network; an identifier associated with a slice of the core network associated with the received data; and a service identifier associated with the received data.

In some embodiments, the identifier associated with one of the core network and the slice of the core network is one of an address of a core network gateway function and a tunnel identifier.

In some embodiments, receiving the data traffic includes receiving the data traffic from a gateway function within the core network.

In some embodiments, receiving the data traffic includes receiving the data traffic from a core network slice.

In some embodiments, the RAN slice is pre-associated with the core network slice.

In some embodiments, the method further includes the step of selecting the transmission point within the RAN slice in accordance with information about the location of the UE with respect to the network topology.

In some embodiments, the method further comprises selecting a transmission point uniquely associated with the UE; and determining a set of constituent access points associated with the transmission point; wherein transmitting the received data comprises transmitting the received data to the set of constituent access points.

In some embodiments, the step of transmitting includes modifying the received data to include a RAN slice identifier associated with the selected RAN slice prior to transmitting the data to the transmission point.

According to yet another aspect of the present invention, there is provided a router for use in a radio access network (RAN), comprising: a network interface for receiving and transmitting data; a processor; and a non-transient memory for storing instructions that when executed by the processor cause the router to:

transmit data traffic, over the network interface, to a transmission point associated with a selected RAN slice within the RAN, in response to receiving data traffic destined for a User Equipment (UE) over the network interface.

In some embodiments, the non-transient memory contains further instructions that when executed by the processor cause the router to select the RAN slice in accordance with one of an identifier associated with the core network; an identifier associated with a slice of the core network associated with the received data; and a service identifier associated with the received data.

In some embodiments, the identifier associated with one of the core network and the slice of the core network is one of an address of a core network gateway function and a tunnel identifier.

In some embodiments, the non-transient memory contains further instructions that when executed by the processor cause the router to select the transmission point in accordance with information about the location of the UE with respect to the network topology.

In some embodiments, the non-transient memory contains further instructions that when executed by the processor cause the router to select a transmission point uniquely associated with the UE; determine a set of constituent access points associated with the selected transmission point; and transmit the data to the transmission point by transmitting the data to the set of constituent access points.

In some embodiments, the non-transient memory contains further instructions that when executed by the processor cause the router to modify the received data prior to transmission to the transmission point to include a RAN slice identifier associated with the selected RAN slice.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

Figure 14:
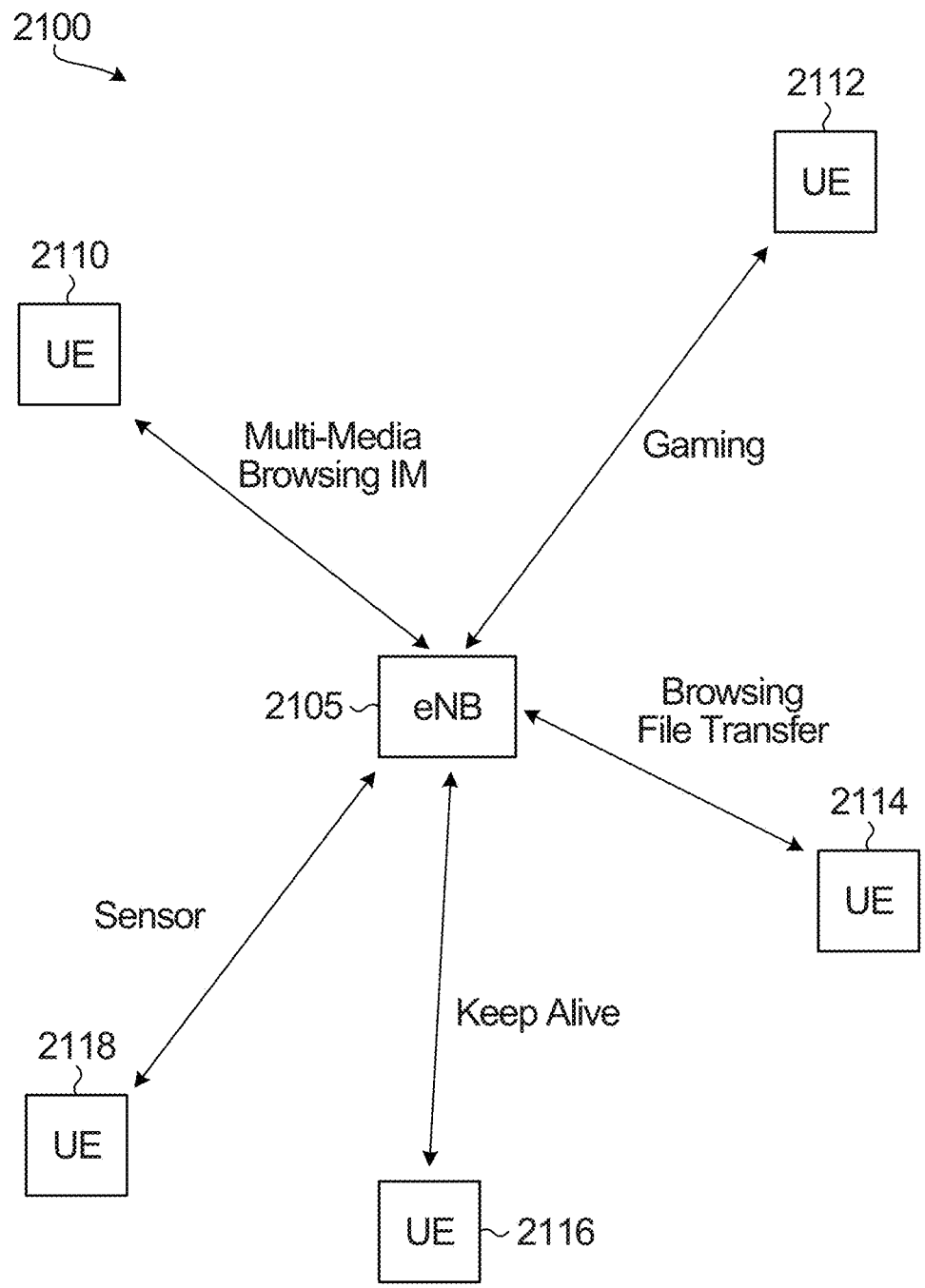
FIG. 14 illustrates an example communications system according to example embodiments described herein.

FIG. 14 illustrates an example communications system 2100. Communications system 2100 includes an eNB 2105 serving a plurality of UEs, including UE 2110, UE 2112, UE 2114, UE 2116, and UE 2118. As discussed previously, as UEs become more advanced, they are capable of running a wider range of applications. The applications may be classified as either session based applications or non-session based applications. Session based applications (which may include video streaming, web browsing, file transfer, games, and the like, applications) are generally applications that utilize a series of data exchanges and have intolerance to large latencies, generate a lot of message traffic, have large data bandwidth requirements, and the like. Non-session based applications (which may include keep alive messages generated by a mobile operating system or instant messaging, reports generated by sensors and/or smart meters, and the like, applications) are typically applications that utilize short data exchanges and some can tolerate large latencies, generate a small amount of message traffic, have small data bandwidth requirements, and the like. However, some non-session based applications may not be able to tolerate large latencies, such as security sensors, health sensors, and the like.

As an illustrative example, UE 2110 is running a multimedia streaming application, a web browser, as well as an instant messaging application, while UE 2112 is running a multi-user video game. Similarly, UE 2114 is running a web browser while performing a large file transfer, UE 2116 is running an instant messaging application that is not active and is transmitting keep alive messages to maintain connectivity, while UE 2118 is a sensor that reports on occasion.

While it is understood that communications systems may employ multiple eNBs capable of communicating with a number of UEs, only one eNB, and a number of UEs are illustrated for simplicity.

In order to control UE device usage of radio resources and power consumption, connection states are defined in many wireless communication standards (e.g. LTE/UMTS RRC states, EVDO connection states).

These states define the characteristics of a UE device in terms of: resource usage (e.g. Dedicated, shared resources), control channel usage and control channel monitoring pattern, and thus affect one or more of the following metrics: terminal power consumption; network resources (e.g. Physical resources, terminal ID allocation, and the like); data transmission latency; and control plane signaling overhead.

Many existing wireless communication standards include only two valid operational states. For example, the LTE/UMTS RRC states include a CONNECTED state and an IDLE state.

As an illustrative example, if a state machine includes two states: CONNECTED and IDLE with the IDLE state not allowing the UE to transmit, then a UE executing non-session based applications transitions to the CONNECTED state prior to transmitting or receiving transmissions (which, due to the nature of non-session based applications, occurs infrequently). The state transition generally requires the exchange of multiple messages between the UE and its eNB, which incurs significant communications overhead and communications latency, especially when considering that the UE may be transmitting or receiving messages that are only a few bytes long (or less).

A third operational state, namely an ECO state, is proposed in U.S. patent application Ser. No. 14/150,539, now published as United States Patent Application Publication No. US 2015/0195788 A1. In the ECO state only grant-free transmission is supported to reduce signaling overhead and energy consumption of transmission of small packets (e.g., background traffic). In contrast to the conventional IDLE state defined in LTE/UMTS, an ECO state, such as the one proposed in U.S. patent application Ser. No. 14/150,539 filed on Jan. 8, 2014 entitled "System and Method for Always on Connections in Wireless Communications System", which is hereby incorporated by reference in its entirety, allows UE devices executing non-session based applications to communicate using background messages without having to change states from a first state that permits substantial energy consumption savings to a second state (e.g., the CONNECTED state) that results in greater energy consumption but generally has no restrictions on how the UE device communicates. In order to facilitate data transmission in ECO state, UE context needs to be maintained with the RAN. For example, UE maintains a connection ID (e.g. MAC ID, RNTI (radio network temporary identifier)) and/or RRC connection.

Figure 15:
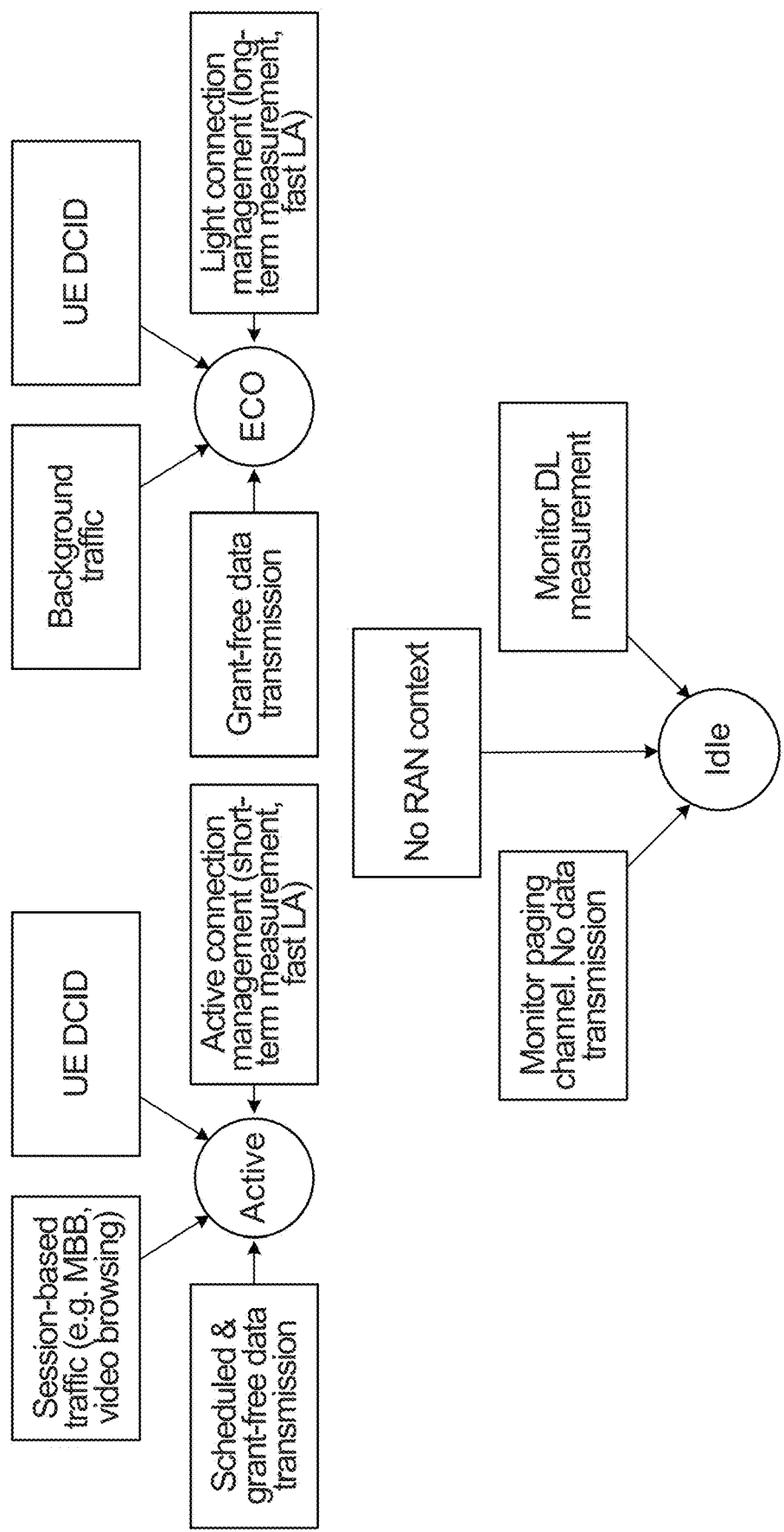
FIG. 15 illustrates examples of UE operational states according to example embodiments described herein.

FIG. 15 illustrates examples of operational characteristics that may be associated with an ACTIVE/CONNECTED state, an ECO state, and an IDLE state according to example embodiments described herein. It should be clear that these are merely examples of operational characteristics that may be associated with these operational states and one or more of the operational states may have different operational characteristics in other embodiments. In general, the operational states differ from one another in terms of network connectedness, which may affect terminal power consumption, network resources, data transmission latency, and/or control plane signaling overhead, as discussed above.

Figure 16:
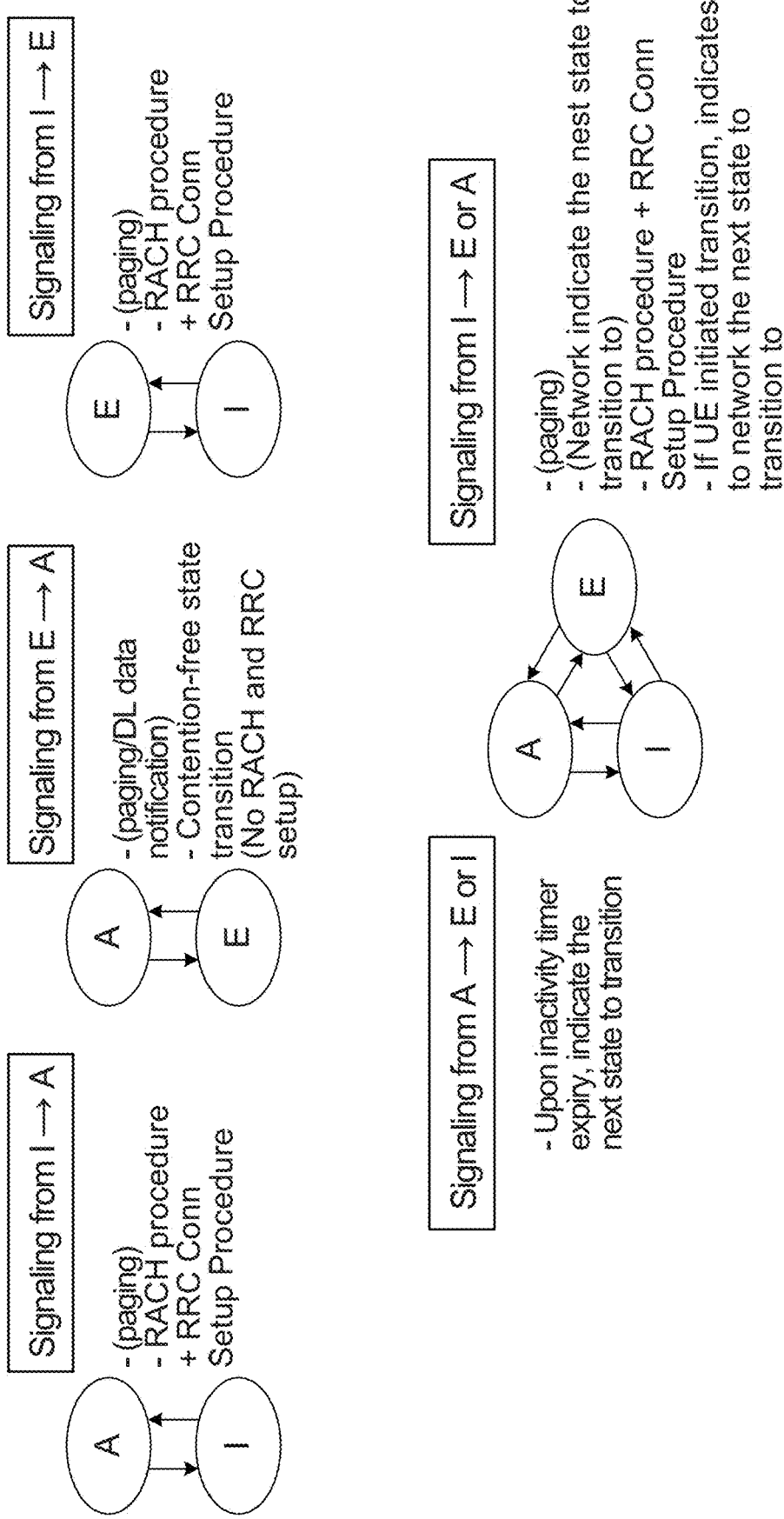
FIG. 16 illustrates examples of signaling overhead to support two states vs. three states according to example embodiments described herein.

However, as shown in FIG. 16, supporting state transitions among three potential operational states (e.g., between ACTIVE/CONNECTED, ECO and IDLE states) may incur additional signaling overhead relative to only supporting state transitions among two potential operational states. FIG. 16 illustrates three examples of signaling overhead to support transitions between only two states vs. between three states, where ACTIVE/CONNECTED, ECO and IDLE states are referenced using the letters A, E and I, respectively. Again, it should be noted that the examples of signaling shown in FIG. 16 are provided as illustrative examples only, and different signaling may be used in other implementations.

While it may be advantageous for some UE devices (e.g., smartphones capable of supporting a wide range of services) to support a larger number of operational states, some UE devices (e.g., embedded sensor devices configured for machine type communication (MTC)) may not need to support state transitions among all the potential operational states.

Accordingly, for those UE devices that may only need to support state transitions among a subset of all of the potential operational states, it may be desirable to configure those devices to avoid incurring the additional signaling overhead that may be associated with supporting transitions between all of the potential operational states.

One embodiment of the disclosure relates to supporting multiple UE state configurations in a wireless network so that the supported operational states of a UE are configurable. For example, in one embodiment the network selects a state configuration for each UE from among a pool of candidate state configurations with each candidate state configuration being associated with a respective set of one or more predefined operating states. For example, one candidate state configuration may include all potential operational states, while a second candidate state configuration may only include some subset of all potential operational states.

Figure 17A:
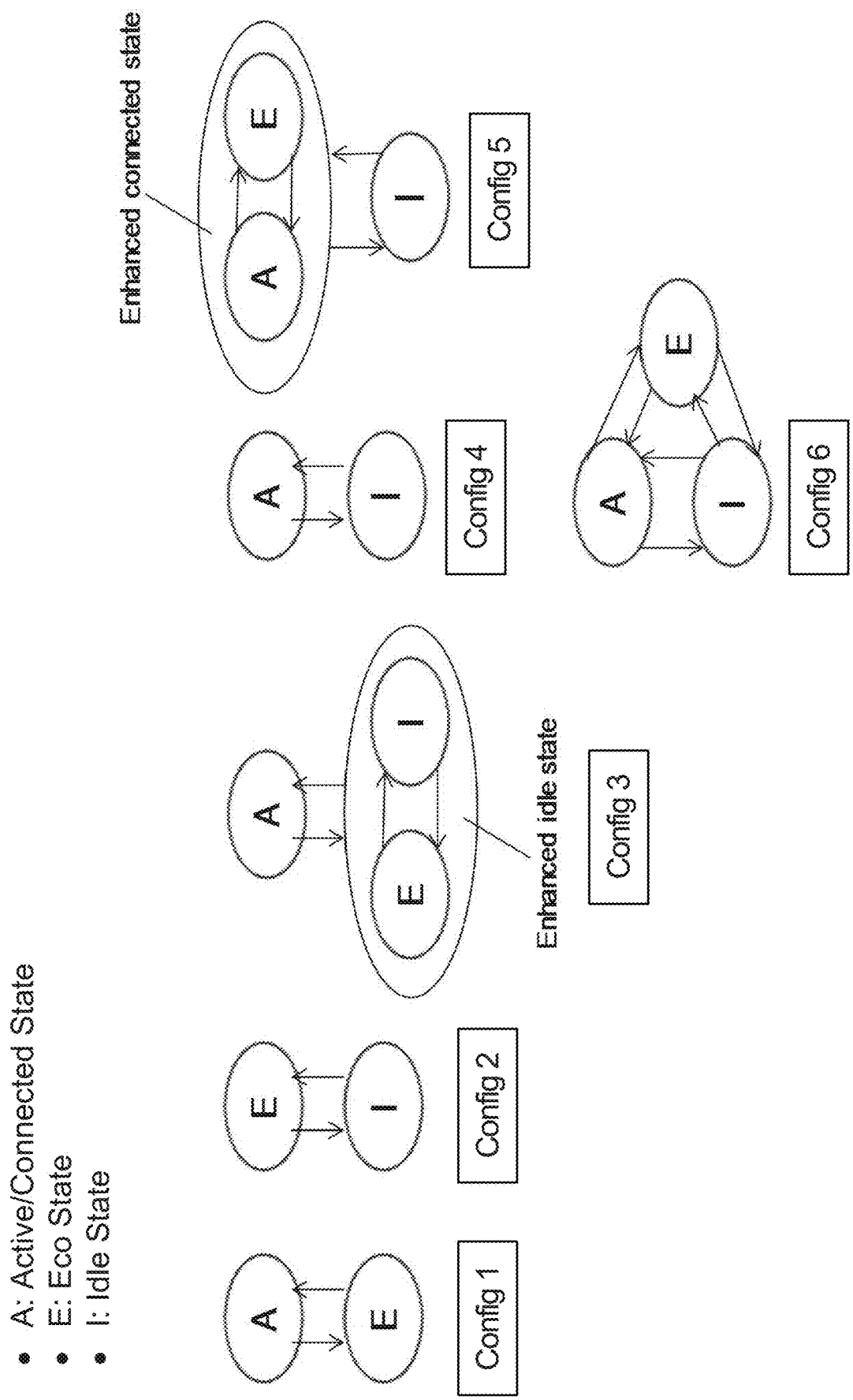
FIG. 17A illustrates examples of state configurations according to example embodiments described herein.

FIG. 17A illustrates six examples of state configurations according to example embodiments described herein. The illustrated examples include:

- a first state configuration (Config 1) that includes an ACTIVE state and an ECO state;
- a second state configuration (Config 2) that includes an ECO state and an IDLE state;
- a third state configuration (Config 3) that includes an ACTIVE state and an enhanced IDLE state, where the enhanced IDLE state includes therein IDLE and ECO sub-states with transition paths therebetween within the enhanced IDLE state;
- a fourth state configuration (Config 4) that includes an ACTIVE state and an IDLE state;
- a fifth state configuration (Config 5) that includes an IDLE state and an enhanced ACTIVE state, where the enhanced ACTIVE state includes therein ACTIVE and ECO sub-states with transition paths therebetween within the enhanced ACTIVE state; and
- a sixth state configuration (Config 6) that includes an ACTIVE state, an ECO state, and an IDLE state.

Figure 17B:
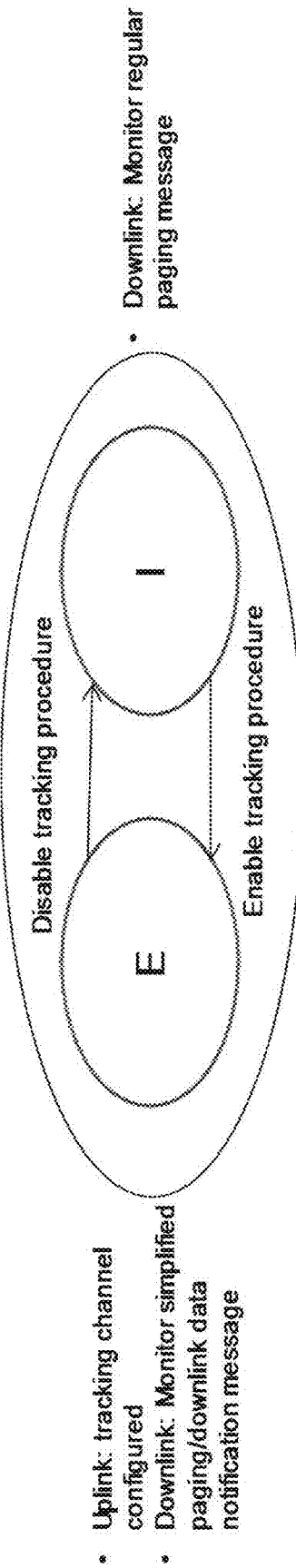
FIG. 17B illustrates further details of an enhanced IDLE state that is included in one of the example state configurations shown in FIG. 4.

In an enhanced IDLE state shown in FIG. 17B, a UE can transition between an IDLE sub-state and ECO sub-state. It should also be noted that the ECO and IDLE sub-states may not need to be explicitly defined in the enhanced IDLE state. They maybe implicitly specified by virtue of whether the associated procedures are supported and/or enabled as explained in the following. The ECO sub-state is the same as the ECO state described earlier. However, in order to further conserve battery power, a UE may go into deep sleep which is the IDLE sub-state. In another embodiment, the UE may not go into the IDLE sub-state. In ECO (sub)-state, the UE is configured with a tracking channel such as the one proposed in U.S. Provisional Patent Application No. 62/141,483 filed Apr. 1, 2015 entitled "System and Method for a Tracking Channel" and U.S. patent application Ser. No. 15/009,626 filed Jan. 28, 2016 entitled "System and Method for a Tracking Channel", which are hereby incorporated by reference in their entirety and copies of which are attached in Appendices B and C, respectively. The tracking channel allows the network to track a UE location periodically and also to maintain a UE's uplink timing alignment. A UE can periodically monitor the simplified paging and downlink data notification message such as the one proposed in U.S. patent application Ser. No. 14/609,707 filed Jan. 30, 2015 entitled "Apparatus and Method for a Wireless Device to Receive Data in an ECO State", which is hereby incorporated by reference in its entirety and a copy of which is attached in Appendix D. Such message is unicast to a UE. Maintaining a light connection management on the uplink and downlink facilitates small packet data exchange with reduced latency while a UE is in ECO (sub)-state. On the other hand, a UE can further reduce energy consumption by disabling the tracking channel procedure. In this case, the network does not actively track the UE. If a UE needs to send small packets on the uplink, it needs to re-enable the tracking channel procedure or it needs to perform a random access procedure. On the downlink, a UE only monitors periodically paging message from the network which is a multicast message to all UEs that belong to a paging group. The paging procedure similar to that of LTE may be used. A UE in the IDLE sub-state, therefore, incurs more delay in transmitting and receiving data. Moreover, the transition between the ECO and IDLE sub-state is without explicit state transition signaling. Only signaling associated with disabling and enabling tracking procedure is required.

Figure 17C:
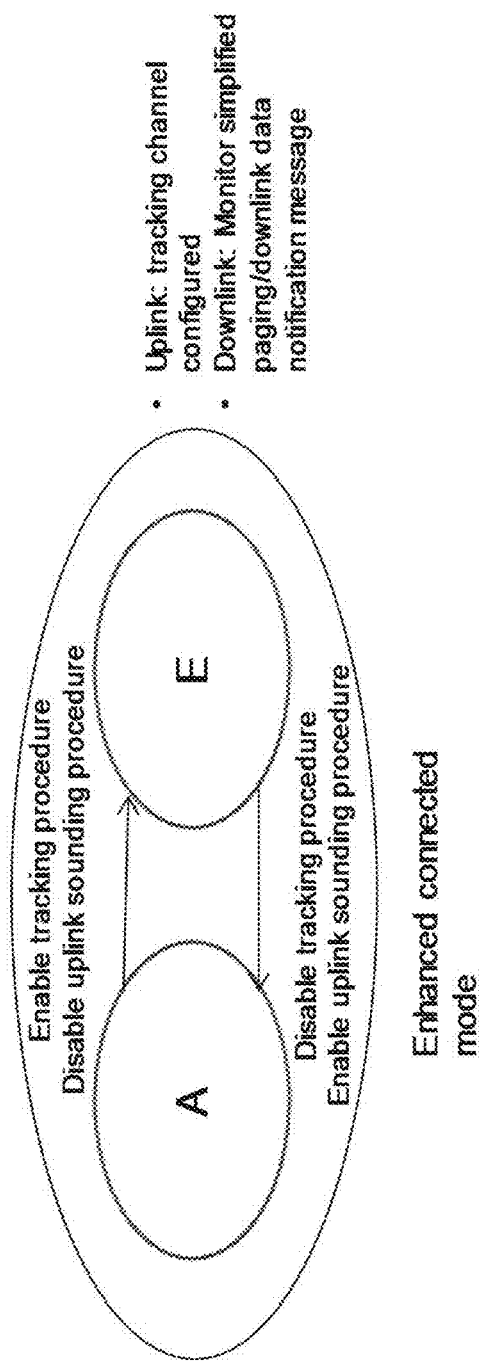
FIG. 17C illustrates further details of an enhanced ACTIVE/CONNECTED state that is included in one of the example state configurations shown in FIG. 4.
Figure 17D:
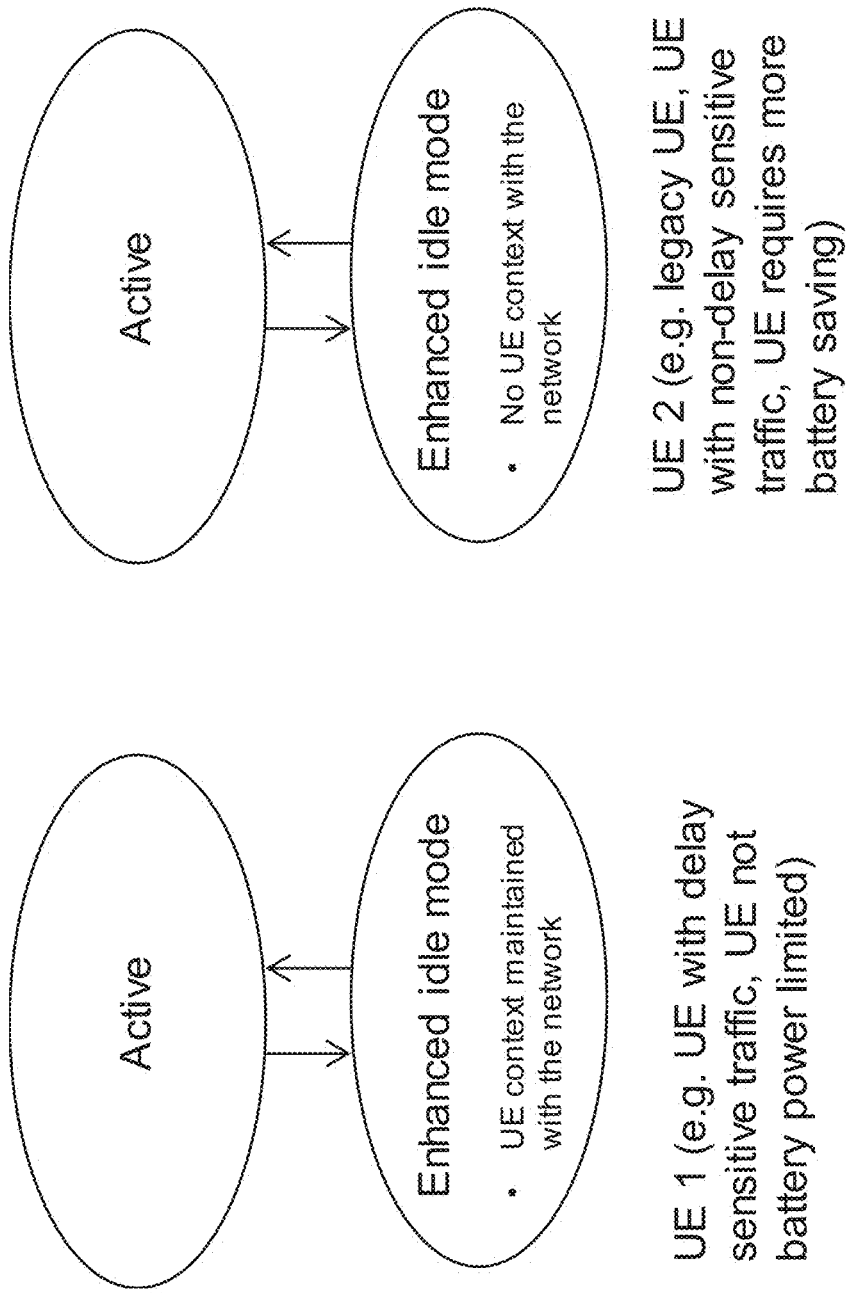
FIG. 17D illustrates further details of an enhanced IDLE state that is included in one of the example state configurations shown in FIG. 4.

The enhanced IDLE state can be configured by the network based on services and/or UE types as shown in FIG. 17D. That is, not all UEs need to support the procedures associated with the ECO sub-state. Some UEs (e.g. legacy UEs, UEs that do not have delay sensitive traffic, UEs that require more battery saving) may only support the IDLE sub-state in the enhanced IDLE state. Some other UEs (e.g. UEs with delay sensitive traffic, UEs that are not battery power limited) may support both ECO and IDLE sub-states in the enhanced IDLE state. For the UEs that support the procedures associated with the ECO sub-state, UE context with the RAN is maintained to allow for fast transition (contention-free) to the CONNECTED/ACTIVE state. The state transition between the CONNECTED/ACTIVE state and enhanced IDLE state is similar to that of transition between a CONNECTED/ACTIVE state and ECO state as shown in FIG. 16. For the UEs that do not support procedures associated with the ECO sub-state or such procedures are disabled, UE context with the RAN is released in the enhanced IDLE state. The state transition between the CONNECTED/ACTIVE state and enhanced IDLE state is similar to that of transition between a CONNECTED/ACTIVE state and IDLE state as shown in FIG. 16.

In an enhanced CONNECTED/ACTIVE state as shown in FIG. 17C, a UE can transition between an ACTIVE and ECO sub-state. A UE is in the ECO sub-state when the tracking procedure is enabled, the uplink sounding procedure is disabled. Also the UE stops monitoring the dynamic signaling resource allocation for uplink grant and downlink scheduling assignments.

The six example state configurations shown in FIG. 17A are merely illustrative examples. Other permutations and combinations of ACTIVE, ECO, and IDLE states, and enhanced versions thereof may be used in other candidate state configurations in some embodiments of the present disclosure. For example, a further state configuration may include the ACTIVE, ECO and IDLE states, similar to the sixth state configuration shown in FIG. 19, but may differ therefrom in that it omits one or more transition paths between the operational states. As such, it should be noted that a state configuration may not only define a set of one or more operational states, but may also define valid transition paths between its constituent operational states. However, the valid transition paths may not be defined if every operational state in a state configuration can be transitioned to every other operational state in the state configuration.

By defining such a pool of candidate state configurations and assigning a UE a candidate state configuration that includes only those operational states that the UE requires, additional signaling overhead that would otherwise be incurred to support operational states that are not utilized by the UE. Accordingly, the selection of a state configuration for a given UE may be based on different UE-specific factors that may include a UE type associated with the UE and/or one or more services supported by the UE. As such, different UE devices may have different state configurations.

As noted above, one of the factors upon which the selection of a state configuration for a given UE device may be based is the category or type of the UE. For example, UE devices may be categorized or typed according to some criteria. These categories or types may include a first category or type for UE devices configured for machine type communication (MTC), for example. The first category or type may be associated/mapped to state configurations that include only two operational states (e.g., Config 2 and/or Config 1). A second category or type may be for more capable devices, such as smartphones, for example. The second category or type may be associated/mapped to state configurations that include three operational states (e.g., Config 6). A third category or type may be defined for backward compatibility with the operational states defined in an earlier wireless communication system standard (e.g., Config 4, where the ACTIVE and IDLE states are defined according to the RRC states in LTE/UMTS, for example). Information regarding the UE type may be exchanged with the network as part of an initial network access procedure, for example.

Another factor upon which the selection of a state configuration for a given UE device may be based is the service(s) that the UE device supports. For example, an enhanced mobile broadband (eMBB) service may be mapped to a state configuration that includes ACTIVE, ECO and IDLE states with transition paths between each of those states (Config 6, for example). Therefore, the state configuration that the eMBB service is mapped to may be selected for a UE device that supports the eMBB service.

In some cases, a UE device may support a number of different services that may be mapped to different state configurations that include different permutations and combinations of operational states. As such, in some cases a UE device that supports multiple services may be assigned multiple state configurations from the pool of candidate state configurations.

In some cases, a network may be built in a flexible way so that speed, capacity and coverage can be allocated in logical network "slices" to meet the specific demands of different services/traffic types. For example, a network slice may be configured to support the communication service of a particular connection type with a specific way of handling the control plane and user plane for the communication service. To this end, a network slice may be composed of a collection of network functions and specific radio access technology (RAT) settings that are combined together for a specific use case or business model. Thus, a network slice may span all domains of the network: software modules running on cloud nodes, specific configurations of the transport network supporting flexible location of functions, a dedicated radio configuration or even a specific RAT, as well as configuration of UE devices. Not all network slices contain the same functions. For example, a network slice may be configured to provide only the traffic treatment that is necessary for a particular use case, and avoid all other unnecessary functionality.

In some embodiments, the services supported by a UE device may be supported through different network slices. From the network point of view, a UE device supporting a particular service belonging to a network slice may be associated with a particular state configuration. In other words, there may be a mapping between network slices and state configurations.

Figure 18B:
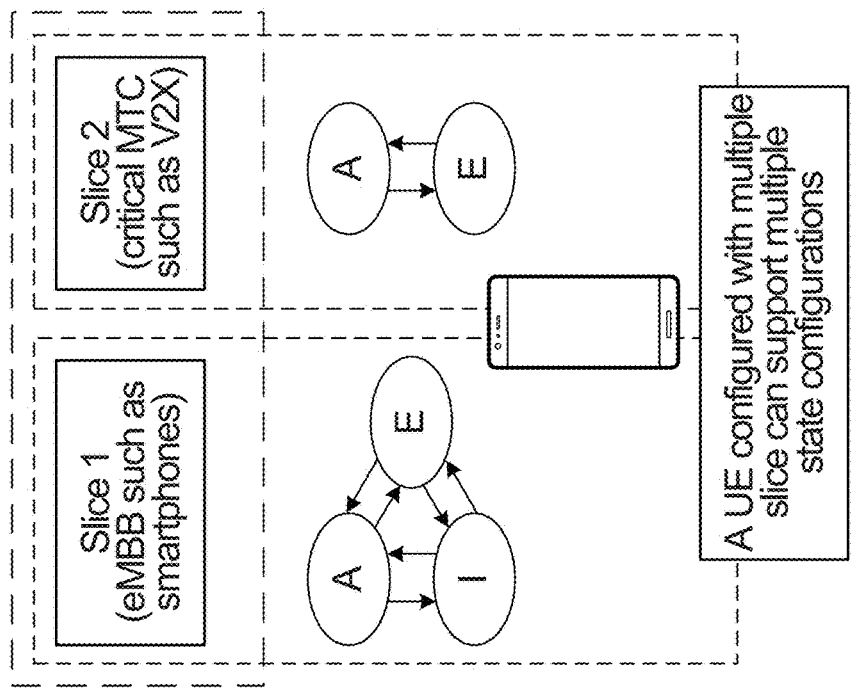
FIG. 18B illustrates an example of a UE device configured with multiple state configurations according to example embodiments described herein.
Figure 18A:
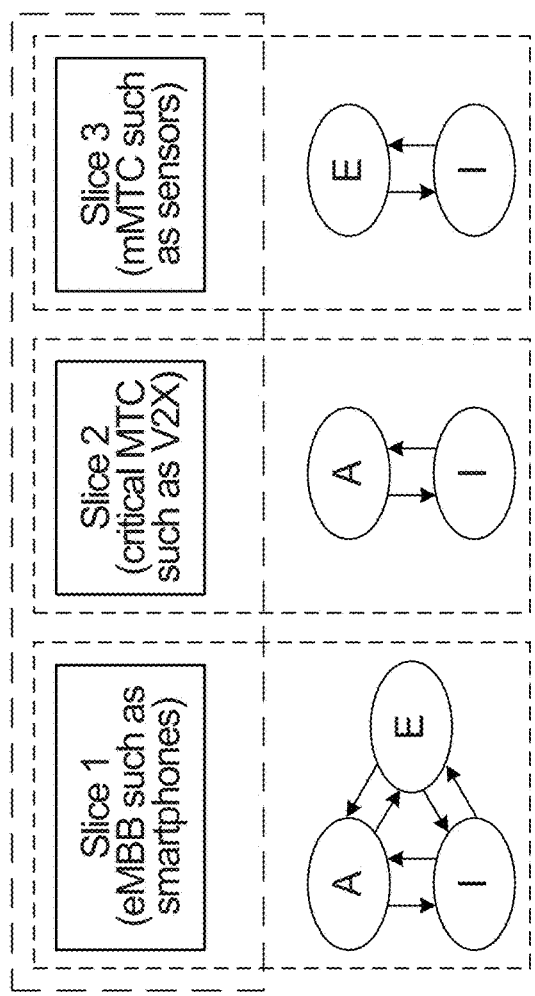
FIG. 18A illustrates examples of mappings between network slices and state configurations according to example embodiments described herein.

FIG. 18A illustrates examples of mappings between network slices and state configurations according to example embodiments described herein. The illustrated examples include three network slices. The first network slice supports an eMBB service and is mapped to a state configuration that includes ACTIVE, ECO and IDLE states with transition paths between each of those states (Config 6, for example). The second network slice supports ultra-reliable low latency communication (URLLC), such as vehicle-to-anything (V2X) communication, and is mapped to a state configuration that includes ACTIVE and ECO states (Config 1, for example) for always-on connectivity with low latency grant-free transmission on uplink (UL) small packets and scheduled transmission on downlink (DL) for large packets. The third network slice supports massive machine type communication (mMTC), such as embedded sensor communication, and is mapped to a state configuration that includes ECO and IDLE states (Config 2, for example) for energy savings and to support a massive connection of small packets with grant-free transmission.

In some embodiments, a UE device supporting multiple network slices (e.g., a UE device supporting a first service in a first network slice and a second service in a second network slice, for example) may be configured with multiple state configurations and may support a service within a given network slice according to its respective state configuration. FIG. 18B illustrates an example of a UE device configured with multiple state configurations according to example embodiments described herein. In the illustrated example, the UE device is configured to support services in two network slices corresponding to the first and second network slices illustrated in FIG. 18A and is configured with the two corresponding state configurations (Configs 6 and 1, for example).

However, in some embodiments, a UE device supporting multiple network slices may be configured with a single state configuration that includes all of the predefined operating states associated with the respective state configurations associated with the multiple network slices supported by the UE device. For example, with reference to FIGS. 17 and 18A, a UE device that supports an eMBB service in the first network slice and a critical MTC service in the second network slice may be configured with Config 6, as Config 6 accommodates all of the operational states (and transition paths) of the state configurations with which the first and second network slices are associated. In other words, because the state configuration that is associated with the first network slice, namely {ACTIVE, ECO, IDLE} includes all of the operational states that are associated with state configuration that is associated with the second network slice, namely {ACTIVE, ECO}, the state configuration that is associated with the first network slice may also be used for the second network slice.

In some cases a network slice may be mapped to a frequency sub-band. In such cases, different state configurations may therefore be configured on different sub-bands. As a result, control channels may be configured accordingly (e.g. periodicity of monitoring and transmission. Feedback report and tracking channel on uplink, monitoring of paging and downlink control channels on the downlink). That is, a UE may be in ECO state in one sub-band and ACTIVE state in another sub-band.

Information regarding the service(s) that are supported by a UE device may be exchanged with the network as part of an initial network access procedure and/or as part of a UE supported service change procedure in which the UE device provides the network with information regarding a change to one or more services supported by the UE device. As such, it is noted that a change to the service(s) supported by a UE device may result in the selection of a different state configuration for the UE device. Therefore, it will be appreciated that the selection of one or more state configurations for a UE device may be done statically and/or may change over time (semi-static) based on the supported services/traffic types.

Figures 19A, 19B:
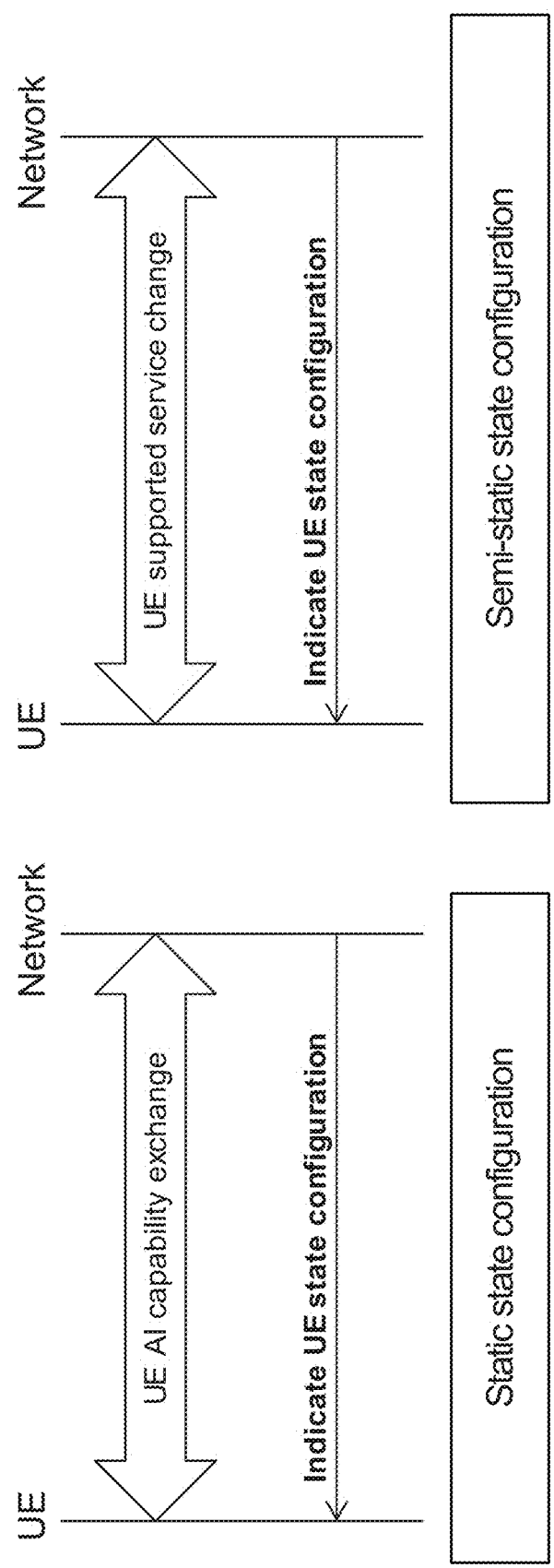
FIGS. 19A and 19B illustrate example message exchange diagrams according to example embodiments described herein.

FIGS. 19A and 19B illustrate example message exchange diagrams between a UE device and a network device according to example embodiments described herein.

FIG. 19A illustrates a message exchange diagram between a UE device and a network device for a static state configuration. Information regarding the UE type associated with the UE device and/or service(s) supported by the device are exchanged with the network as part of a UE air interface (AI) capability exchange procedure. The UE AI capability exchange procedure may occur when the UE initially attempts to access the network. The network device selects a state configuration for the UE device according to example embodiments described herein and transmits information to the UE device regarding the selected state configuration. For example, the network device may select the state configuration based at least in part on the information that it received as part of the UE AI capability exchange procedure (e.g., information regarding a UE type associated with the UE device and/or information regarding one or more services supported by the UE device). The information regarding the selected state configuration may be broadcast in a broadcast message, multicast in a multicast message, or unicast to the particular UE device in a unicast message.

FIG. 19B illustrates a message exchange diagram between a UE device and a network device for a semi-static state configuration. Information regarding a change to one or more services supported by the UE device is exchanged with the network as part of a UE supported service change procedure. Responsive to receiving the information regarding the change to the one or more services supported by the UE device, the network device selects a replacement state configuration from among the plurality of candidate state configurations based at least in part on the information regarding the change to the one or more services supported by the UE device. The network device then transmits information to the UE device regarding the selected replacement state configuration. In some cases, the change to the one or more services supported by the UE device may not necessitate a change to the state configuration(s) selected for the UE device. As such, in some cases a selected replacement state configuration may be the same as a previously selected state configuration for the UE device. The information regarding the selected state configuration may be broadcast in a broadcast message, multicast in a multicast message, or unicast to the particular UE device in a unicast message.

In another embodiment, if there is a predefined mapping of UE state configurations to services and/or UE types, the UE state configuration may be implicitly indicated without explicit signaling. For example, after information regarding the UE type associated with the UE device and/or service(s) supported by the device are exchanged with the network as part of a UE air interface (AI) capability exchange procedure, the UE state configuration(s) may then be determined by the UE based on the predefined mapping. In another example, after information regarding a change to one or more services supported by the UE device is exchanged with the network as part of a UE supported service change procedure, the UE state configuration(s) may then be determined by the UE based on the predefined mapping.

Figure 20:
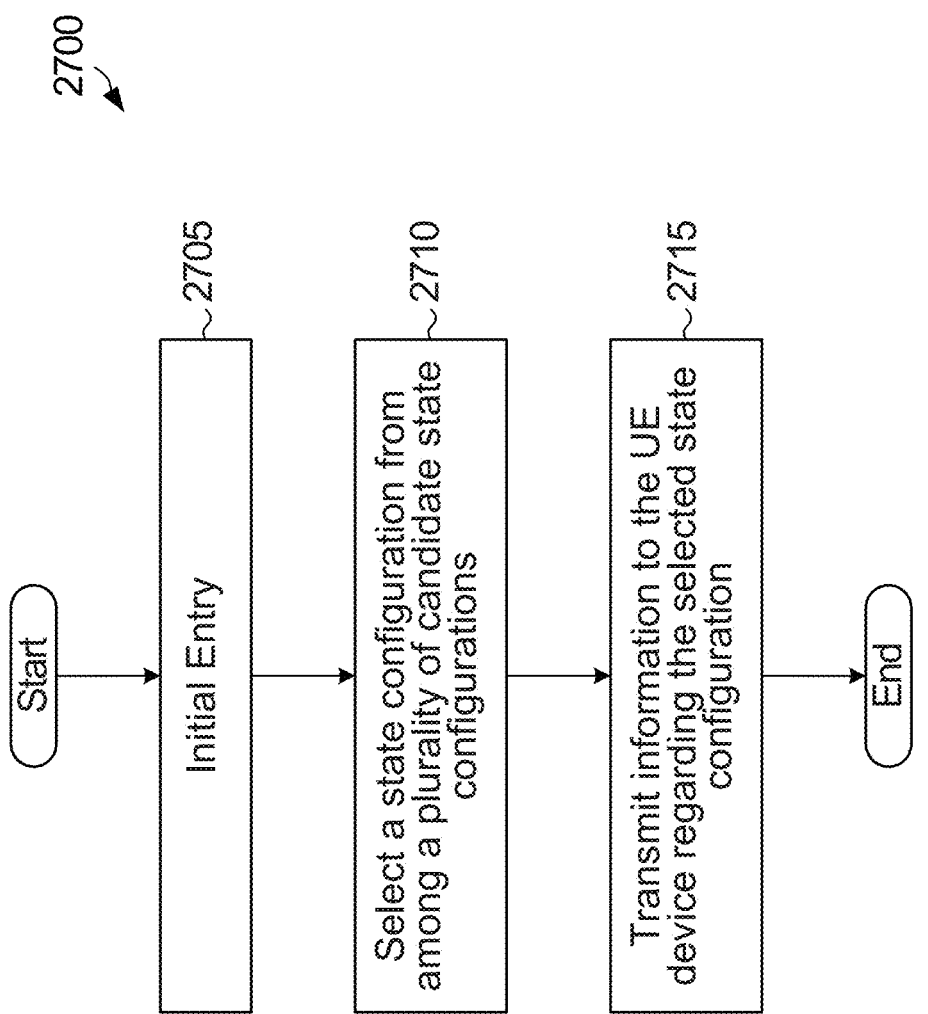
FIG. 20 illustrates a flow diagram of example operations in a network device according to example embodiments described herein.

FIG. 20 illustrates a flow diagram of example operations 2700 in a network device according to example embodiments described herein. Operations 2700 may be indicative of operations occurring in a network device such as an eNB, a picocell or the like.

Operations 2700 may begin with a UE device performing initial entry with the network (block 2705). The UE device may be a smartphone, a sensor, a personal computer, a tablet or the like. As discussed previously, the network device may select a state configuration for the UE device from among a plurality of candidate state configurations (block 2710). Each candidate state configuration may be associated with a respective set of one or more predefined operating states from among a plurality of predefined operating states. The network device may transmit information to the UE device regarding the selected state configuration (block 2715).

The example operations 2700 are illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

For example, in some embodiments, selecting a state configuration at block 2710 includes selecting a state configuration based at least in part on a UE type associated with the UE device and/or one or more services supported by the UE device. For example, as part of initial entry at block 2705 or sometime thereafter, the UE device may provide the network with information regarding a UE type associated with the UE device and/or information regarding one or more services supported by the UE device, which the network device may use to select a state configuration at block 2710.

In some embodiments, information regarding a change to the one or more services supported by the UE device may be received as part of a UE supported service change procedure. Responsive to receiving such information, the network device may select a replacement state configuration and transmit information to the UE device regarding the selected replacement state configuration, as discussed previously with reference to FIG. 19B.

In some embodiments, selecting a state configuration at block 2715 includes selecting a first state configuration based at least in part on a first service supported by the UE device and selecting a second state configuration based at least in part on a second service supported by the UE device. Similarly, transmitting information regarding the selected state configuration to the UE device at block 2715 may include transmitting information regarding the selected first and second state configurations. In such cases, the operations 2700 may further include providing the first service in a first network slice in accordance with the first state configuration and providing the second service in a second network slice in accordance with the second state configuration.

In some embodiments, each of a plurality of network slice may be associated with a respective state configuration, and selecting a state configuration at block 2710 may involve selecting a state configuration for multiple network slices supported by the UE device, where the selected state configuration includes all of the predefined operating states associated with the respective state configurations associated with the multiple network slices supported by the UE device. In such embodiments, operations 2700 may further include providing services to the UE device in the multiple network slices supported by the UE device in accordance with the selected state configuration.

Figure 21:
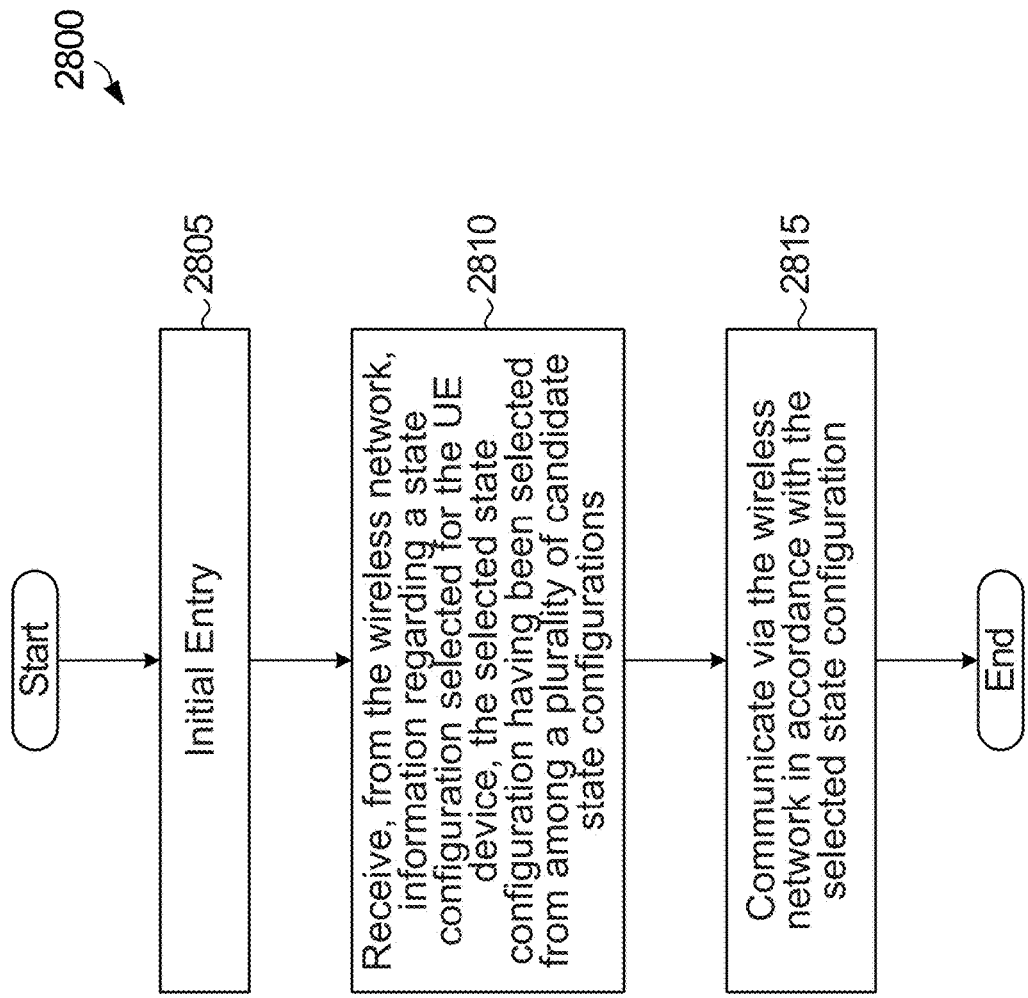
FIG. 21 illustrates a flow diagram of example operations in a UE device according to example embodiments described herein.

FIG. 21 illustrates a flow diagram of example operations 2800 in a UE device according to example embodiments described herein. Operations 2800 may be indicative of operations in a UE device such as a smartphone, a sensor, a personal computer, a tablet or the like.

Operations 2800 may begin with the UE device performing initial entry with a wireless network (block 2805). For example, the UE device may perform initial entry with a network device such as an eNB, a picocell, or the like. As discussed previously, the UE device may receive, from the wireless network, information regarding a state configuration selected for the UE device from among a plurality of candidate state configurations (block 2810). Each candidate state configuration may be associated with a respective set of one or more predefined operating states from among a plurality of predefined operating states. The UE device may communicate via the wireless network in accordance with the selected state configuration (block 2815). For example, the UE device may use the information regarding the selected state configuration to configure a state machine in the UE device.

The example operations 2800 are illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

For example, in some embodiments the initial entry procedure at block 2805 involves a UE air interface capability exchange procedure that involves transmitting information to the wireless network regarding a UE type associated with the UE device and/or one or more services supported by the UE device.

In some embodiments, operations 2800 may further include transmitting, as part of a UE supported service change procedure, information regarding a change to the one or more services supported by the UE device, and then subsequently receiving information regarding a replacement state configuration selected for the UE device based at least in part on the information regarding the change to the one or more services supported by the UE device. The UE device may then communicate via the wireless network in accordance with the selected replacement state configuration.

In some embodiments, the UE device may support multiple services, including at least a first service and a second service. In such embodiments, receiving information regarding a state configuration selected for the UE device at block 2810 may include receiving a first state configuration selected based at least in part on the first service supported by the UE device and receiving a second state configuration selected from among the plurality of candidate state configurations based at least in part on the second service supported by the UE device. Communicating via the wireless network in accordance with the selected state configuration at block 2815 may then include communicating via the wireless network in respect of the first service in accordance with the first selected state configuration and communicating via the wireless network in respect of the second service in accordance with the second selected state configuration.

In some embodiments, the first and second services may be supported by first and second network slices respectively. As such, in some embodiments, communicating via the wireless network in respect of the first and second service in accordance with the first and second selected state configuration may include communicating via first and second network slice of the wireless network in accordance with the first and second selected state configurations.

In some embodiments, the first and second network slices may be allocated to a first and second time-frequency resources (e.g. sub-bands). As such, in some embodiments, communicating via the wireless network in accordance with the first and second selected state configuration may include communicating via first and second time-frequency resources.

Figure 22:
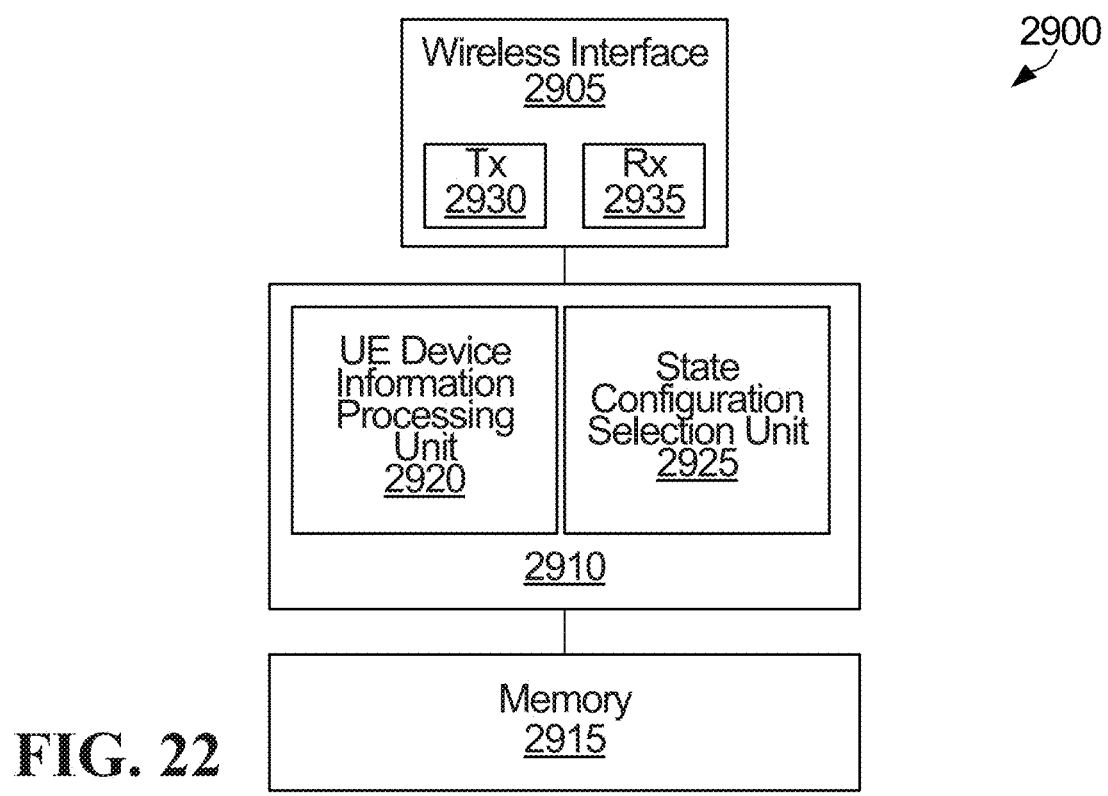
FIG. 22 illustrates a block diagram of an example network device according to example embodiments described herein.

FIG. 22 illustrates a block diagram of an example communication device 2900 according to example embodiments described herein. Communication device 2900 may be an implementation of a network device, such as a eNB, a picocell or the like. Communication device 2900 may be used to implement various ones of the embodiments discussed herein.

Figure 23:
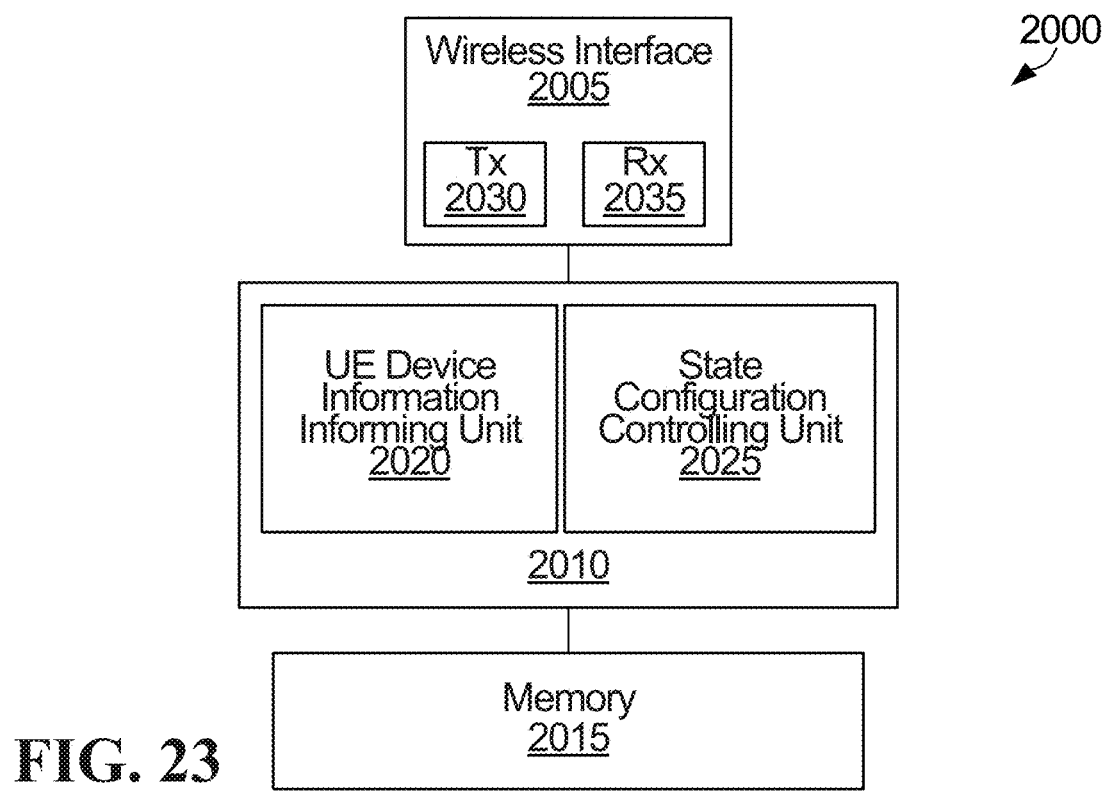
FIG. 23 illustrates a block diagram of an UE device according to example embodiments described herein.

As shown in FIG. 23, communication device 2000 includes a wireless interface 2905. Wireless interface 2905 includes a transmitter 2930 configured to send messages, and the like, and a receiver 2935 configured to receive messages, and the like.

A UE device information processing unit 2920 is configured to receive, via wireless interface 2905, information regarding a UE type associated with a UE device and/or information regarding one or more services supported by the UE device. For example, UE device information processing unit 2920 may be configured to perform the actions of the network device according to the UE air interface capability exchange procedure illustrated in FIG. 19A.

A state configuration selection unit 2925 is configured to select, for the UE device, a state configuration from among a plurality of candidate state configurations as described herein. Each candidate state configuration may be associated with a respective set of one or more predefined operating states from among a plurality of predefined operating states. The state configuration selection unit 2925 is further configured to transmit, via wireless interface 2905, information to the UE device regarding the selected state configuration.

In some embodiments, state configuration selection unit 2925 is configured to select a state configuration based at least in part on the information received by UE device information processing unit 2920 regarding the UE type associated with the UE device and/or one or more services supported by the UE device.

In some embodiments, UE device information processing unit 2920 may be further configured to receive, via wireless interface 2905, information from the UE device regarding a change to the one or more services supported by the UE device. This information may be received as part of a UE supported service change procedure, for example. State configuration selection unit 2925 may be further configured to select a replacement state configuration for the UE device responsive to UE device information processing unit 2920 having received such information. State configuration selection unit 2925 may be further configured to transmit, via wireless interface 2905, information to the UE device regarding the selected replacement state configuration, as discussed previously with reference to FIG. 19B.

In some embodiments, state configuration selection unit 2925 is configured to select a first state configuration based at least in part on a first service supported by the UE device and select a second state configuration based at least in part on a second service supported by the UE device. Similarly, state configuration selection unit 2925 may be further configured to transmit information regarding the selected first and second state configurations to the UE device via wireless interface 2905. In such embodiments, the network device 2900 may be configured to provide the first service in a first network slice in accordance with the first state configuration and to provide the second service in a second network slice in accordance with the second state configuration.

In some embodiments, each of a plurality of network slice may be associated with a respective state configuration, and state configuration selection unit 2925 may be configured to select a state configuration for multiple network slices supported by the UE device, where the selected state configuration includes all of the predefined operating states associated with the respective state configurations associated with the multiple network slices supported by the UE device. In such embodiments, the network device 2900 may be configured to provide services to the UE device in the multiple network slices supported by the UE device in accordance with the selected state configuration.

A memory 2915 is configured to store information regarding predefined operating states, candidate state configurations, selected state configurations, UE types, supported services, detected signals, decoded signals, and the like.

The elements of communication device 2900 may be implemented as specific hardware logic blocks. In an alternative, the elements of communication device 2900 may be implemented as software executing in a processor, controller, application specific integrated circuit, or so on. In yet another alternative, the elements of communication device 2900 may be implemented as a combination of software and/or hardware.

As an example, transmitter 2930 and receiver 2935 may be implemented as a specific hardware block, while UE device information processing unit 2920 and state configuration selection unit 2925 may be software modules executing in a processor 2910, such as a microprocessor, a digital signal processor, a custom circuit, or a custom compiled logic array of a field programmable logic array. UE device information processing unit 2920 and state configuration selection unit 2925 may be modules stored in memory 2915.

FIG. 23 illustrates a block diagram of an example communication device 2000 according to example embodiments described herein. Communication device 3000 may be an implementation of a UE device, such as a smartphone, a sensor, a PC, a tablet or the like. Communication device 3000 may be used to implement various ones of the embodiments discussed herein.

As shown in FIG. 23, communication device 3000 includes a wireless interface 3005. Wireless interface 3005 includes a transmitter 3030 configured to send messages, and the like, and a receiver 3035 configured to receive messages, and the like.

A UE device information informing unit 3020 is configured to transmit, via wireless interface 3005, information regarding a UE type associated with the UE device and/or information regarding one or more services supported by the UE device. For example, UE device information informing unit 3020 may be configured to perform the actions of the UE device according to the UE air interface capability exchange procedure illustrated in FIG. 19A.

A state configuration controlling unit 3025 is configured to receive, via wireless interface 3005, information regarding a state configuration selected for the UE device from among a plurality of candidate state configurations as described herein. Each candidate state configuration may be associated with a respective set of one or more predefined operating states from among a plurality of predefined operating states. The state configuration controlling unit 3025 is further configured to control the UE device 3000 to facilitate communication via the wireless interface 3005 in accordance with the selected state configuration. For example, the state configuration controlling unit 3025 may use the information regarding the selected state configuration to configure a state machine.

In some embodiments, UE device information informing unit 3020 is further configured to transmit, via wireless interface 3005, information regarding a change to one or more services supported by the UE device. For example, UE device information informing unit 3020 may be configured to perform the actions of the UE device according to the UE supported service change procedure illustrated in FIG. 19B. In such embodiments, state configuration controlling unit 3025 may be further configured to receive, via wireless interface 3005, information regarding a replacement state configuration selected for the UE device based at least in part on the information regarding the change to the one or more services supported by the UE device. The state configuration controlling unit 3025 may then control the UE device 3000 to facilitate communication via the wireless interface 3005 in accordance with the selected replacement state configuration.

In some embodiments, the UE device 3000 may support multiple services, including at least a first service and a second service. In such embodiments, state configuration controlling unit 3025 may be configured to receive first and second state configurations in respect of the first and second services and control the UE device 3000 to facilitate communication via the wireless interface 3005 in respect of the first and second services in accordance with the first and second selected state configurations.

In some embodiments, the first and second services may be supported by first and second network slices respectively. As such, in some embodiments, state configuration controlling unit 3025 may be configured to control the UE device 3000 to facilitate communication via the wireless interface 3005 through the first and second network slice in accordance with the first and second selected state configurations.

A memory 3015 is configured to store information regarding the predefined operating states, candidate state configurations, selected state configurations, the device's UE type, supported services, detected signals, decoded signals, and the like.

The elements of communication device 3000 may be implemented as specific hardware logic blocks. In an alternative, the elements of communication device 3000 may be implemented as software executing in a processor, controller, application specific integrated circuit, or so on. In yet another alternative, the elements of communication device 3000 may be implemented as a combination of software and/or hardware.

As an example, transmitter 3030 and receiver 3035 may be implemented as a specific hardware block, while UE device information informing unit 3020 and state configuration controlling unit 3025 may be software modules executing in a processor 3010, such as a microprocessor, a digital signal processor, a custom circuit, or a custom compiled logic array of a field programmable logic array. UE device information informing unit 3020 and state configuration controlling unit 3025 may be modules stored in memory 3015.

In addition, although described primarily in the context of methods, device and equipment, other implementations are also contemplated, such as in the form of instructions stored on a non-transitory computer-readable medium, for example.

According to still another aspect of the present invention, there is provided a method in a network device to support multiple user equipment (UE) state configurations in a wireless network, the method comprising: selecting, for a UE device, a state configuration from among a plurality of candidate state configurations, each candidate state configuration being associated with a respective set of one or more predefined operating states from among a plurality of predefined operating states; and transmitting information to the UE device regarding the selected state configuration.

In some embodiments, selecting a state configuration comprises selecting a state configuration based at least in part on at least one of: a UE type associated with the UE device; and one or more services supported by the UE device.

In some embodiments, the method further comprises receiving, as part of a UE air interface capability exchange procedure, information regarding at least one of: the UE type associated with the UE device; and the one or more services supported by the UE device.

In some embodiments, the method further comprises receiving, as part of a UE supported service change procedure, information regarding a change to the one or more services supported by the UE device; responsive to receiving the information regarding the change to the one or more services supported by the UE device, selecting a replacement state configuration from among the plurality of candidate state configurations based at least in part on the information regarding the change to the one or more services supported by the UE device; and transmitting information to the UE device regarding the selected replacement state configuration.

In some embodiments, selecting a state configuration from among a plurality of candidate state configurations comprises: selecting a first state configuration based at least in part on a first service supported by the UE device; and selecting a second state configuration based at least in part on a second service supported by the UE device; and transmitting, to the UE device, information regarding the selected state configuration comprises transmitting, to the UE device, information regarding the selected first and second state configurations.

In some embodiments, the method further comprises providing the first service in a first network slice in accordance with the first state configuration; providing the second service in a second network slice in accordance with the second state configuration.

In some embodiments, each of a plurality of network slice is associated with a respective state configuration among the plurality of candidate state configurations; selecting a state configuration from among the plurality of candidate state configurations comprises selecting a state configuration for multiple network slices supported by the UE device that includes all of the predefined operating states associated with the respective state configurations associated with the multiple network slices supported by the UE device; and the method further comprises providing services to the UE device in the multiple network slices supported by the UE device in accordance with the selected state configuration.

In some embodiments, predefined operating states differ from one another in terms of at least one of: UE device power consumption; network resource usage; control channel usage, and control channel monitoring pattern.

In some embodiments, the plurality of predefined operating states comprises at least two of the following operating states: an ACTIVE state, an ECO state; an IDLE state; an enhanced IDLE state, and an enhanced ECO state.

In some embodiments, the plurality of candidate state configurations comprises at least two of the following candidate state configurations: a candidate state configuration associated with a set of predefined operating states that includes an ACTIVE state and an ECO state; a candidate state configuration associated with a set of predefined operating states that includes an ECO state and an IDLE state; a candidate state configuration associated with a set of predefined operating states that includes an ACTIVE state, an ECO state, and an IDLE state; a candidate state configuration associated with a set of predefined operating states that includes an ACTIVE state and an IDLE state; a candidate state configuration associated with a set of predefined operating states that includes an enhanced ACTIVE state and an IDLE state; and a candidate state configuration associated with a set of predefined operating states that includes an enhanced IDLE state and an ACTIVE state.

In some embodiments, the enhanced ACTIVE state includes therein ACTIVE and ECO sub-states with state transition paths therebetween within the enhanced ACTIVE state.

In some embodiments, the enhanced IDLE state includes therein IDLE and ECO sub-states with transition paths therebetween within the enhanced IDLE state.

In some embodiments, the method further comprises communicating with the UE device in accordance with the selected state configuration.

According to a further aspect of the present invention, there is provided a network device comprising: a wireless interface; a processor operatively coupled to the wireless interface; and a computer readable storage medium operatively coupled to the processor, the computer readable storage medium storing programming for execution by the processor, the programming comprising instructions to: select, for a user equipment (UE) device, a state configuration from among a plurality of candidate state configurations, each candidate state configuration being associated with a respective set of one or more predefined operating states from among a plurality of predefined operating states; and transmit, via the wireless interface, information to the UE device regarding the selected state configuration.

In some embodiments, the instructions to select a state configuration comprise instructions to select a state configuration based at least in part on at least one of: a UE type associated with the UE device; and one or more services supported by the UE device.

In some embodiments, the programming further comprises instructions to receive, via the wireless interface, as part of a UE air interface capability exchange procedure, information regarding at least one of: the UE type associated with the UE device; and the one or more services supported by the UE device.

In some embodiments, the programming further comprises instructions to: receive, via the wireless interface, as part of a UE supported service change procedure, information regarding a change to the one or more services supported by the UE device; responsive to receiving the information regarding the change to the one or more services supported by the UE device, select a replacement state configuration from among the plurality of candidate state configurations based at least in part on the information regarding the change to the one or more services supported by the UE device; and transmit, via the wireless interface, information to the UE device regarding the selected replacement state configuration.

In some embodiments, the instructions to select a state configuration from among a plurality of candidate state configurations comprise instructions to: select a first state configuration based at least in part on a first service supported by the UE device; and select a second state configuration based at least in part on a second service supported by the UE device; and the instructions to transmit, via the wireless interface, information to the UE device regarding the selected state configuration comprise instructions to transmit, via the wireless interface, information to the UE device regarding the selected first and second state configurations.

In some embodiments, the programming further comprises instructions to: provide the first service in a first network slice in accordance with the first state configuration; and provide the second service in a second network slice in accordance with the second state configuration.

In some embodiments, each of a plurality of network slice is associated with a respective state configuration among the plurality of candidate state configurations;

the instructions to select a state configuration from among the plurality of candidate state configurations comprise instructions to select a state configuration for multiple network slices supported by the UE device that includes all of the predefined operating states associated with the respective state configurations associated with the multiple network slices supported by the UE device; and the programming further comprises instructions to provide services to the UE device in the multiple network slices supported by the UE device in accordance with the selected state configuration.

In some embodiments, the predefined operating states differ from one another in terms of at least one of: UE device power consumption; network resource usage; control channel usage, and control channel monitoring pattern.

In some embodiments, the plurality of predefined operating states comprises at least two of the following operating states: an ACTIVE state, an ECO state; an IDLE state; an enhanced IDLE state; and an enhanced ECO state.

In some embodiments, the plurality of candidate state configurations comprises at least two of the following candidate state configurations: a candidate state configuration associated with a set of predefined operating states that includes an ACTIVE state and an ECO state; a candidate state configuration associated with a set of predefined operating states that includes an ECO state and an IDLE state; a candidate state configuration associated with a set of predefined operating states that includes an ACTIVE state, an ECO state, and an IDLE state; a candidate state configuration associated with a set of predefined operating states that includes an ACTIVE state and an IDLE state; a candidate state configuration associated with a set of predefined operating states that includes an enhanced ACTIVE state and an IDLE state; and a candidate state configuration associated with a set of predefined operating states that includes an enhanced IDLE state and an ACTIVE state.

In some embodiments, the enhanced ACTIVE state includes therein ACTIVE and ECO sub-states with state transition paths therebetween within the enhanced ACTIVE state.

In some embodiments, the enhanced IDLE state includes therein IDLE and ECO sub-states with transition paths therebetween within the enhanced IDLE state.

In some embodiments, the programming further comprises instructions to communicate with the UE device in accordance with the selected state configuration.

According to another aspect of the present invention, there is provided a method in a user equipment (UE) device to support multiple UE state configurations in a wireless network, the method comprising: receiving, from the wireless network, information regarding a state configuration selected for the UE device, the selected state configuration having been selected from among a plurality of candidate state configurations, each candidate state configuration being associated with a respective set of one or more predefined operating states from among a plurality of predefined operating states; and communicating via the wireless network in accordance with the selected state configuration.

In some embodiments, the method further comprises transmitting, as part of a UE air interface capability exchange procedure, information regarding at least one of: a UE type associated with the UE device; and one or more services supported by the UE device, wherein the state configuration selected for the UE device is selected from among the plurality of candidate state configurations based at least in part on at least one of: the information regarding the UE type associated with the UE device; and the information regarding the one or more services supported by the UE device.

In some embodiments, the method further comprises transmitting, as part of a UE supported service change procedure, information regarding a change to the one or more services supported by the UE device;

receiving, from the wireless network, information regarding a replacement state configuration selected for the UE device from among the plurality of candidate state configurations based at least in part on the information regarding the change to the one or more services supported by the UE device; and communicating via the wireless network in accordance with the selected replacement state configuration.

In some embodiments, the UE device supports multiple services, including at least a first service and a second service; receiving, from the wireless network, information regarding a state configuration selected for the UE device comprises: receiving information regarding a first state configuration selected from among the plurality of candidate state configurations based at least in part on the first service supported by the UE device; and receiving information regarding a second state configuration selected from among the plurality of candidate state configurations based at least in part on the second service supported by the UE device; and communicating via the wireless network in accordance with the selected state configuration comprises: communicating via the wireless network in respect of the first service in accordance with the first selected state configuration; and communicating via the wireless network in respect of the second service in accordance with the second selected state configuration.

In some embodiments, communicating via the wireless network in respect of the first service in accordance with the first selected state configuration comprises communicating via a first network slice of the wireless network in accordance with the first selected state configuration; and communicating via the wireless network in respect of the second service in accordance with the second selected state configuration comprises communicating via a second network slice of the wireless network in accordance with the second selected state configuration.

According to a further aspect of the present invention, there is provided a method for operating a user equipment (UE) device, the method comprising: operating the UE device in accordance with an operating state in which the UE device can transition between two sub-states within the operating state, the two sub-states comprising: a first sub-state in which the UE device maintains light connection management on at least one of uplink and downlink; and an IDLE sub-state with reduced power consumption relative to the first sub-state.

In some embodiments, in the first sub-state, the UE device is configured with a tracking channel to facilitate periodic location tracking of the UE device.

In some embodiments, wherein the tracking channel is further used to maintain UE uplink timing alignment.

In some embodiments, the UE device is operable to selectively disable the tracking channel procedure in the first sub-state to reduce energy consumption.

In some embodiments, in the first sub-state, if the tracking channel procedure is disabled and the UE device needs to send small packets on uplink, the UE device is configured to either re-enable the tracking channel procedure or perform a random access procedure.

In some embodiments, in the first sub-state the UE device is configured to transmit signaling associated with disabling and enabling the tracking channel procedure.

In some embodiments, in the first sub-state, the UE device monitors a simplified paging and downlink data notification message.

In some embodiments, the simplified paging and downlink data notification message is unicast to the UE device.

In some embodiments, in the first sub-state, the UE device maintains light connection management on uplink and downlink.

In some embodiments, maintaining a light connection management on uplink and downlink facilitates small packet data exchange with reduced latency.

In some embodiments, for downlink, in the IDLE sub-state the UE device periodically monitors a paging message.

In some embodiments, for downlink, in the first sub-state the UE device does not monitor the paging message.

In some embodiments, the paging message is a multicast message to all UE devices that belong to a paging group.

In some embodiments, transitions between the first sub-state and the IDLE sub-state are done without explicit state transition signaling to a network.

In some embodiments, UE context with a radio access network (RAN) is maintained in the first sub-state.

In some embodiments, UE context with a radio access network (RAN) is maintained in both sub-states.

In some embodiments, UE context with a radio access network (RAN) is not maintained in the operating state.

In some embodiments, transitioning between the operating state and another operating state is contention-free.

In some embodiments, the operating state is the enhanced IDLE state and the first sub-state is the ECO state.

In some embodiments, the UE device is configured to operate in the enhanced IDLE state based on services supported by the UE device and/or a UE type associated with the UE device.

Embodiments of the invention provide systems and methods for configurations of UE state machine (also referred to as state machine configurations) to support multiple services, multiple slices or multiple air interfaces. The embodiments can generally be categorized as follows:

Embodiments in which a UE has one configuration of the state machine for multiple services (or sets of services), for multiple slices or for multiple air interfaces;

Embodiments in which a UE has multiple state machine configurations for different services (or sets of services), for multiple slices or for multiple air interfaces that work independently; and Embodiments in which a UE has multiple state machine configurations for different services (or sets of services), for multiple slices, or for multiple air interfaces that work collaboratively.

In the following description, embodiments are for the most part described in the context of providing a state machine or multiple state machines, or state machine configurations to support for multiple services. However, all of these embodiments can alternatively be implemented to support multiple slices or multiple network slices.

In some embodiments, the UE may have a state machine that uses a state machine configuration selected out of a plurality of state machine configurations according to the services used. The configuration of this state machine may be adapted to services. In some embodiments, at initialization, the configuration of this state machine may be default or be determined according to the services the UE may use. During operation, the configuration of this state machine may change (e.g., add/remove a state in the state machine) according to the change in services for the UE.

In the detailed description that follows, all embodiments are described in the context of different state machine configurations for different services. All of these embodiments can equally be applied for different state machine configurations for sets of services, types of services, or for air interfaces. In some embodiments, an access point/base station or UE according to one of the above-described embodiments is further configured to implement one of the embodiments described herein for providing state machine configurations to support multiple services.

One State Machine for Multiple Services

In some embodiments, when a UE needs multiple services (e.g., eMBB and mMTC), the UE may use a common state machine configuration for two or more of the multiple service. In some embodiments, the common state machine configuration is used for all of the services. The states in the common state machine configuration may be determined according to the states in the state machine configurations for those services.

In some embodiments (example A), the common state machine configuration includes all the states used in any of the state machine configurations for the multiple services the common state machine configuration is being defined for.

In some embodiments (example B), the common state machine configuration includes the states used in one state machine configuration for those services with the most powerful states. The most powerful states can, for example, be the most energy consuming, at the highest power level, supporting the most powerful functions, or having the best performance.

In some embodiments (example C), the common state machine configuration includes any state(s) that are common to all of the state machine configurations for those services, and may also include one or more additional states from one or more of the state machine configurations for services that are not common to all of the state machine configurations for the services. The additional states might include the most powerful state(s) selected from the remaining states(s) that are not common to all of the state machine configurations.

In some embodiments (example D), the common state machine configuration is determined according to a mapping table. In one example, a mapping table maps from service(s) to state(s) or state machine configuration indicator. A state configuration is a parameter, such as an index, indicating the configuration indicator of states in the state machine configuration or indicating the state machine configuration which includes a configuration for the states. In a second example, the mapping table maps each combination of sets of states (or state configurations) to a respective single set of states (or state machine configurations).

As an example, consider combining three state machine configurations for eMBB, mMTC and URLLC where the basic state machine configuration definitions for these services include the following:
For eMBB: Active state and Idle states
For mMTC: Inactive (ECO) state and Idle state,
For URLLC: Inactive (although in another example, the state for URLLC could be Active all the time)

The states used in the common machine for eMBB, mMTC and URLLC for the four examples A,B,C and D introduced above might be:
a. Example A: Active, Inactive and Idle
b. Example B: Active and Idle
c. Example C: Inactive and Active
d. Example D: Table 1 below shows a specific example of a table mapping from service(s) to state(s) (or state machine configurations). Table 2 below shows a specific example of a table mapping multiple sets of states (or state configurations) to a single set of states (or one state machine configuration). With the example of Table 2, the table maps from pairs of state machine configurations to one state machine configuration, but the same approach can be used to map from two or more state machine configurations to one state machine configuration.

TABLE 1

Mapping from service(s) to States

| Service(s) | States | State Machine Configuration |
|---|---|---|
| eMBB | Active, Idle | Config#1 |
| mMTC | Inactive, Idle | Config#2 |
| URLLC | Inactive | Config#3 |
| eMBB and mMTC | Active, Idle | Config#1 |
| eMBB and URLLC | Active, Inactive | Config#4 |
| mMTC and URLLC | Inactive, Idle | Config#2 |
| eMBB, mMTC and URLLC | Active, Inactive | Config#4 |
| ... | ... | |

TABLE 2

Mapping from Multiple State Configurations to One State Machine Configuration

| | Config#1 | Config#2 | Config#3 | Config#4 | ... |
|---|---|---|---|---|---|
| Config#1 | Config#1 | Config#1 | Config#4 | Config#4 | ... |
| Config#2 | Config#1 | Config#2 | Config#2 | Config#4 | ... |
| Config#3 | Config#4 | Config#2 | Config#3 | Config#4 | ... |
| Config#4 | Config#4 | Config#4 | Config#4 | Config#4 | ... |
| ... | ... | ... | ... | ... | ... |

The method to determine the states in the common state machine configuration may be pre-defined or signaled from the network to the UE. It may also be partly pre-defined and partly signaled. For example, there may be a basic scheme that is pre-defined and some parameters or configurations signaled. In another example, there may be multiple candidate schemes pre-defined and the selected scheme signaled.

The common state machine configuration may be fixed or long-term stable for a UE, according to all the services the UE supports. In some embodiments, the common state machine configuration is fixed for a certain type of UE. In some embodiments the UE informs the network of the common state machine configuration by reporting UE type or capability to the network. The network operates accordingly in its interactions with the UE.

Alternatively or in addition, the common state machine configuration may be flexible or dynamic for a UE, according to the services the UE uses. In this case, the common state machine configuration may change from a first state common machine for one configuration of services used by the UE to a second common state machine configuration for another configuration of services used by the UE.

Figure 24:
FIG. 24 is an example of state machine configurations that change upon service stop or start.

In an embodiment, when a new service is started, the configuration of the common state machine configuration for the UE may be changed to support more powerful states. When an existing service stops, the common state machine configuration may be changed to a state machine configuration with lower power consumption. An example is depicted in FIG. 24, which shows two state machine configurations 3100,3102, where in this example state machine configuration 3100 has more powerful states. When a new service starts, the UE starts using state machine configuration #1. When an existing service stops, the UE starts using state machine configuration #2 3102.

In this case, the UE may send a signal to the network indicating the change in service or state machine configuration. The network may send an acknowledgement or configuration signaling to confirm the transfer of the state machine configuration.

Figure 25:
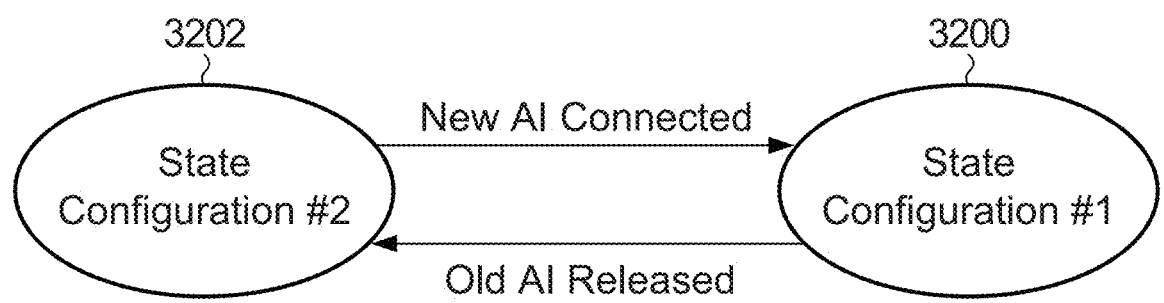
FIG. 25 is an example of state machine configurations that change upon a new air interface being connected or released.

In another embodiment, when a new air interface is connected or an existing air interface is released, the state machine configuration of the UE may transition to a different configuration. An example is depicted in FIG. 25, which shows two state machine configurations 3200,3202. When a new air interface is connected, the UE starts using state machine configuration #1 3200. When an existing air interface is released, the UE starts using state machine configuration #2 3202.

In this case, in some embodiments, the change in state configuration may be known by the network according to an air interface connect/release procedure without extra signaling.

In another embodiment, a UE has a state machine configuration with all the states for all the services. But some of the states are disabled according to the services to be used. For example, a UE may be configured with Idle, Inactive and Active states in the state machine and then configured or reconfigured to disable Inactive state. The result is actually similar to a state machine configured with only Idle and Active states.

In the common state machine configuration for multiple services, the condition for state transition between pairs of states of the common state machine configuration may be defined with respect to multiple services. Table 3 below shows several examples to illustrate this. Table 3 refers to session-based connections and non-session based connections. A session based connection, for example ftp, web browsing, video traffic, is a connection where there are a series of packet exchange. A non-session based connection, for example keep-alive message, background traffic, is a connection where there is usually only a packet sent and may have a packet received.

TABLE 3

Conditions for State Transitions

| State transition | Condition |
|---|---|
| Any state → Active | When a session for any service starts if it is not in Active state |
| Active → Inactive | When session(s) or session-based connection(s) for all services are released |
| Active or Inactive → idle | When all connections (including session based and non-session based) have been released |
| | When there is no non-session based connections, the release of the session based connection may lead to state transfer: Active --> Idle |

While a few examples have been described for various conditions for state transitions, many others are possible. A non-exhaustive list of further examples includes: The UE shall transit to Active state when a session for any of the services, slices or AIs starts if it is not in Active state.

The UE shall transit to Active state when a session-based service (e.g., eMBB service) starts.

The UE shall transit to Active state when it accesses a slice supporting sessions (e.g., eMBB slice).

The UE shall transit to Active state when it connects to an air interface for session-based service (e.g., AI for eMBB).

The condition for the UE to transit to Active state is the establishment of a session-based connection.

The condition for the UE to transit to Active state is the start of a session-based service (e.g., eMBB service).

The condition for the UE to transit to Active state is the access of a slice supporting sessions (e.g., eMBB slice).

The condition for the UE to transit to Active state is the establishment of a connection to an AT for session based services (e.g., AT for eMBB).

The establishment of a session-based connection triggers the transition (from another state) to Active state.

The start of a session-based service (e.g., eMBB service) triggers the transition to Active state when the UE (or the state machine of the UE) is not in Active state.

The access of a slice supporting sessions (e.g., eMBB slice) triggers the transition (from Idle or Inactive state) to Active state.

The establishment of a connection to an AI for session based services (e.g., AI for eMBB) triggers the transition (from another state) to Active state.

Other state transition conditions are possible.

In some embodiments, the condition for a state transition may also include the expiring of one or more timers. The following is a non-exhaustive list of examples: The UE shall transit to Idle state only when all the connections (including session based and non-session based) have been released and all related timers expire.

The UE shall transit to Idle state only when the last connection is released and the related timer (the timer that starts or resets when the connection is released) expires.

The UE shall transit to Idle state only when timer T770 (a timer which starts when the last connection is released) expires.

Other timer-based transition conditions are possible.

In some embodiments, when the state machine configuration changes, the state after the state reconfiguration is determined according to pre-defined rules. Several examples of possible pre-defined rules include:

Rule 1: The UE shall transition to Active state when a new service starts if the state machine configuration after reconfiguration supports Active state Rule 2: The UE shall transition to Inactive state when a new service starts if the state machine configuration after reconfiguration does not support Active state Rule 3: The UE shall transition to Inactive state when an existing service is released if the state machine configuration after reconfiguration supports Inactive state Rule 4: The UE shall transition to Idle state when an existing service is released if the state machine configuration after reconfiguration does not support Inactive state Multiple State Machines Working Independently In some embodiments, multiple state machines working independently are implemented. For each of a plurality of services, a separate state machine is used. With this embodiment, the UE can have multiple states at the same time, one for each service.

In a specific example, a UE may use three independent state machines for eMBB, mMTC and URLLC transmissions, separately. Therefore it may have three states in the same time. For example, at a certain time, the UE may be in Active state for eMBB, in Idle state for mMTC and in Inactive state for URLLC.

In another example of this, a UE may use two independent state machines for two air interfaces. The state machine to be used in an air interface may be indicated by signaling sent from the network. The state machine to be used may be explicitly indicated by containing the state machine information in the signaling. Alternatively, the state machine to be used may be implicitly indicated by containing some other information in the signaling that can be used to derive the state machine.

Embodiments featuring independent state machines have increased complexity in comparison to the embodiments in which a single common state machine is used. In addition, these embodiments cannot provide the best performance for the UE when different state machines are in different states. For example, a UE in Idle state for mMTC is actually not able to save power (although it pays the cost of large latency) when it is in Active state for eMBB.

Multiple State machines Working Collaboratively

With these embodiments, a UE is configured with multiple state machines that work collaboratively to improve the performance for the UE. The state or a condition for state transition in one state machine may depend on the state or event in another state machine of the UE. The following is a non-exhaustive list of examples of types of these dependencies:

1. A particular state of a first state machine directly causes a particular state of a second state machine. In the examples, this is shown as a dotted dependency arrow from the particular state of the first state machine to the particular state of the second state machine. Examples are shown and described below with reference to FIG. 30.

Figure 27:
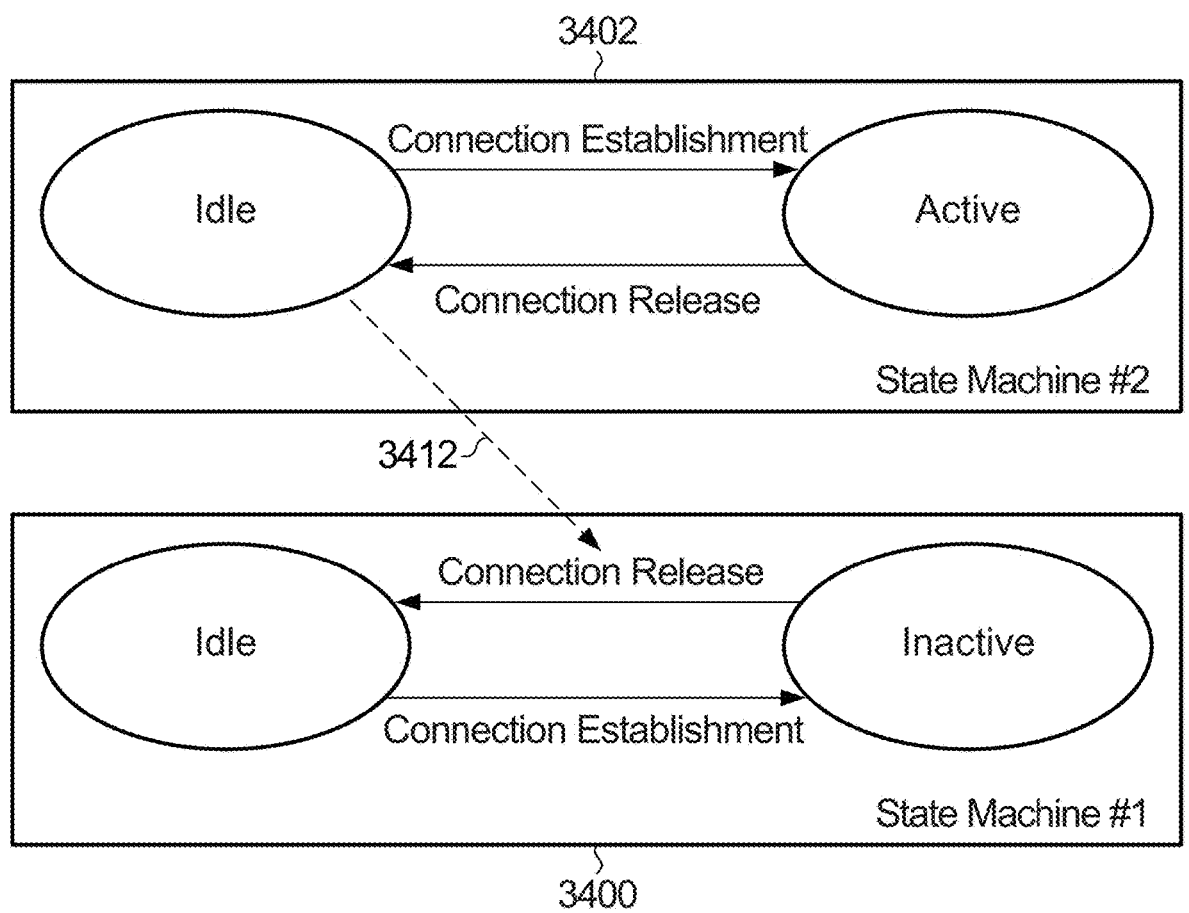

2. A condition for a particular state transition in a first state machine depends on a particular state of a second state machine. Such a condition is in addition to other conditions in the first state machine for the particular state transition. In the examples, this is shown as a dotted dependency arrow from the particular state of the second state machine to the state transition arrow in the first state machine. Arrow 3412 of FIG. 27, described in detail below, is an example of this.

3. A condition for a particular state transition in a first state machine directly causes a particular state of the second state machine. In the examples, this is shown as a dotted dependency arrow from the particular state transition of the first state machine to the particular state in the second state machine. Arrow 3312 of FIG. 26, described in detail below, is an example of this.

4. A condition for a particular state transition in a first state machine depends on a condition for a particular state transition of a second state machine.

Figure 26:
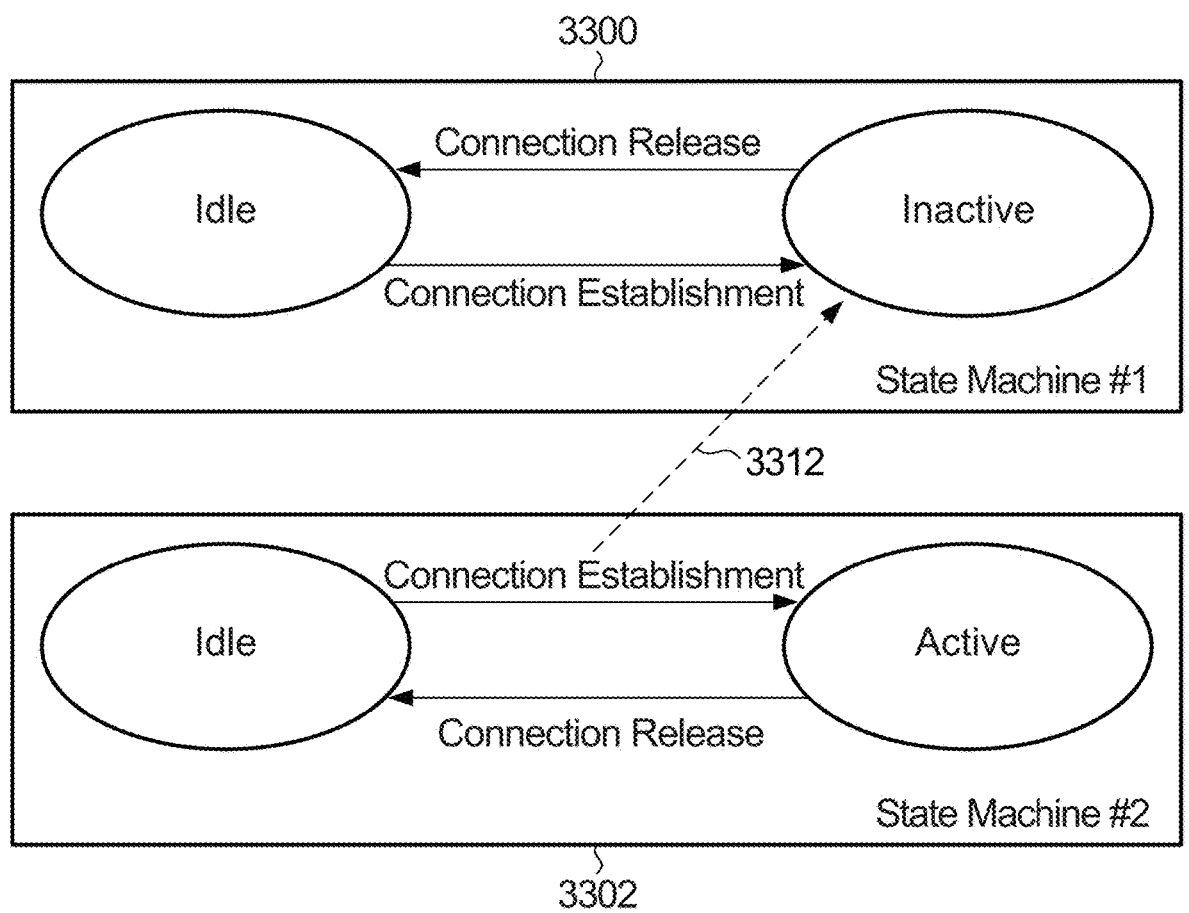
FIGS. 26 and 27 are examples of two state machine configurations in which there is a state machine configuration dependency from one state machine configuration upon another state machine configuration.

A first set of examples will be described with reference to FIG. 26. In FIG. 26, the UE has state machine #1 3300, and has state machine #2 3302. State machine #1 3300 is for non-session based applications while state machine #2 3302 is for session based application. Each state machine has one or more states, and has conditions for transition between states of the state machine that are local to the state machine. The states for state machine #1 3300 include Idle and Inactive. The state transitions include a transition from Inactive to Idle upon connection release, and a transition from Idle to Inactive upon connection establishment. The states for state machine #2 3302 include Idle and Active. The state transitions include a transition from Idle to Active upon connection establishment, and a transition from Active to Idle upon connection release.

In this example, additional conditions for state transitions are defined for state machine #1 3300 that depend on state machine #2 3302. Several examples of state machine dependency that may exist between two or more state machines generally will now be described, together with a description of how the each example may apply to the specific state machines of FIG. 26. Some of these examples contemplate the existence of two or more state machines (only two shown in FIG. 26). For all of the examples of FIG. 25, some aspect of state machine #2 3302 directly causes Inactive state in state machine #1 3300.

First Example

When state machine #2 is in Active state, state machine #1 shall be in Inactive state. For the example of FIG. 26, if state machine #1 3300 is in Idle, a transition from Idle to Active for state machine #2 3302 causes a transition from Idle to Inactive for state machine #1 3300 if it is not already Inactive.

Second Example

When any other state machine transits to Active state, the current state machine shall transition to Inactive state if it is not in Inactive state. In the example of FIG. 26, a transition in state machine #2 3302 from Idle to Active causes state machine #1 3300 to transition from Idle to Inactive if it is not already Inactive.

Third Example

When a connection is established for a state machine for a session based service, the state machine for a non-session based service shall transition to Inactive state if it is (previously) in Idle state. In the example of FIG. 26, state machine #2 3302 is for a session based service. When a connection is established, state machine #2 3302 transitions from Idle to Active, and connection establishment also causes state machine #1 3300 to transition from Idle to Inactive if it is not already Inactive. This dependency is indicated by arrow 3312 in FIG. 26.

Fourth Example

State machines include a State machine #2 for an eMBB service, and a state machine #1 for mMTC service. When the connection for eMBB service is established, the state machine #1 for mMTC service shall transition to Inactive state if it is (previously) in Idle state.

Fifth Example

When a connection is established for an air interface corresponding to state machine #2, the state machine #1 transitions to Inactive state. In the example of FIG. 26, when a connection is established for an air interface corresponding to state machine #2 3302 the state machine #1 3300 transitions to Inactive state.

The benefit from these dependencies is improved performance for the non-session based service supported by state machine #1 at similar UE power consumption. This is because when the state machine #2 is in Active state, the UE has to work in a high power consumption mode no matter what states the other state machines are in.

In some embodiments, during the connection establishment procedure for session based service, the network may also send a message to configure some other state machines of the UE.

Figure 28:
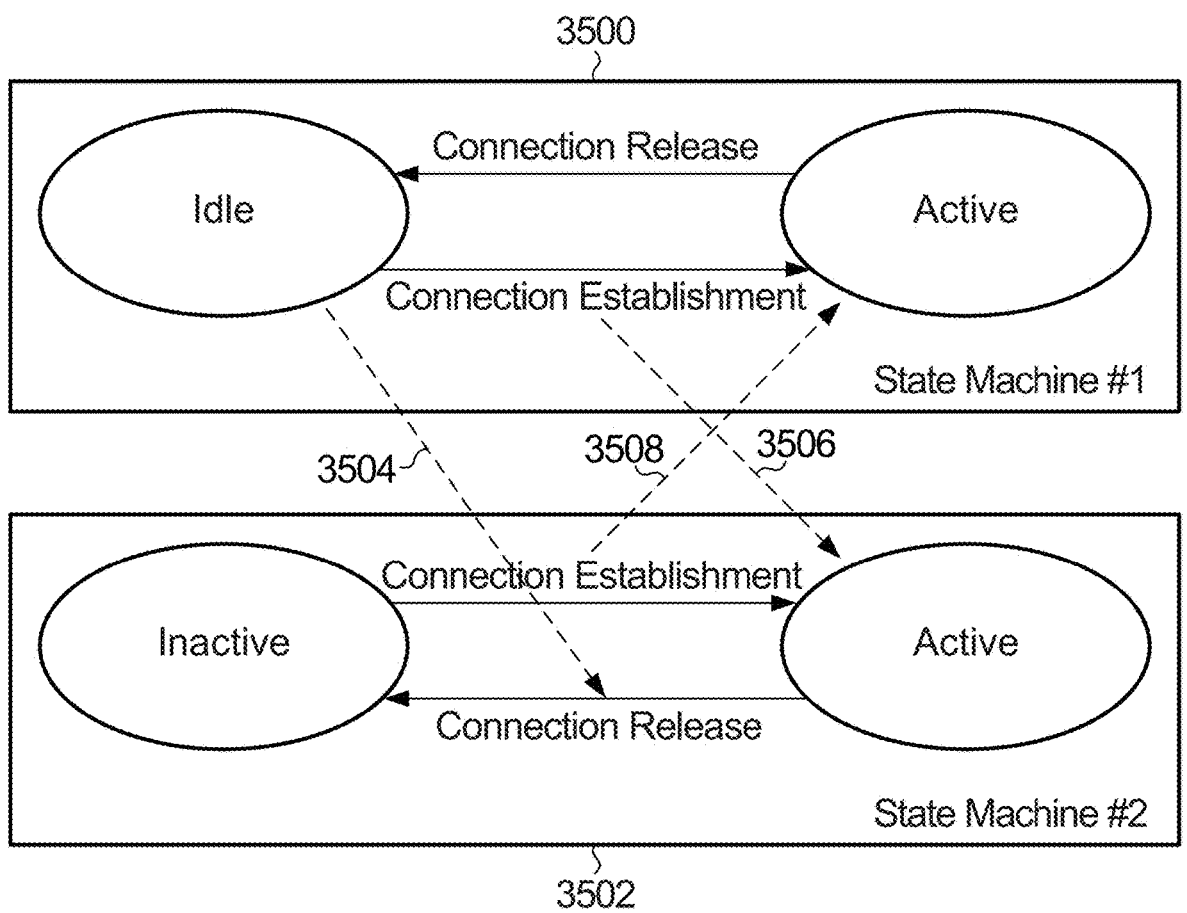
FIG. 28 is an example of two state machine configurations in which there is a state machine configuration dependency from one state machine configuration upon another state machine configuration and a state machine configuration dependency in the reverse direction.

Another set of examples will now be described with reference to FIG. 28, which shows state machine #1 3400, and state machine #2 3402. In these examples, the condition for state machine #1 3400 to transition to Idle state depends on state machine #2 3402. Several examples of state machine dependency for application to two state machines generally will now be described, together with a description of how the example applies to the specific state machines of FIG. 28. Some of these examples contemplate the existence of two or more state machines (only two shown in FIG. 28).

First Example

When the connections of all state machines are released, the state machine #1 transitions to Idle state after a pre-defined time period (e.g., when a timer expires). For the example of FIG. 28, when connections for all state machines including state machine #1 3400 and state machine #2 3402 are released, state machine #1 3400 transitions to Idle after a pre-defined time period if it is still not in Idle Second Example When connections have all been released and all other state machines except state machine #1 are in idle state, the state machine #1 transitions to Idle state. For the example of FIG. 28, when the connection for state machine #2 3402 is released and all other state machines except state machine #1 3400 are in idle state, the state machine #1 3400 transitions to Idle state.

Third Example

When all connections for non-session based services are released and all other state machines (except state machine #1) are not in Active state, the state machine #1 shall transition to Idle state. For the example of FIG. 28, state machine #1 3400 is for a non-session based service. When all other state machines including state machine #2 3402 are not Active, state machine #1 3400 transitions to Idle.

Fourth Example

One state machine is for mMTC service, and another state machine is for URLLC.

When the connection for mMTC service is released and there is no other connections (except possibly a connection URLLC service), the state machine for mMTC service transitions to Idle state. This approach might be suitable, for example if the URLLC service is too important and/or too delay sensitive that its state machine cannot have an Idle state.

In some embodiments, the state transitions for each state machine depend on the state of the other state machine. An example is shown in FIG. 28, which shows state machines 3500,3502. In FIG. 28, arrow 3504 indicates that state machine #1 3500 being in the Idle state is a condition for state machine #2 3502 to transition from Active to Inactive. Arrow 3506 indicates that a connection establishment for state machine #1 (which is also a condition for Idle to Active state transition in state machine #1 3500) causes state machine 3502 to be in the Active state. Arrow 3508 indicates that a connection establishment in state machine #2 3502 (which is also a condition for Inactive to Active in state machine #2 3502) causes state machine #1 3500 to be in the Active state.

Figure 29:
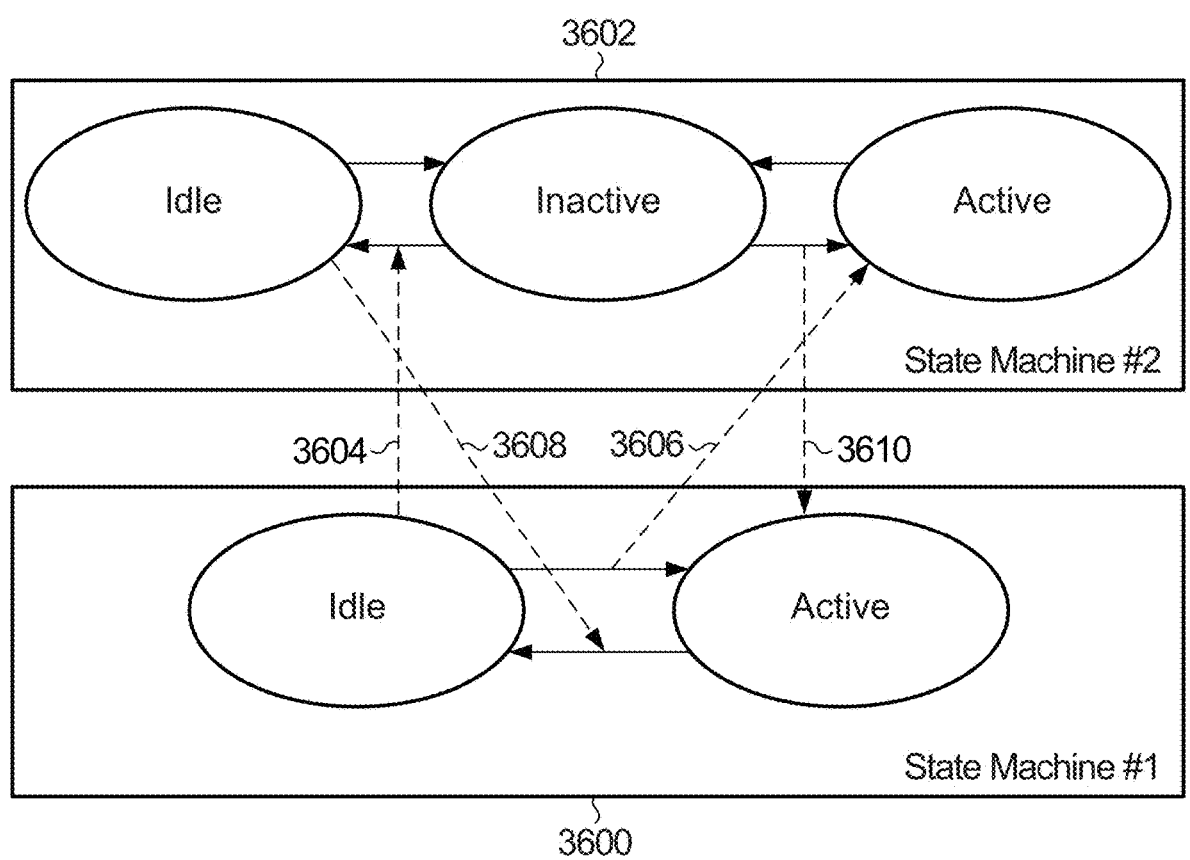
FIG. 29 is an example of two state machine configurations in which there is a state machine configuration dependency from one state machine configuration upon another state machine configuration, in which one of the state machine configurations has three states.

FIG. 29 shows an example of state machine dependency where one of the state machines has three states. Shown is a first state machine #1 3600 with two states, and a second state machine #2 3602 with three states. In the example of FIG. 29, various dependencies are illustrated by arrows 3604,3606,3608,3610:

- Arrow 3604 indicates that state machine #1 3600 being in Idle is a condition for state machine #2 3602 to transition to Idle.
- Arrow 3606 indicates that a condition for an Idle to Active state transition in state machine #1 3600 causes State machine #2 3602 to transition to Active if it is not already in that state.
- Arrow 3608 indicates that state machine #1 3600 being in Idle is a condition for state machine #2 to transition to Idle.
- Arrow 3610 indicates that a condition for an Inactive to Active state transition in state machine #2 3602 causes State machine #1 3600 to transition to Active if it is not already in that state.

In another embodiment, when the states of a first state machine #1 are a subset of the states in a second state machine #2 (as is the case for the state machines of FIG. 29, for example), state machine #2 works as a primary state machine and state machine #1 works as a secondary state machine depending on the primary state machine. There can be multiple secondary state machines. The state transitions in the primary state machine may consider conditions for all the secondary state machines depending on it. The secondary state machine does not need to judge these conditions. Rather, the state of a secondary state machine can be determined by simply mapping the state from the primary state machine. An example is given in Table 4 below.

TABLE 4

| State Mapping from Primary to Secondary State machine | | | |
|---|---|---|---|
| Primary State machine (Idle, Inactive, Active) | Idle | Inactive | Active |
| Secondary State machine (Idle, Active) | Idle | Idle | Active |
| Secondary State machine (Idle Inactive) | Idle | Inactive | Inactive |

Figure 30:
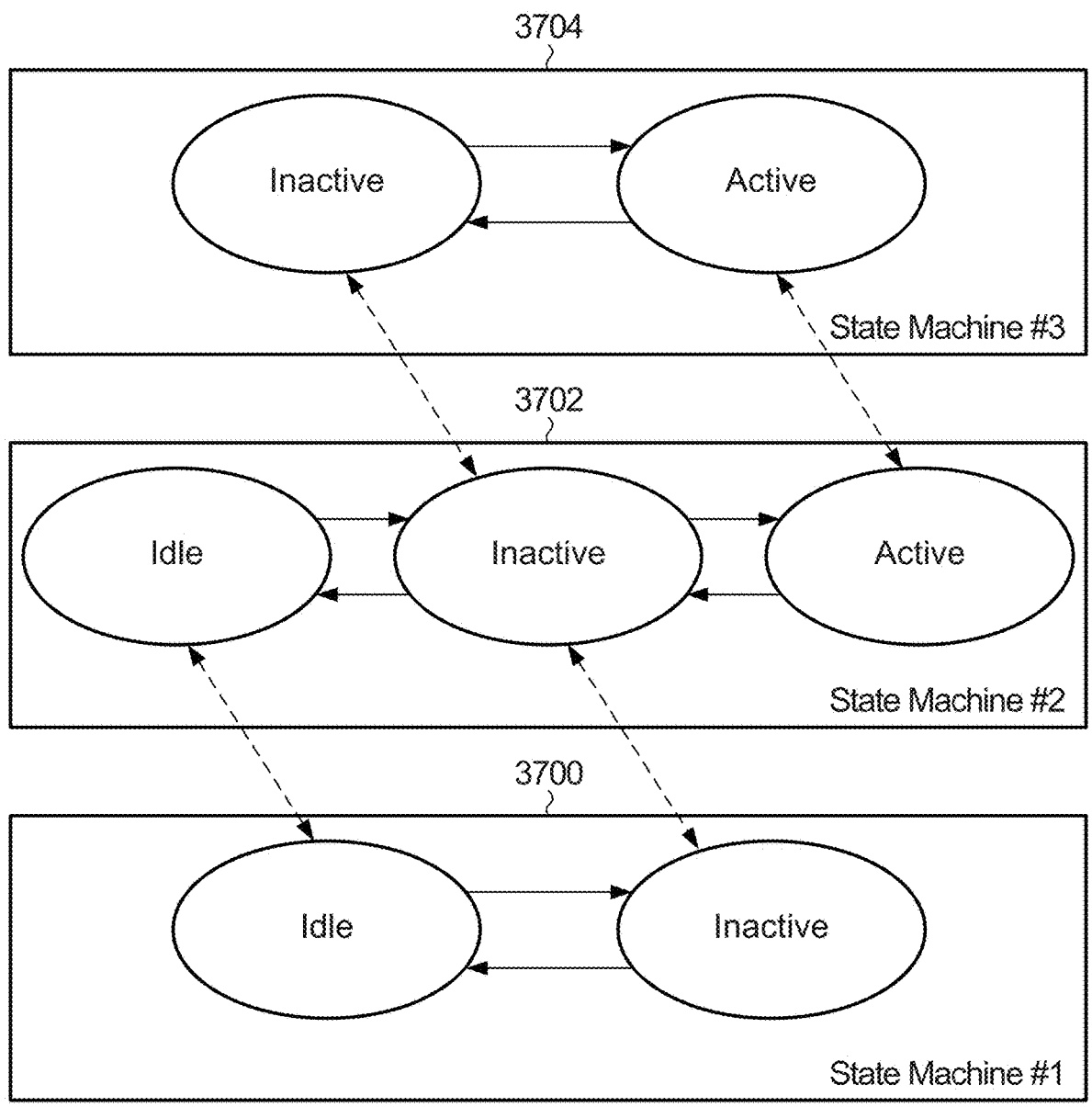
FIG. 30 is an example of three state machine configurations in which there is are synchronized states.

In another embodiment, the UE has three or more state machines. The three or more state machines have one or more states that each is in common between two or more of the state machines. The state machines are interdependent in the sense that when one state machine transits to a state in common with other state machines, the other state machines also transits to this state if it is (previously) not in this state. The state machines are synchronized for the common states. An example is depicted in FIG. 30 which shows three state machines 3700,3702,3704. A state that is in common between the three state machines 3700,3702,3704 is Inactive so a transition in any of the state machines to Inactive causes the other two state machines to transition to Inactive. Active is common between the second and third state machines 3702,3704 so a transition to Active in one of the second and third state machines causes the other of the second and third state machines to transition to Active. Idle is common between the first and second state machines 3700,3702 so a transition to Idle in one of the first and second state machines causes the other of the first and second state machines to transition to Idle.

Numerous modifications and variations of the present application are possible in light of the above teachings. It is therefore to be understood that within the scope of the appended claims, the application may be practiced otherwise than as specifically described herein.

What is claimed is:

1. A method for a UE in a wireless communication network, the method comprising:

operating, by the UE, according to a first state of a state machine, the state machine corresponding to a particular logical configuration of settings in the wireless communication network, the state machine comprising a plurality of states and state transitions dependent on a condition pertaining to the particular logical configuration, the state machine being one state machine of a plurality of state machines for the UE, each state machine corresponding to a different logical configuration of settings in the wireless communication network, and at least two of the state machines having concurrent non-idle states and different state configurations from each other, there being, in addition to a local condition pertaining to the particular logical configuration, for each state machine, at least one state machine dependency between two or more of the plurality of state machines such that a state or a condition for state transition of one of the state machines is dependent upon a state of another state machine or a condition pertaining to a service or group of services or air interface of another state machine, and the at least one state machine dependency including:
when a first state machine has an Inactive state but does not have an Active state, and when any other state machine than the first state machine transitions to Active state or Inactive state and a current state of the first state machine is not Inactive state, then the current state of the first state machine transitions to Inactive state; and transitioning, by the UE, to a second state of the state machine in response to receiving a signal to transition to the second state.

2. The method of claim 1 wherein the at least one state machine dependency includes a dependency in which a particular state of a third state machine directly causes a particular state of a second state machine.

3. The method of claim 1 wherein the at least one state machine dependency includes a dependency in which a condition for a particular state transition in a third state machine depends on a particular state of a second state machine.

4. The method of claim 1 wherein the at least one state machine dependency includes a dependency in which a condition for a particular state transition in a third state machine directly causes a particular state of a second state machine.

5. The method of claim 1 wherein the at least one state machine dependency includes a dependency in which a condition for a particular state transition in a third state machine depends on a condition for a particular state transition of a second state machine.

6. The method of claim 1 further comprising:
upon a connection establishment procedure for session based service, the UE receiving a message to configure some other state machines of the UE.

7. The method of claim 1 wherein the at least one state machine dependency includes two state machine dependencies between a first and a second of the plurality of state machines such that a state or a condition for state transition of a third state machine is dependent upon a state of a second state machine or a condition pertaining to the service or group of services or air interface of the second state machine, and such that a state or a condition for state transition of the second state machines is dependent upon a state of the second state machine or a condition pertaining to the service or group of services or air interface of the second state machine.

8. The method of claim 1 wherein:
the states of a third state machine of the state machines are a subset of the states of a second state machine of the state machines;
the second state machine works as a primary state machine and the third state machine works as a secondary state machine depending on the primary state machine;
state transitions for the primary state machine consider conditions for the primary state machine and the secondary state machine; and
the state of the secondary state machine is determined by a mapping from the state of the primary state machine.

9. The method of claim 1 wherein:
the plurality of state machines comprises at least two state machines, the at least two state machines having one or more states that each is in common between two or more of the state machines; and
the at least one state machine dependency is such that when one state machine transitions to a state in common with one or more other state machines, the one or more other state machines also transition to this state if not already in this state.

10. The method of claim 1, wherein one of the state machines has a first state configuration consisting of a first active state and a first idle state, and another of the state machines has a second state configuration consisting of a second active state and a second eco state.

11. A user equipment (UE) comprising:
a non-transitory memory storage comprising instructions; and
one or more processors in communication with the non-transitory memory storage, wherein the one or more processors execute the instructions to:
operate according of a first state of a state machine, wherein the state machine corresponds to a particular logical configuration of settings in a wireless communications network, wherein the state machine comprises a plurality of states and state transitions dependent on a condition pertaining to the particular logical configuration, wherein the state machine is one state machine of a plurality of state machines for the UE, wherein each state machine corresponds to a different logical configuration of settings in the wireless communication network, and wherein at least two of the state machines have concurrent non-idle states and different state configurations from each other,
wherein in addition to a local condition pertaining to the particular logical configuration, for each state machine, there is at least one state machine dependency between two or more of the plurality of state machines such that a state or a condition for state transition of one of the state machines is dependent upon a state of another state machine or a condition pertaining to a service or group of services or air interface of another state machine, and
wherein the at least one state machine dependency includes: when a first state machine has an Inactive state but does not have an Active state, and when any other state machine than the first state machine transitions to Active state or Inactive state and a current state of the first state machine is not Inactive state, then the current state of the first state machine transitions to Inactive state; and
transition to a second state of the state machine in response to receiving a signal to transition to the second state.

12. The UE of claim 11, wherein the at least one state machine dependency includes a dependency in which a particular state of a third state machine directly causes a particular state of a second state machine.

13. The UE of claim 11 wherein the at least one state machine dependency includes a dependency in which a condition for a particular state transition in a third state machine depends on a particular state of a second state machine.

14. The UE of claim 11 wherein the at least one state machine dependency includes a dependency in which a condition for a particular state transition in a third state machine directly causes a particular state of a second state machine.

15. The UE of claim 11 wherein the at least one state machine dependency includes a dependency in which a condition for a particular state transition in a third state machine depends on a condition for a particular state transition of a second state machine.

16. The UE of claim 11 wherein the one or more processors further execute the instructions to, upon a connection establishment procedure for session based service, receive a message to configure some other state machines of the UE.

17. The UE of claim 11 wherein the at least one state machine dependency includes two state machine dependencies between a first and a second of the plurality of state machines such that a state or a condition for state transition of a third state machine is dependent upon a state of a second state machine or a condition pertaining to the service or group of services or air interface of the second state machine, and such that a state or a condition for state transition of the second state machines is dependent upon a state of the second state machine or a condition pertaining to the service or group of services or air interface of the second state machine.

18. The UE of claim 11 wherein:
the states of a third state machine of the state machines are a subset of the states of a second state machine of the state machines;
the second state machine works as a primary state machine and the third state machine works as a secondary state machine depending on the primary state machine;
state transitions for the primary state machine consider conditions for the primary state machine and the secondary state machine; and
the state of the secondary state machine is determined by a mapping from the state of the primary state machine.

19. The UE of claim 11 wherein:
the plurality of state machines comprises at least two state machines, the at least two state machines having one or more states that each is in common between two or more of the state machines; and
the at least one state machine dependency is such that when one state machine transitions to a state in common with one or more other state machines, the one or more other state machines also transition to this state if not already in this state.

20. The UE of claim 11, wherein one of the state machines has a first state configuration consisting of a first active state and a first idle state, and another of the state machines has a second state configuration consisting of a second active state and a second eco state.

21. A method for a base station in a wireless communication network, the method comprising:
receiving information regarding a user equipment (UE) type for a UE or regarding a change to one or more services supported by the UE; and
transmitting a signal to the UE in accordance with the received information, the signal for transitioning the UE from a first state of a state machine to a second state of the state machine, the state machine corresponding to a particular logical configuration of settings in the wireless communications network, the state machine comprising a plurality of states and state transitions dependent on a condition pertaining to the particular logical configuration, the state machine being one state machine of a plurality of state machines for the UE, each state machine corresponding to a different logical configuration of settings in the wireless communication network, and at least two of the state machines having concurrent non-idle states and different state configurations from each other,
there being, in addition to a local condition pertaining to the particular logical configuration, for each state machine, at least one state machine dependency between two or more of the plurality of state machines such that a state or a condition for state transition of one of the state machines is dependent upon a state of another state machine or a condition pertaining to a service or group of services or air interface of another state machine, and
the at least one state machine dependency includes: when a first state machine has an Inactive state but does not have an Active state, and when any other state machine than the first state machine transitions to Active state or Inactive state and a current state of the first state machine is not Inactive state, then the current state of the first state machine transitions to Inactive state.

22. The method of claim 21, wherein one of the state machines has a first state configuration consisting of a first active state and a first idle state, and another of the state machines has a second state configuration consisting of a second active state and a second eco state.

23. A base station comprising:
a non-transitory memory storage comprising instructions; and
one or more processors in communication with the non-transitory memory storage, wherein the one or more processors execute the instructions to:
receive information regarding a user equipment (UE) type for a UE or regarding a change to one or more services supported by the UE; and
transmit a signal to the UE in accordance with the received information, the signal for transitioning the UE from a first state of a state machine to a second state of the state machine, wherein the state machine corresponds to a particular logical configuration of settings in a wireless communications network, wherein the state machine comprises a plurality of states and state transitions dependent on a condition pertaining to the particular logical configuration, wherein the state machine is one state machine of a plurality of state machines for the UE, wherein each state machine corresponds to a different logical configuration of settings in the wireless communication network, and wherein at least two of the state machines have concurrent non-idle states and different state configurations from each other,
wherein in addition to a local condition pertaining to the particular logical configuration, for each state machine, there is at least one state machine dependency between two or more of the plurality of state machines such that a state or a condition for state transition of one of the state machines is dependent upon a state of another state machine or a condition pertaining to a service or group of services or air interface of another state machine, and
wherein the at least one state machine dependency includes: when a first state machine has an Inactive state but does not have an Active state, and when any other state machine than the first state machine transitions to Active state or Inactive state and a current state of the first state machine is not Inactive state, then the current state of the first state machine transitions to Inactive state.

24. The base station of claim 23, wherein one of the state machines has a first state configuration consisting of a first active state and a first idle state, and another of the state machines has a second state configuration consisting of a second active state and a second eco state.

* * * * *